(12) United States Patent
Takata

(10) Patent No.: US 8,944,623 B2
(45) Date of Patent: Feb. 3, 2015

(54) DISPLAY DEVICE AND TELEVISION RECEIVER

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 241 days.

(21) Appl. No.: 13/637,532

(22) PCT Filed: Feb. 9, 2011

(86) PCT No.: PCT/JP2011/052714
§ 371 (c)(1),
(2), (4) Date: Sep. 26, 2012

(87) PCT Pub. No.: WO2011/122122
PCT Pub. Date: Oct. 6, 2011

(65) Prior Publication Data
US 2013/0027616 A1 Jan. 31, 2013

(30) Foreign Application Priority Data
Mar. 31, 2010 (JP) .................................. 2010-083015

(51) Int. Cl.
*G09F 13/04* (2006.01)
*F21V 8/00* (2006.01)
(Continued)

(52) U.S. Cl.
CPC .................. *G09F 13/04* (2013.01); *H04N 5/44* (2013.01); *G02F 1/133514* (2013.01); *G02F 1/133603* (2013.01); *G02F 1/1362* (2013.01); *G02F 2201/52* (2013.01)
USPC .......................................... 362/97.1; 349/106

(58) Field of Classification Search
CPC .................................. H04N 5/44; G09F 13/04
USPC ................... 362/600–609, 611, 612, 97.1; 349/60–67, 106
See application file for complete search history.

(56) References Cited

U.S. PATENT DOCUMENTS 7,486,352 B2 * 2/2009 Moriya .......................... 349/106
7,679,689 B2 * 3/2010 Kitaura .......................... 348/734
(Continued)

FOREIGN PATENT DOCUMENTS

JP 62-148926 A 7/1987
JP 2006-058332 A 3/2006
(Continued)

OTHER PUBLICATIONS

Official Communication issued in International Patent Application No. PCT/JP2011/052714, mailed on Mar. 15, 2011.

*Primary Examiner* — Elmito Breval
(74) *Attorney, Agent, or Firm* — Keating & Bennett, LLP

(57) ABSTRACT

It is an object of the present invention to maintain high brightness of output light while ensuring sufficient color reproducibility in a liquid crystal display device. A liquid crystal display device 10 or 10' according to the present invention includes a backlight device 12 or 40 and a liquid crystal panel 11. The backlight unit 12 or 40 includes LEDs 24 or 44 as light sources. The backlight unit 12 or 40 irradiates the liquid crystal panel 11 with light. The liquid crystal panel 11 includes a pair of substrates 11a and 11b, and a liquid crystal layer 11c. The CF substrate 11a of the liquid crystal panel 11 includes a color filter 19. The color filter 19 includes a plurality of the respective color sections R, G, B, and Y that exhibit the colors of red, green, blue, and yellow, respectively. The color filter 19 is configured such that the chromaticity of a blue color of output light obtained by passing light from the LEDs 24 or 44 through the color sections R, G, B, and Y in the color filter 19 lies outside a common region A3 of a NTSC chromaticity region A1 according to a NTSC standard and a EBU chromaticity region A2 according to a EBU standard in both a CIE1931 chromaticity diagram and a CIE1976 chromaticity diagram.

39 Claims, 39 Drawing Sheets

(51) Int. Cl.
*H04N 5/44* (2011.01)
*G02F 1/1335* (2006.01)
*G02F 1/1362* (2006.01)

(56) References Cited

U.S. PATENT DOCUMENTS

2006/0039152 A1 2/2006 Ito
2009/0091256 A1 4/2009 Ito
2009/0115952 A1 5/2009 Nakamura et al.
2010/0066943 A1 3/2010 Akiba et al.
2010/0277677 A1 11/2010 Nakamura et al.

FOREIGN PATENT DOCUMENTS

| | | |
|---|---|---|
| JP | 2007-148069 A | 6/2007 |
| JP | 2010-020097 A | 1/2010 |
| JP | 2010-066618 A | 3/2010 |
| WO | 2007/148519 A1 | 12/2007 |

* cited by examiner

FIG.1
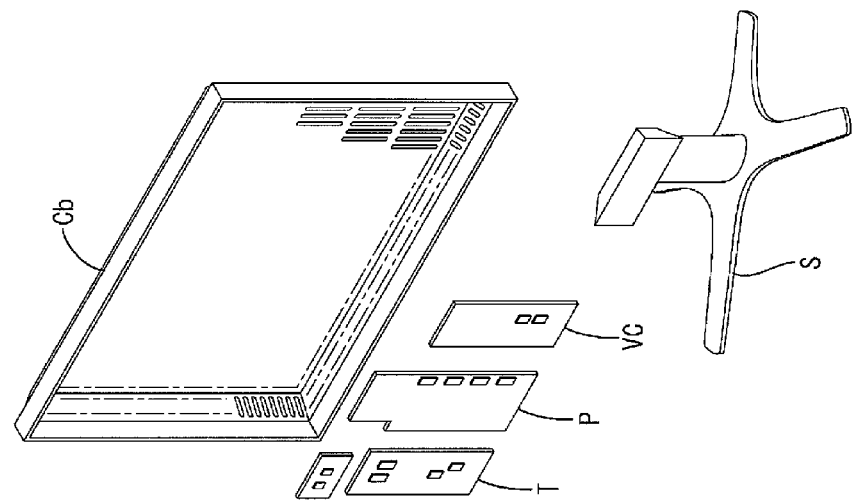
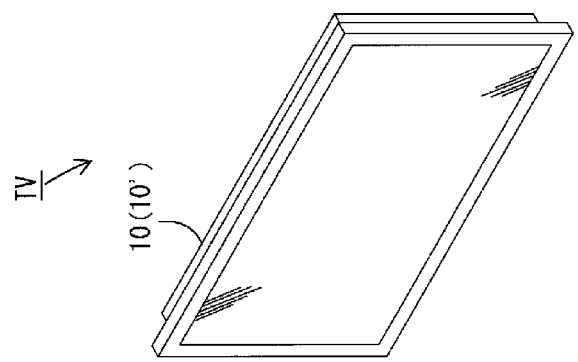
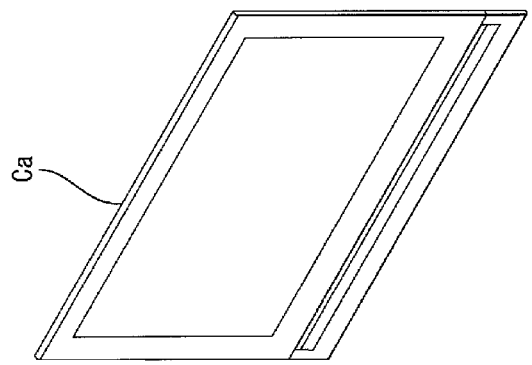

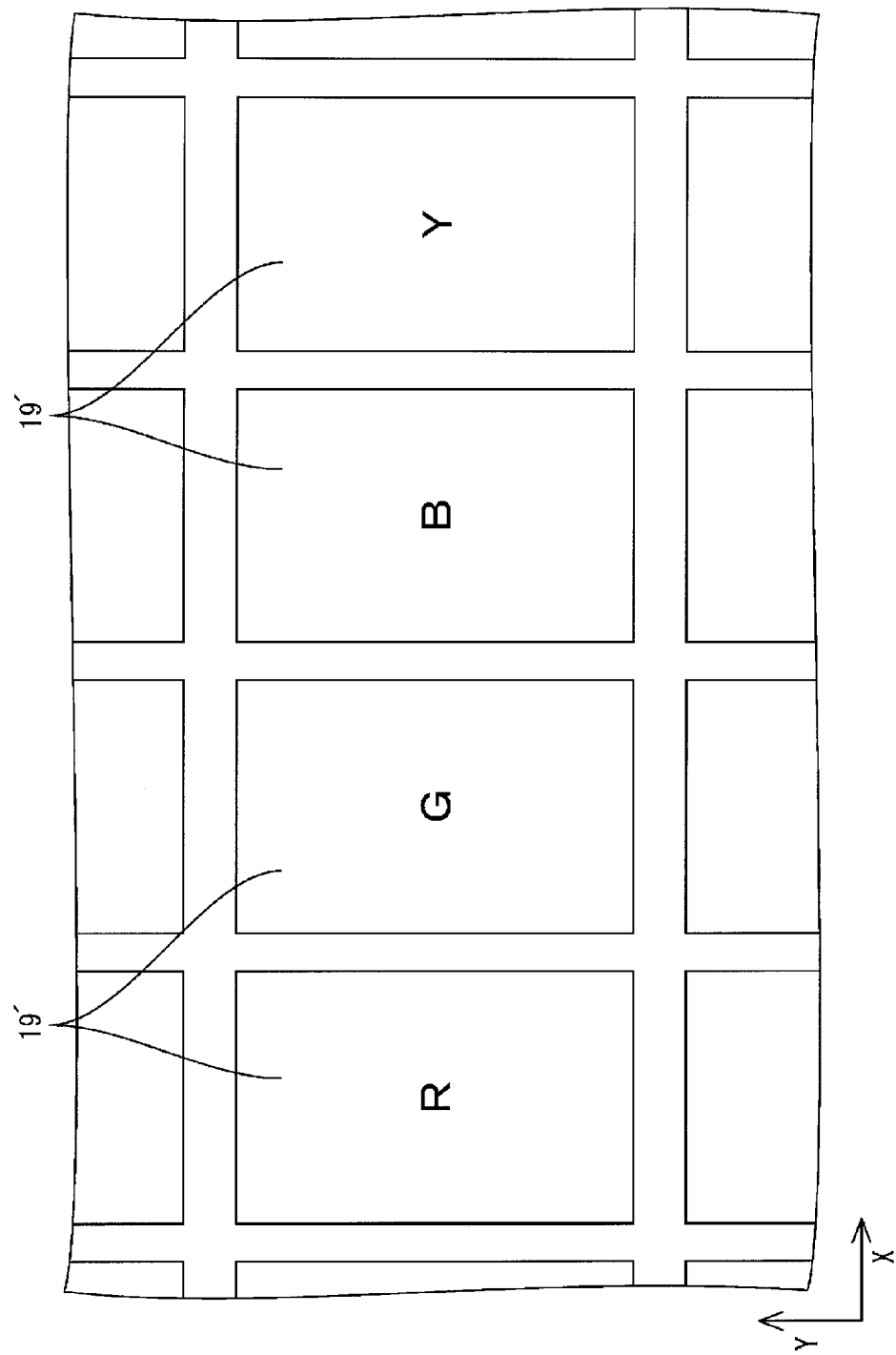

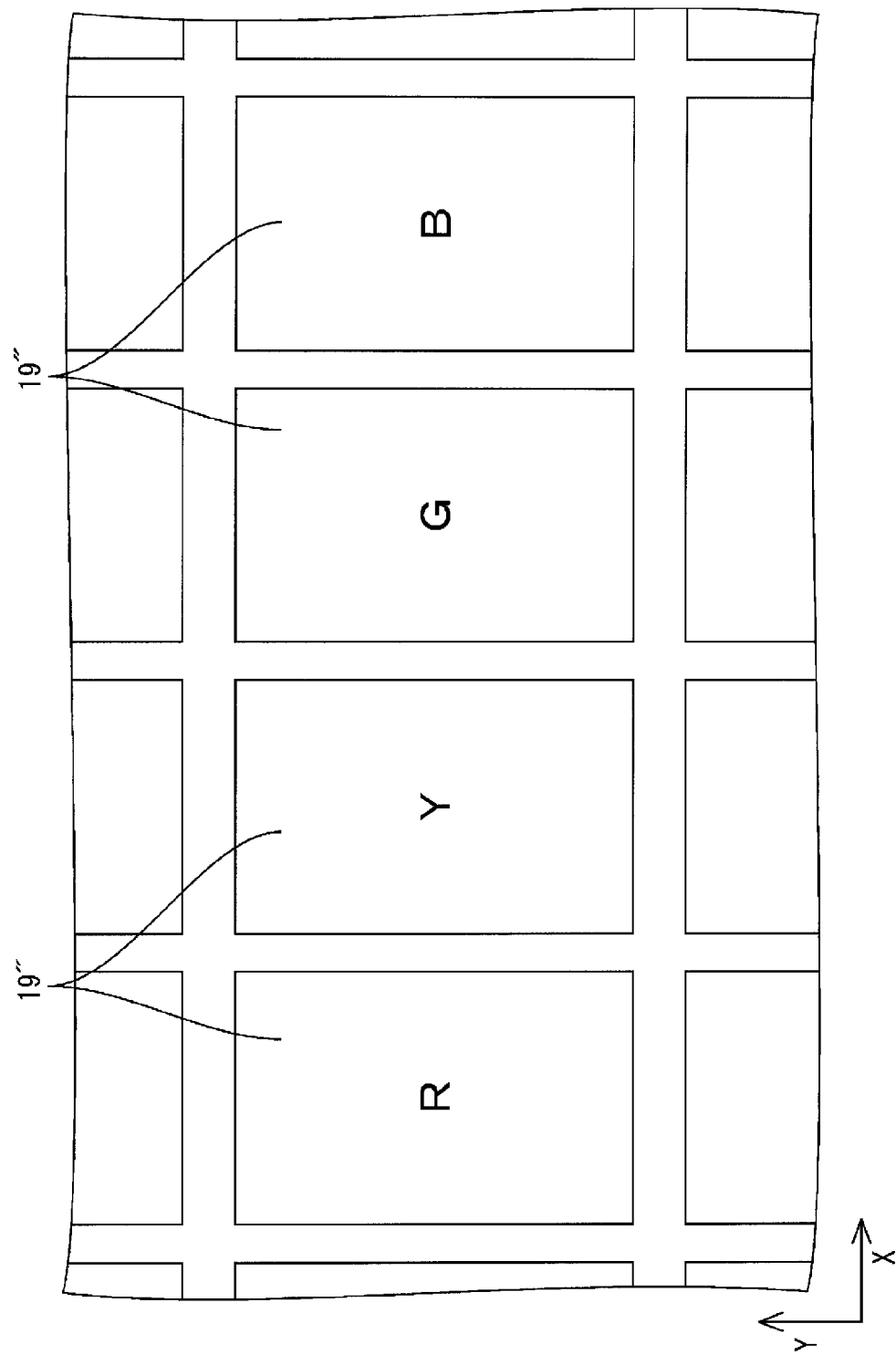

US 8,944,623 B2

DISPLAY DEVICE AND TELEVISION RECEIVER

TECHNICAL FIELD

The present invention relates to a display device and a television receiver.

BACKGROUND ART

Generally, a liquid crystal panel as a main component of a liquid crystal display device includes a pair of glass substrates between which liquid crystal is sealed in. One of the glass substrates is an array substrate on which active elements, such as TFTs, are provided. The other substrate is a CF substrate on which a color filter and the like are provided. On an inner surface of the CF substrate opposed to the array substrate, a color filter including a plurality of color sections corresponding to the respective colors of red, green, or blue is formed. The color sections are arranged side by side correspondingly to the respective pixels of the array substrate. Between the color sections, a light blocking layer preventing mixing of the colors is provided. Light emitted by a backlight and transmitted through the liquid crystal has its wavelength selectively transmitted through the corresponding red, green, or blue color section in the color filter such that an image can be displayed on the liquid crystal panel.

In order to enhance the display quality of the liquid crystal display device, it is effective to increase color reproducibility. For this purpose, an another color, such as cyan (green-blue), may be included in the color sections in the color filter, in addition to the red, green, and blue as the three primary colors of light. An example is described in the following Patent Document 1.

Patent Document 1: Japanese Unexamined Patent Publication No. 2006-58332

PROBLEM TO BE SOLVED BY THE INVENTION

However, when the different color is added to the color sections of the color filter in addition to the three primary colors of light as described above, the problem may arise that the display image tends to have tone with the added color. This may be avoided by correcting the chromaticity of the display image (output light) by controlling the driving of the respective TFTs corresponding to the pixels of the liquid crystal panel and thereby controlling the amount of transmitted light from the color sections. In this case, however, the amount of transmitted light tends to be decreased by the chromaticity correction, possibly resulting in a decrease in brightness.

In view of the above problem, the present inventor came to the following conclusion after a series of studies, namely that the chromaticity of the display image could be corrected without a decrease in brightness by adjusting the chromaticity of the light source of the backlight unit irradiating light onto the liquid crystal panel. However, there was still room for consideration as to what color other than cyan could be added to the liquid crystal panel of the multiple primary color type other than the three primary colors, and, in this case, there had not been sufficient consideration as to what light source was preferable as the light source for chromaticity adjustment.

DISCLOSURE OF THE PRESENT INVENTION

The present invention was made in view of the foregoing circumstances and an object of the present invention is to maintain high brightness of output light while ensuring sufficient color reproducibility in a liquid crystal display device.

Means for Solving the Problem

A display device according to the present invention includes a display panel including a pair of substrates and a substance provided between the substrates. The substance has optical characteristics that vary with application of an electric field. A lighting device is configured to irradiate light toward the display panel. One of the substrates of the display panel includes a color filter including a plurality of respective red, green, blue, and yellow color sections. The lighting device includes an LED as a light source. The color filter is configured such that the chromaticity of a blue color of output light obtained by passing light from the LED through the color sections in the color filter lies outside a common region of a NTSC chromaticity region according to a NTSC standard and a EBU chromaticity region according to a EBU standard in at least one of a CIE1931 chromaticity diagram and a CIE1976 chromaticity diagram.

Thus, the color filter is formed on one of the substrates in the display panel, and the color filter includes the yellow color section in addition to color sections of the three primary colors of light, i.e., red, green, and blue. Thus, the color reproduction range that the human eye can perceive, i.e., the color gamut, can be expanded, and also the color reproducibility for the object color in the natural world can be increased, thereby improved display quality can be obtained. In addition, the light through the yellow color section of the color sections included in the color filter has a wavelength close to the peak of luminosity factor. Therefore, such light tends to be perceived by the human eye as being bright, i.e., as having high brightness, even when the amount of energy of the light is small. Thus, sufficient brightness can be obtained even when the output of the light sources is restrained, reducing the electric power consumption by the light sources thereby to achieve superior environmental friendliness. In other words, the resulting high brightness can be utilized for providing a sharp sense of contrast, leading to further improvement in display quality.

On the other hand, when the yellow color section is included in the color filter, the output light from the display panel, i.e., the display image, tends to have yellowishness as a whole. In order to avoid this, the chromaticity of the display image may be corrected by adjusting the amount of transmitted light by controlling the electric field application with respect to each of the color sections. This technique, however, tends to decrease the amount of transmitted light as a result of chromaticity correction, possibly resulting in a decrease in brightness of output light. The present inventor came to the conclusion, after a series of studies, that the chromaticity of the display image can be corrected without a decrease in brightness of output light by adjusting the chromaticity of the light source used in the lighting device. In addition, according to the present invention, the LED is used as the light source. The LED, compared to other light sources such as cold cathode tube, can maintain relatively high brightness even when subjected to chromaticity adjustment in accordance with the display panel having the yellow color section for reasons such as, for example, good compatibility in spectral characteristics.

However, even in the case of the LED, when the chromaticity is adjusted in accordance with the display panel including the yellow color section, some decrease in brightness is virtually unavoidable, although not as much as in the case of other light sources such as the cold cathode tube. Thus, according to the present invention, on the premise that LED is used as the light source, the following configuration is adopted in order to prevent the decrease in brightness of the LED as a result of chromaticity adjustment while sufficient color reproducibility can be ensured. Namely, the color filter according to the present invention is configured such that the chromaticity of the blue color of the output light obtained by passing the light from the LED through the respective color sections in the color filter lies outside a common region of a NTSC chromaticity region according to a NTSC standard and a EBU chromaticity region according to a EBU standard in at least one of a CIE1931 chromaticity diagram and a CIE1976 chromaticity diagram. In this configuration, the common region is generally included in the chromaticity region belonging to the blue color of the output light, leading to sufficient color reproducibility. In setting of the color filter, the amount of transmitted light belonging to the blue color is increased as the chromaticity of the blue color of the output light lies closer to the common region, although this may result in a decrease in color reproducibility. Thus, the chromaticity of the LED does not need to be shifted toward blue for adjustment; in addition, an increase in brightness of the output light can be achieved because of an increase in the overall amount of transmitted light. Accordingly, the decrease in brightness of the LED due to chromaticity adjustment can be prevented, and high brightness of the output light can be maintained.

The "NTSC chromaticity region according to the NTSC standard" refers to a region within a triangle with the vertexes at the three points in which the values of (x, y) are (0.14, 0.08), (0.21, 0.71), and (0.67, 0.33) in the CIE1931 chromaticity diagram, or a region within a triangle with the vertexes at the three points in which the values of (u', v') are (0.0757, 0.5757), (0.1522, 0.1957), and (0.4769, 0.5285) in the CIE1976 chromaticity diagram.

The "EBU chromaticity region according to the EBU standard" refers to a region within a triangle with the vertexes at the three points in which the values of (x, y) are (0.15, 0.06), (0.3, 0.6), and (0.64, 0.33) in the CIE1931 chromaticity diagram, or a region within a triangle with the vertexes at the three points in which the values of (u', v') are (0.125, 0.5625), (0.1754, 0.1579), and (0.4507, 0.5229) in the CIE1976 chromaticity diagram.

The "common region" refers to a region within a quadrangle with the vertexes at the four points in which the values of (x, y) are (0.1579, 0.0884), (0.3, 0.6), (0.4616, 0.2317), and (0.64, 0.33) in the CIE1931 chromaticity diagram, or a region within a quadrangle with the vertexes at the four points in which the values of (u', v') are (0.125, 0.5625), (0.1686, 0.2125), (0.3801, 0.4293), and (0.4507, 0.5229) in the CIE1976 chromaticity diagram.

Preferable embodiments of the present invention may have the following configurations.

(1) The color filter may be configured such that the chromaticity of the blue color of the output light lies within the EBU chromaticity region in at least one of the CIE1931 chromaticity diagram and the CIE1976 chromaticity diagram. In setting of color filter, the amount of transmitted light belonging to the blue color tends to be increased and the chromaticity of the blue color of the output light tends to be shifted toward yellow as the chromaticity of the blue color of the output light lies closer to the common region. On the other hand, in the chromaticity region belonging to the blue color outside the common region, when the regions within and outside the EBU chromaticity region are compared, the former is relatively shifted toward yellow and the latter is relatively shifted toward blue. Thus, when the chromaticity of the blue color of the output light is set to lie outside the common region and within the EBU chromaticity region, the amount of transmitted light belonging to the blue color can be relatively increased, compared to the case where the chromaticity lies outside the common region and outside the EBU chromaticity region. Thus, the decrease in brightness of the LED, which may be caused as a result of chromaticity adjustment of the LED, can be more preferably suppressed, and the brightness of the output light can be further increased.

The "region outside the common region and within the EBU chromaticity region" refers to a region within a triangle with the vertexes at the three points in which the values of (x, y) are (0.15, 0.06), (0.1579, 0.0884), and (0.4616, 0.2317) in the CIE1931 chromaticity diagram, or a region within a triangle with the vertexes at the three points in which the values of (u', v') are (0.1686, 0.2125), (0.1754, 0.1579), and (0.3801, 0.4293) in the CIE1976 chromaticity diagram.

(2) The color filter may be configured such that the chromaticity of the blue color of the output light lies outside the EBU chromaticity region in at least one of the CIE1931 chromaticity diagram and the CIE1976 chromaticity diagram. In setting of the color filter, the chromaticity region belonging to the blue color of the output light is expanded and the chromaticity of the blue color of the output light tends to be shifted toward blue as the chromaticity of the blue color of the output light lies farther from the common region. On the other hand, in the chromaticity region belonging to the blue color outside the common region, when regions within and outside the EBU chromaticity region are compared, the former is relatively shifted toward yellow while the latter is relatively shifted toward blue. Thus, when the chromaticity of the blue color of the output light is set to lie outside each of the common region and the EBU chromaticity region, the chromaticity region belonging to the blue color of the output light is more expanded, compared to the case where the chromaticity lies outside the common region and within the EBU chromaticity region. Therefore, excellent color reproducibility can be obtained.

(3) The color filter may be configured such that the chromaticity of the blue color of the output light has y value of 0.059 or higher in the CIE1931 chromaticity diagram. In this way, because the amount of transmitted light belonging to the blue color tends to be increased as the y value is increased from 0.059 (i.e., lies closer to the common region) in the CIE1931 chromaticity diagram, the decrease in brightness of the LED, which may be caused as a result of chromaticity adjustment of the LED, can be more preferably suppressed, and the brightness of the output light can be further increased. The coordinates where the y value is 0.059 in the CIE1931 chromaticity diagram lie outside each of the NTSC and EBU chromaticity regions.

(4) The color filter may be configured such that the chromaticity of the blue color of the output light has v' value of 0.155 or higher in the CIE1976 chromaticity diagram. In this way, because the amount of transmitted light belonging to the blue color tends to be increased as the v' value is increased from 0.155 (i.e., lies closer to the common region) in the CIE1976 chromaticity diagram, the decrease in brightness of the LED, which may be caused by the chromaticity adjustment of the LED, can be more preferably suppressed, and the brightness of the output light can be further increased. The coordinates where the v' value is 0.155 in the CIE1976 chromaticity diagram lie outside each of the NTSC and EBU chromaticity regions.

(5) The blue color section may have a smaller film thickness in comparison to each of the red and green color sections. When the film thickness of the blue color section is thus smaller in comparison to the film thickness of the red or green color section, the amount of transmitted light belonging to the blue color is increased in comparison to the case where all the blue, red, and green color sections have the same film thickness, although the chromaticity region belonging to the blue color of the output light may be decreased. Thus, the decrease in brightness of the LED, which may be caused as a result of chromaticity adjustment of the LED, can be more preferably suppress, and the brightness of the output light can be further increased.

(6) The red and green color sections may have substantially the same film thickness. In this way, with regard to the red and green color sections, the electrostatic capacity formed between the substrates can be made substantially the same. Therefore, the optical characteristics of the substance between the substrates can be easily controlled by application of an electric field. Thus, the optical transmittance through the red or green color section can be easily controlled, leading to simplified circuit design of the display panel.

(7) The yellow color section may have substantially the same film thickness as each of the red and green color sections. In this way, with regard to the yellow color section as well as the red and green color sections, the electrostatic capacity formed between the substrates becomes substantially the same, leading to further simplified circuit design of the display panel.

(8) The color sections may include pigment dispersed therein, and the blue color section may have a lower pigment concentration than each of the red and green color sections. Namely, the concentration of the pigment contained in the blue color section may be lower in comparison to the concentration of pigment contained in the red or green color section. The chromaticity region belonging to the blue color of the output light may decrease in comparison to the configuration in which each of the blue, red, and green color sections have the same pigment concentration. However, the amount of transmitted light belonging to the blue color increases. Thus, the decrease in brightness of the LED, which may be caused as a result of chromaticity adjustment of the LED, can be more preferably suppressed, and the brightness of the output light can be further increased.

(9) The color sections may have substantially the same film thickness. In this way, the electrostatic capacity formed between the substrates becomes substantially the same among all the color sections in the color filter. Thus, the optical characteristics of the substance provided between the substrates can be more easily controlled by application of an electric field. Thus, the optical transmittance through each of the color sections can be more easily controlled, leading to extremely simplified circuit design of the display panel.

(10) The lighting device may further include a light guide member with an end portion in an opposed manner with respect to the LED. The light guide member may guide the light from the LED such that the light travels toward the display panel. In the edge light lighting device with the light guide member, compared to the direct lighting device, the optical path length of the light emitted from the LED to the display panel is long, and absorption of light may be caused as the light travels in the light guide member, possibly resulting in a decrease in brightness. In addition, the light guide member generally has yellowishness, although slight. Thus, when the light from the LED is passed through the light guide member, the resultant transmitted light tends to have yellowishness. As a result, the display panel including the yellow color section is irradiated with the yellowish light. Therefore, in order to correct the chromaticity of the display image, the chromaticity of the LED needs to be adjusted further toward blue, possibly resulting in a greater decrease in brightness as a result of chromaticity adjustment. In this respect, according to the present invention, the decrease in brightness as a result of chromaticity adjustment of the LED can be effectively suppressed for the reasons described above. Therefore, high brightness of the output light can be preferably maintained.

On the other hand, when the chromaticity of the LED is adjusted in view of the presence of the light guide member, the color purity of the blue color of the output light from the display panel tends to be decreased compared to the direct type. Thus, when the film thickness or pigment concentration of the blue color section is decreased, the chromaticity of the blue color of the output light lies relatively close to the common region in the edge light type, compared to the direct type. This means that the chromaticity of the blue color of the output light can lie closer to the common region without decreasing the film thickness or pigment concentration of the blue color section so much. The brightness tends to be increased as the chromaticity of the blue color of the output light lies closer to the common region. Thus, in the lighting device with the light guide member according to the present invention, a sufficient brightness increasing effect can be obtained without decreasing the film thickness or pigment concentration of the blue color section so much.

(11) The film thickness of the blue color section may be in the range of 60% to 90% of the film thickness of each of the red and green color sections. If the film thickness ratio of the blue color section to the red or green color section is less than 60%, the chromaticity of the blue color of the output light may be too close to the common region, possibly adversely affecting the color reproducibility. On the other hand, if the film thickness ratio is more than 90%, the difference in film thickness between the red or green color section and the blue color section is too small, such that the increase in the amount of transmitted light belonging to the blue color becomes very small and a sufficient effect may not be obtained. In this respect, by setting the film thickness ratio in the range of 60% to 90% according to the present invention, sufficient color reproducibility can be ensured and the amount of transmitted light belonging to the blue color can be sufficiently increased. Therefore, the decrease in brightness as a result of chromaticity adjustment of the LED can be preferably suppressed.

(12) The film thickness of the blue color section may be in the range of 61.8% to 85.8% of the film thickness of each of the red and green color section. By thus setting the film thickness ratio of the of the blue color section to the red or green color section in the range of 61.8% to 85.8%, sufficient color reproducibility can be ensured and the amount of transmitted light belonging to the blue color can be more sufficiently increased. Therefore, the decrease in brightness as a result of chromaticity adjustment of the LED can be more preferably suppressed.

(13) The film thickness of each of the red and green color sections may be 2.1 μm and the film thickness of the blue color section may be in the range of 1.3 μm to 1.8 μm. By thus setting the film thickness for the red, green, and blue color sections respectively, sufficient color reproducibility can be ensured and the amount of transmitted light belonging to the blue color can be more sufficiently increased. Thus, the decrease in brightness as a result of chromaticity adjustment of the LED can be more preferably suppressed.

(14) The film thickness of the blue color section may be 1.3 μm. In this way, extremely high brightness can be obtained while sufficient color reproducibility is ensured.

(15) The film thickness of the blue color section may be 1.8 μm. In this way, extremely good color reproducibility can be obtained while sufficient brightness is ensured.

(16) The light guide member may include an elongated light entrance surface on the end portion on the LED side. The LED may include a lens member that covers the light output side of the LED to diffuse light. The lens member may be opposite the light entrance surface of the light guide member. The lens member may be curved with respect to the longitudinal direction of the light entrance surface and toward the light guide member. In this way, the light emitted by the LED is caused to spread by the lens member in the longitudinal direction of the light entrance surface to reduce dark portions that could be formed at the light entrance surface of the light guide member. Thus, even when the distance between the LED and the light guide member is short and the number of the LED is small, light with uniform brightness can enter on over the entire light entrance surface of the light guide member.

(17) The lighting device may further include a reflection sheet between the LED and the light guide member along the longitudinal direction of the light entrance surface. In this way, the light scattered from the lens member outside the light guide member can be reflected by the reflection sheet to enter on the light guide member. Thus, the entrance efficiency of the light from the LED on the light guide member can be increased.

(18) The light guide member may be made of a substance with a refractive index higher than one of air. In this way, the light entering into the light guide member from the LED can be efficiently caused to travel toward the display panel.

(19) The lighting device may further include a chassis that houses the LED and an optical member. The chassis may include a bottom portion on a side opposite to a light output side with respect to the LED. The optical member is disposed on the light output side and opposite the bottom portion and the LED. In this way, the light emitted from the LED can be irradiated onto the optical member disposed on the light output side and opposite the bottom portion and the LED, and then output via the optical member toward the display panel. In this so-called direct lighting device, compared to the edge light lighting device, the optical path length of the light emitted from the LED to the display panel is relatively short due to the absence of the light guide member. Therefore, the amount of light that reaches the display panel is relatively increased. In addition, the light from the LED reaches the display panel without passing through the light guide member to be prevented from becoming yellowish. Thus, the decrease in brightness of the LED as a result of chromaticity adjustment can be relatively suppressed. Accordingly, in the direct lighting device, the brightness of the output light can be relatively increased compared to the edge light lighting device.

On the other hand, in the direct lighting device according to the present invention, compared to the edge light lighting device, there is no need to adjust the chromaticity of the LED in view of the presence of the light guide member. Thus, the color purity of the blue color of the output light from the display panel tends to be increased compared to the edge light type. As a result, when the film thickness or pigment concentration of the blue color section is decreased, the chromaticity of the blue color of the output light lies relatively far from the common region in the direct type compared to the edge light type. This means that the chromaticity of the blue color of the output light can be maintained outside the common region even when the film thickness or pigment concentration of the blue color section is smaller than in the edge light type. Thus, the effect of increasing the brightness of the output light by decreasing the film thickness or pigment concentration of the blue color section can be more preferably obtained. Therefore, extremely high brightness can be obtained while sufficient color reproducibility is ensured.

(20) The film thickness of the blue color section may be in the range of 50% to 90% of the film thickness of each of the red and green color sections. If the film thickness ratio of the blue color section to the red or green color section is less than 50%, the chromaticity of the blue color of the output light may be too close to the common region, possibly adversely affecting the color reproducibility. This also results in too much discrepancy in the electrostatic capacity formed between the substrates between the red or green color section and the blue color section, possibly hindering appropriate control of the optical characteristics of the substance between the substrates by application of an electric field. On the other hand, if the film thickness ratio is larger than 90%, the difference in film thickness between the red or green color section and the blue color section becomes too small. Thus, the increase in the amount of transmitted light belonging to the blue color becomes very small such that a sufficient effect may not be obtained. In this respect, by setting the film thickness ratio in the range of 50% to 90% according to the present invention, sufficient color reproducibility can be ensured, the optical characteristics of the substance between the substrates can be appropriately control by application of an electric field, and the amount of transmitted light belonging to the blue color can be sufficiently increased. Accordingly, the decrease in brightness of the LED as a result of chromaticity adjustment can be preferably suppressed.

(21) The film thickness of the blue color section may be in the range of 57.1% to 85.8% of the film thickness of each of the red and green color sections. By thus setting the film thickness ratio of the blue color section to the red or green color section in the range of 57.1% to 85.8%, sufficient color reproducibility can be ensured, the optical characteristics of the substance between the substrates can be more appropriately controlled by application of an electric field, and the amount of transmitted light belonging to the blue color can be sufficiently increased. Thus, the decrease in brightness of the LED as a result of chromaticity adjustment can be more preferably suppressed.

(22) The red and green color sections may have the same film thickness of 2.1 µm, while the film thickness of the blue color section may be in the range of 1.2 µm to 1.8 µm. By thus setting the film thickness of the red, green, and blue color sections respectively, sufficient color reproducibility can be ensured, the optical characteristics of the substance provided between the substrates can be more appropriately controlled by application of an electric field, and the amount of transmitted light belonging to the blue color can be sufficiently increased. Accordingly, the decrease in brightness of the LED as a result of chromaticity adjustment can be more preferably suppressed.

(23) The color section exhibiting blue may have the film thickness of 1.2 µm. In this way, extremely high brightness can be obtained while sufficient color reproducibility is ensured.

(24) The color section exhibiting blue may have the film thickness of 1.8 µm. In this way, extremely good color reproducibility can be obtained while sufficient brightness is ensured.

(25) The LED may further include a diffuser lens on the light output side to diffuse the light from the LED. In this way, the light emitted from the LED can be output while being diffused by the diffuser lens. Thus, unevenness in the output light does not easily occur. Thus, the number of the LEDs installed can be decreased, resulting in cost reduction.

(26) The color filter may be configured such that the chromaticity of a red color of the output light lies within the common region in at least one of the CIE1931 chromaticity diagram and the CIE1976 chromaticity diagram. In this way, because the chromaticity of the red color of the output light is set to lie within the common region, the amount of transmitted light belonging to the red color is increased compared to the case where the chromaticity of the red color of the output light is set to lie outside the common region, and the overall amount of transmitted light is also increased. Thus, the brightness of the output light can be increased.

(27) The red color section may have a smaller film thickness in comparison to each of the blue and green color sections. By thus making the film thickness of the red color section smaller in comparison to the film thickness of the blue or green color section, the amount of transmitted light belonging to the red color is increased in comparison to the case where the red, blue, and green color sections have the same film thickness, although the chromaticity region belonging to the red color of the output light may be decreased. Thus, the brightness of the output light can be increased.

(28) The color filter may be configured such that the chromaticity of the red color of the output light lies outside the common region in at least one of the CIE1931 chromaticity diagram and the CIE1976 chromaticity diagram. In this way, because the chromaticity of the red color of the output light is set to lie outside the common region, the chromaticity region belonging to the red color of the output light is expanded compared to the case where the chromaticity of the red color of the output light is set to lie within the common region. Thus, color reproducibility can be increased.

(29) The red color section may have a larger film thickness in comparison to each of the blue and green color sections. By thus setting the film thickness of the red color section larger in comparison to the film thickness of the blue or green color section, the chromaticity region belonging to the red color of the output light is expanded compared to the case where the red, blue, and green color sections have the same film thickness, although the amount of transmitted light belonging to the red color may be decreased. Thus, high color reproducibility can be obtained.

(30) The color filter may be configured such that the chromaticity of a green color of the output light lies outside the common region in at least one of the CIE1931 chromaticity diagram and the CIE1976 chromaticity diagram. In this way, because the chromaticity of the green color of the output light is set to lie outside the common region, the chromaticity region belonging to the green color of the output light is expanded compared to the case where the chromaticity of the green color of the output light is set to lie within the common region. Thus, color reproducibility can be increased.

(31) The color filter may be configured such that the chromaticity of a yellow color of the output light lies outside the common region in at least one of the CIE1931 chromaticity diagram and the CIE1976 chromaticity diagram. In this way, because the chromaticity of the yellow color of the output light is set to lie outside the common region, the chromaticity region belonging to the yellow color of the output light is expanded compared to the case where the chromaticity of the yellow color of the output light is set to lie within the common region. Thus, color reproducibility can be increased.

(32) The color sections may have substantially the same film thickness. In this way, when the color sections have the same area, the color sections with the same area have substantially the same electrostatic capacity formed between the substrates. Thus, the optical characteristics of the substance between the substrates can be more easily controlled by application of an electric field. Thus, the optical transmittance through the color sections can be easily controlled. Therefore, the circuit design of the display panel can be extremely simplified while high color reproducibility is obtained.

(33) Of the color sections, each of the blue and red color sections may have a relatively large area compared to each of the yellow and green color sections. In this way, the transmitted light through the color filter of the display panel tends to have a relatively large amount of each of blue light and red light compared to each of yellow light and green light. Namely, the color filter is configured such that a relatively large amount of blue light as the complementary color to yellow light is transmitted than yellow light. Therefore, the display image is prevented from having yellowishness. As a result, the chromaticity of the LED does not need to be shifted toward blue for correcting the chromaticity of the display image. Therefore, the decrease in brightness of the LED as a result of chromaticity adjustment can be preferably suppressed. When the number of the color sections is changed to four colors from three colors, the number of sub-pixels constituting each pixel is increased from three to four. Thus, the area of individual sub-pixels is decreased, which may possibly cause a decrease in the color lightness of red light in particular. In this respect, according to the present invention, the color filter is configured to transmit a relatively large amount of red light compared to yellow light or green light, so that the decrease in color lightness of red light, which may be caused by the four-color display panel, can be suppressed. Accordingly, the brightness of the output light as a whole can be increased.

(34) The area ratio may be 1.6. By thus setting the area ratio of the blue or red color section to the yellow or green color section at 1.6, the brightness of the output light can be made extremely high. In the display panel according to the present invention, the optical characteristics of the substance between the pair of substrates vary by application of an electric field to control the optical transmittance through the color sections. If the area ratio is larger than 1.6, the control of the transmittance may become difficult. In this respect, according to the present invention, by setting the area ratio at 1.6, the optical transmittance through the color sections can be appropriately controlled. Thus, the display panel can be advantageously designed.

(35) The blue and red color sections may have the same area. In this way, the electrostatic capacity formed between the substrates can be made substantially the same between the blue and red color sections. Therefore, the optical characteristics of the substance formed between the substrates can be more easily controlled by application of an electric field. Thus, the optical transmittance through the blue or red color section can be more easily controlled, leading to an extremely simplified circuit design of the display panel with high brightness.

(36) The yellow and green color sections may have the same area. In this way, the electrostatic capacity formed between the substrates can be made substantially the same between the yellow and green color sections. Therefore, the optical characteristics of the substance between the substrates can be more easily controlled by application of an electric field. Thus, the optical transmittance through the yellow or green color section can be easily controlled, leading to an extremely simplified circuit design of the display panel with high brightness.

(37) The chromaticity region of the output light may occupy 70% or more of the NTSC chromaticity region. In this way, sufficient color reproducibility in displaying an image can be ensured, and good display quality can be obtained.

(38) The display panel may be a liquid crystal panel including liquid crystal as the substance. The optical characteristics of which vary with application of an electric field. In this way, the display panel can be used for various purposes, such as for television or personal computer displays, particularly for large screens.

In order to solve the problem, a television receiver according to the present invention includes the display device and a reception unit configured to receive a television signal.

According to the television receiver, the display device that displays a television image on the basis of the television signal is configured to appropriately correct the chromaticity of the display image while high brightness is obtained. Therefore, excellent display quality of the television image can be obtained.

In addition, the television receiver may include an image conversion circuit converting the television image signal output from the reception unit into an image signal for the respective colors of red, green, blue, or yellow. Thus, the television image signal is converted by the image conversion circuit into the image signals for respective colors of the red, green, blue, and yellow corresponding to the respective color sections R, G, B, and Y included in the color filter. Therefore, the television image can be displayed with high display quality.

Advantageous Effect of the Invention

According to the present invention, high brightness of the output light can be maintained while sufficient color reproducibility is ensured.

BRIEF DESCRIPTION OF THE DRAWINGS

FIG. 1 is a an exploded perspective view illustrating a schematic configuration of a television receiver according to the first embodiment of the present invention;

FIG. 38 is an enlarged plan view showing a planar configuration of the CF substrate according to another embodiment (4) of the present invention; and FIG. 39 is an enlarged plan view showing a planar configuration of the CF substrate according to another embodiment (5) of the present invention.

BEST MODE FOR CARRYING OUT THE INVENTION

First Embodiment

Figure 2:
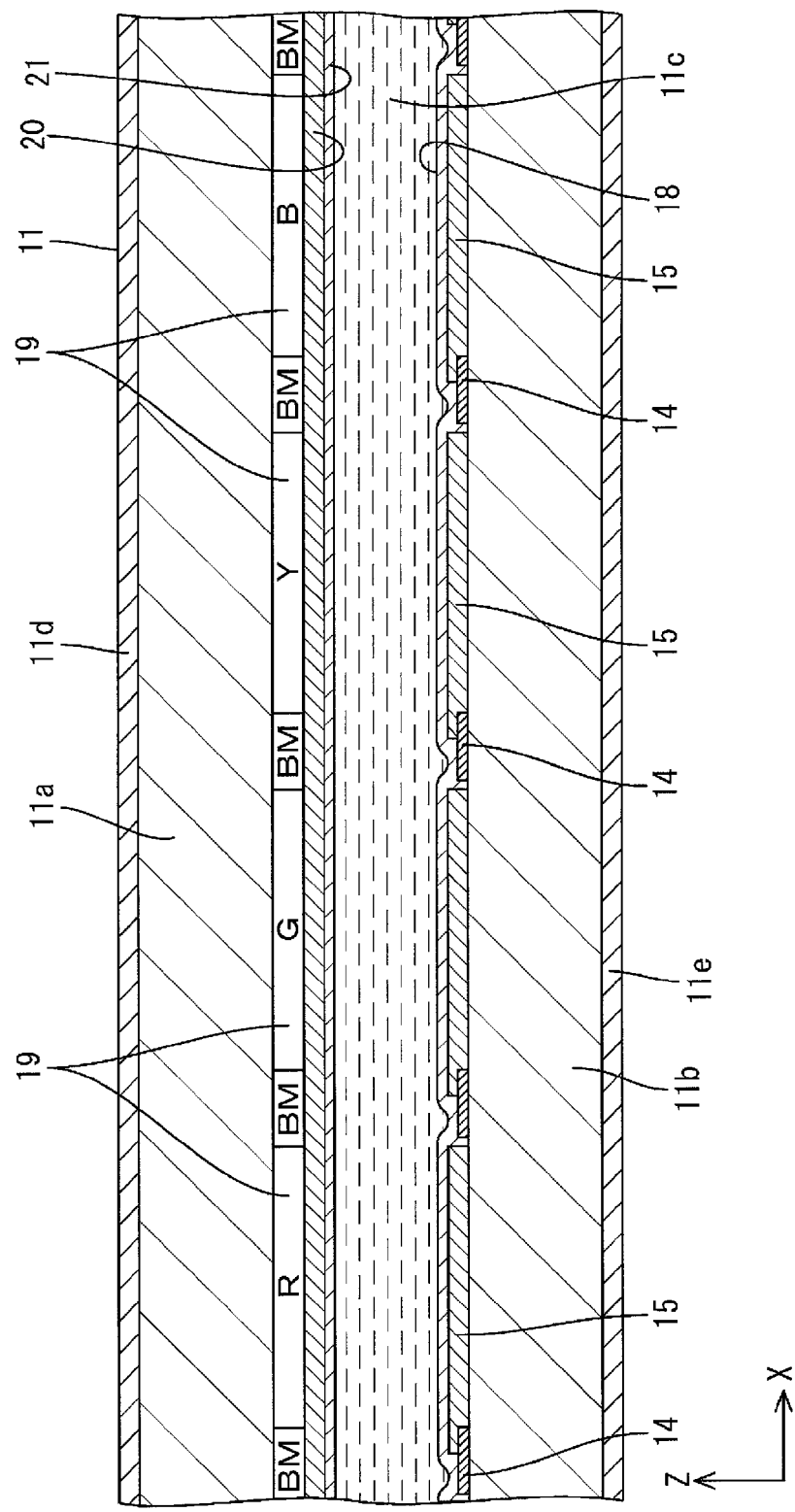
FIG. 2 is a cross sectional view illustrating a cross sectional configuration of a liquid crystal panel along a long side direction (cross sectional configuration of the color sections according to the first and the twelfth examples)

A first embodiment of the present invention will be described with reference to FIGS. 1 to 25. According to the present embodiment, two types of liquid crystal display devices 10 and 10' with different backlight units 12 and 40 will be described by way of example. In some parts of the drawings, an X-axis, a Y-axis, and a Z-axis are shown as the respective axial directions corresponding to the directions shown in the respective drawings. The upper side and the lower side shown in FIGS. 6, 7, 11, and 12 correspond to the front side and the rear side, respectively.

A television receiver TV according to the present embodiment, as shown in FIG. 1, includes the liquid crystal display device 10 (10') as display devices; front and rear cabinets Ca and Cb housing the liquid crystal display device 10 in a sandwiching manner; a power supply circuit board P supplying electric power; a tuner (reception unit) T configured to receive a television image signal; an image conversion circuit board VC converting the television image signal output from the tuner T into an image signal for the liquid crystal display device 10 (10'); and a stand S. The liquid crystal display device 10 (10') as a whole has a horizontally long (elongated) square shape (rectangular shape). The liquid crystal display device 10 (10') is housed with its long side direction and short side direction substantially aligned with the horizontal direction (X-axis direction) and the vertical direction (Y-axis direction; perpendicular direction), respectively. As the two types of liquid crystal display devices 10 and 10', the liquid crystal display device 10 (FIGS. 5 to 8) may be provided with a so-called "edge light" backlight unit 12, and the liquid crystal display device 10' (FIGS. 9 to 12) may be provided with a so-called "direct" backlight unit 40.

In the two types of liquid crystal display devices 10 and 10', a liquid crystal panel 11 is used as a display panel. The liquid crystal panel 11 will be described in detail. The liquid crystal panel 11 as a whole has a horizontally long (elongated) square shape (rectangular shape). As shown in FIG. 2, the liquid crystal panel 11 includes a pair of transparent (light transmissive) glass substrates 11a and 11b, and a liquid crystal layer 11c between the substrates 11a and 11b. The liquid crystal layer 11c includes liquid crystal. The liquid crystal is a substance whose optical characteristics vary by application of an electric field. The substrates 11a and 11b are affixed to each other with a sealing agent, which is not shown, with a gap corresponding to the thickness of liquid crystal layer 11c maintained between the substrates. To the outer surfaces of the substrates 11a and 11b, polarizing plates 11d and 11e, respectively, are affixed. The liquid crystal panel 11 has a long side direction and a short side direction aligned with the X-axis direction and the Y-axis direction, respectively.

Figure 3:
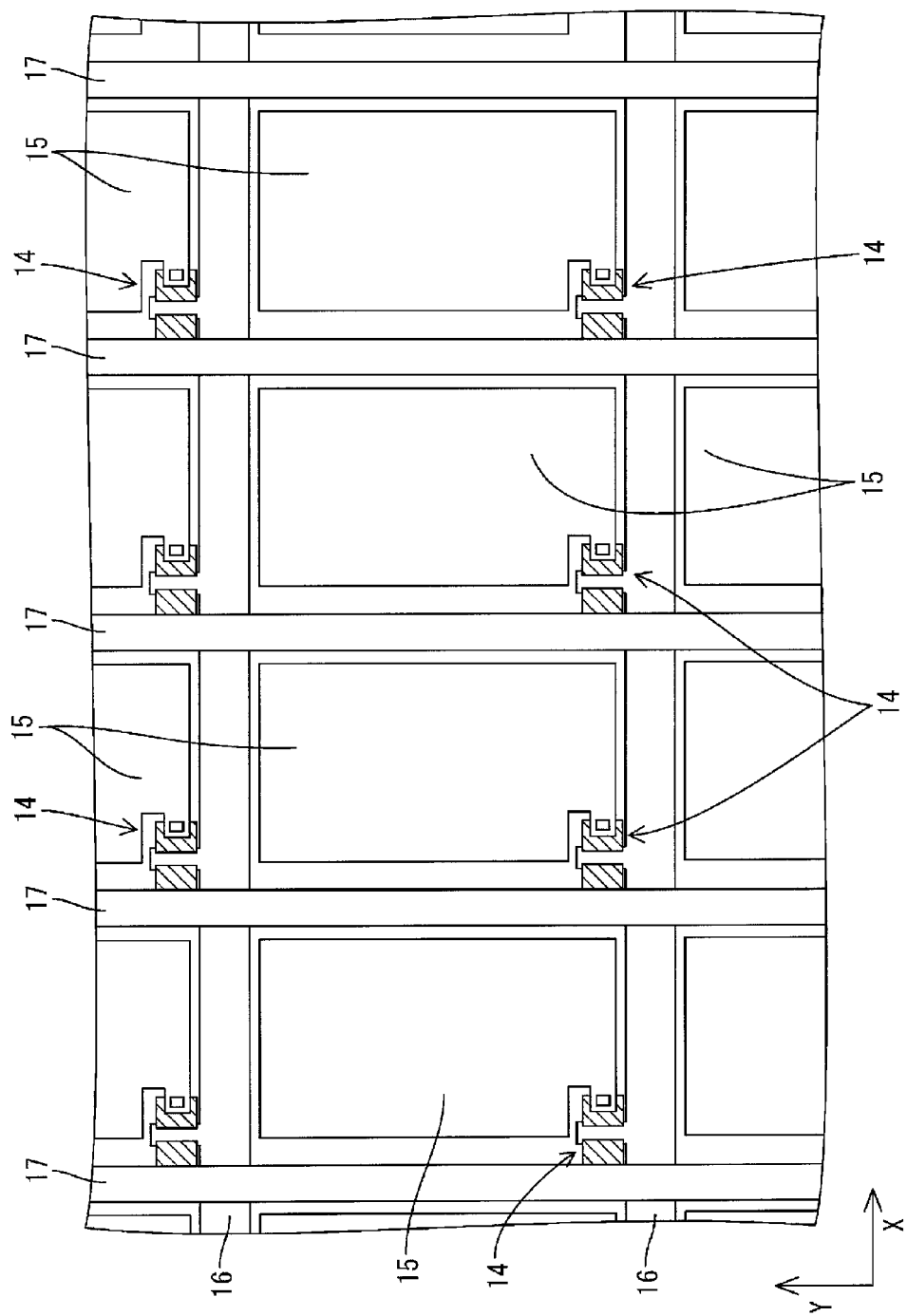
FIG. 3 is an enlarged plan view illustrating a planar configuration of an array substrate.

The front side (front surface side) one of the substrates 11a and 11b is a CF substrate 11a, and the rear side (back surface side) one of the substrates 11a and 11b is an array substrate 11b. On an inner surface of the array substrate 11b, i.e., the surface facing the liquid crystal layer 11c (or opposed to the CF substrate 11a), as shown in FIG. 3, a number of TFTs (Thin Film Transistors) 14 and pixel electrodes 15 as switching elements are disposed side by side in a matrix (rows and columns). Around the TFTs 14 and the pixel electrodes 15, gate wires 16 and source wires 17 are disposed in a lattice shape. The pixel electrodes 15 have a vertically long (elongated) square shape (rectangular shape) with a long side direction and a short side direction aligned with the Y-axis direction and the X-axis direction, respectively. The pixel electrodes 15 may be transparent electrodes of ITO (Indium Tin Oxide) or ZnO (Zinc Oxide). The gate wires 16 and the source wires 17 are connected to the gate electrodes and the source electrodes of the TFTs 14, respectively. The pixel electrodes 15 are connected to the drain electrodes of the TFTs 14. On the side of the TFTs 14 and the pixel electrodes 15 facing the liquid crystal layer 11c, as shown in FIG. 2, an alignment film 18 aligning the liquid crystal molecules is disposed. At the ends of the array substrate 11b, terminal portions drawn out from the gate wires 16 and the source wires 17 are formed. To the terminal portions, a driver IC, which is not shown, driving the liquid crystal is crimped via an anisotropic conductive film (ACF). The liquid crystal driving driver IC is electrically connected to a display control circuit board, which is not shown, via various wiring substrates and the like. The display control circuit board is connected to the image conversion circuit board VC of the television receiver TV to supply a drive signal via the driver IC to the wires 16 and 17 on the basis of an output signal from the image conversion circuit board VC.

Figure 4:
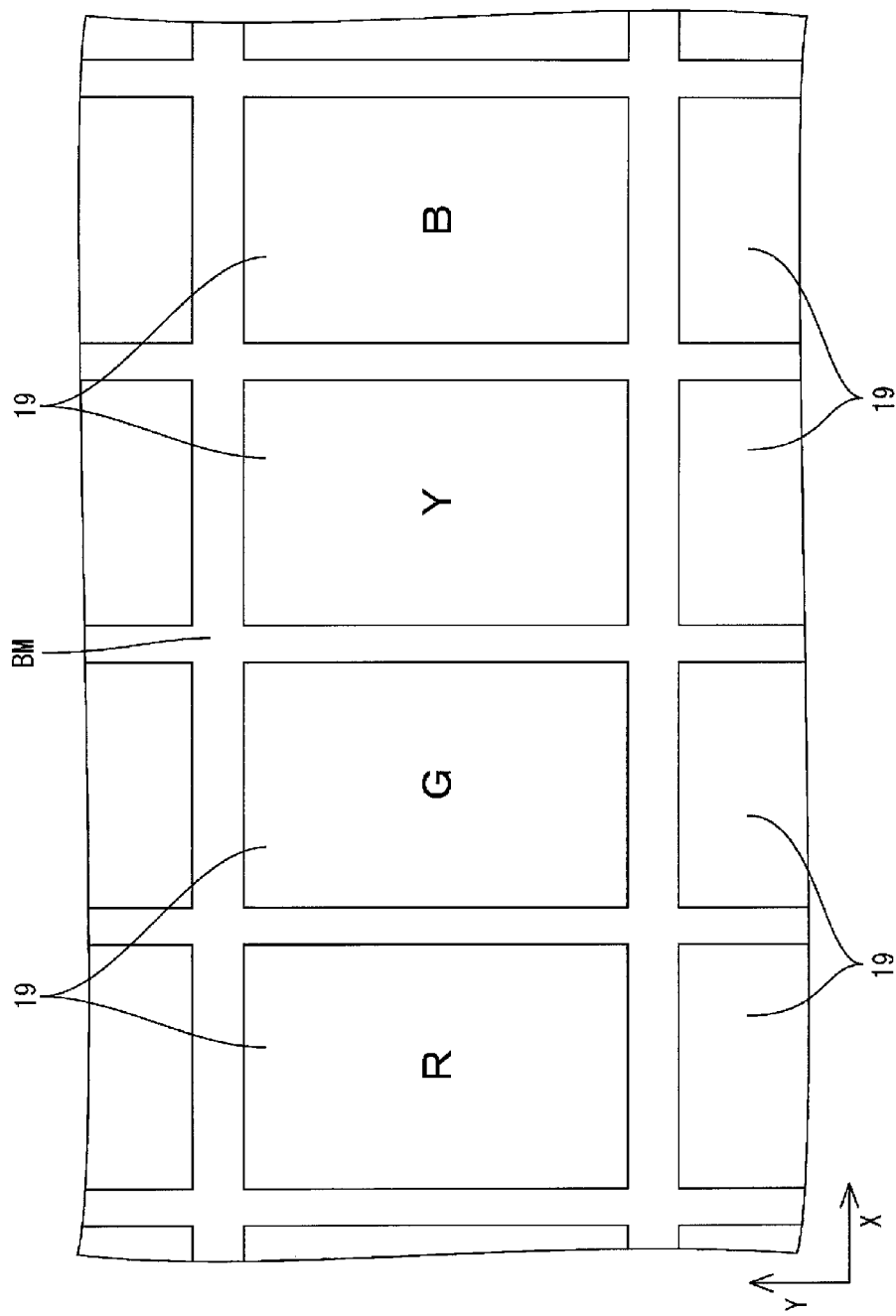
FIG. 4 is an enlarged plan view illustrating a planar configuration of a CF substrate.

On the inner surface of the CF substrate 11a, i.e., on the surface facing the liquid crystal layer 11c (or opposed to the array substrate 11b), as shown in FIG. 4, a color filter 19 including a plurality of each of color sections R, G, B, or Y arranged in a matrix (rows and columns) corresponding to the respective pixels on the array substrate 11b is disposed. According to the present embodiment, the color filter 19 includes a yellow color section Y in addition to the red color section R, the green color section G, and the blue color section B as the three primary colors of light. The respective color sections R, G, B, and Y selectively transmit light of the respective corresponding colors (respective wavelengths). The color sections R, G, B, and Y have a vertically long (elongated) square shape (rectangular shape) similar to the pixel electrodes 15, with their long side direction and short side direction aligned with the Y-axis direction and the X-axis direction, respectively. Between the color sections R, G, B, and Y, a lattice-shaped light blocking layer (black matrix) BM is provided for preventing the mixing of colors. On the side of the color filter 19 on the CF substrate 11a facing the liquid crystal layer 11c, as shown in FIG. 2, a counter electrode 20 and an alignment film 21 are layered in order.

Thus, according to the present embodiment, the liquid crystal display devices 10 and 10' has the liquid crystal panel 11 with the color filter 19 including the four color sections R, G, B, and Y. For this reason, the television receiver TV includes the dedicated image conversion circuit board VC. The image conversion circuit board VC is configured to convert the television image signal output from the tuner T into an image signal for the respective colors of blue, green, red, or yellow to output the image signal generated for the respective colors to the display control circuit board. On the basis of the image signals, the display control circuit board drives the TFTs 14 corresponding to the respective colors of the pixels on the liquid crystal panel 11 via the wires 16 and 17 to appropriately control the amount of light transmitted through the color section R, G, B, or Y for the respective colors.

Next, a configuration of the edge light backlight unit 12 and a configuration of the direct backlight unit 40 will be described. In the backlight units 12 and 40, LEDs (Light Emitting Diodes) 24 and 44 are used as the light sources.

<Configuration of Edge Light Backlight Unit>

Figure 5:
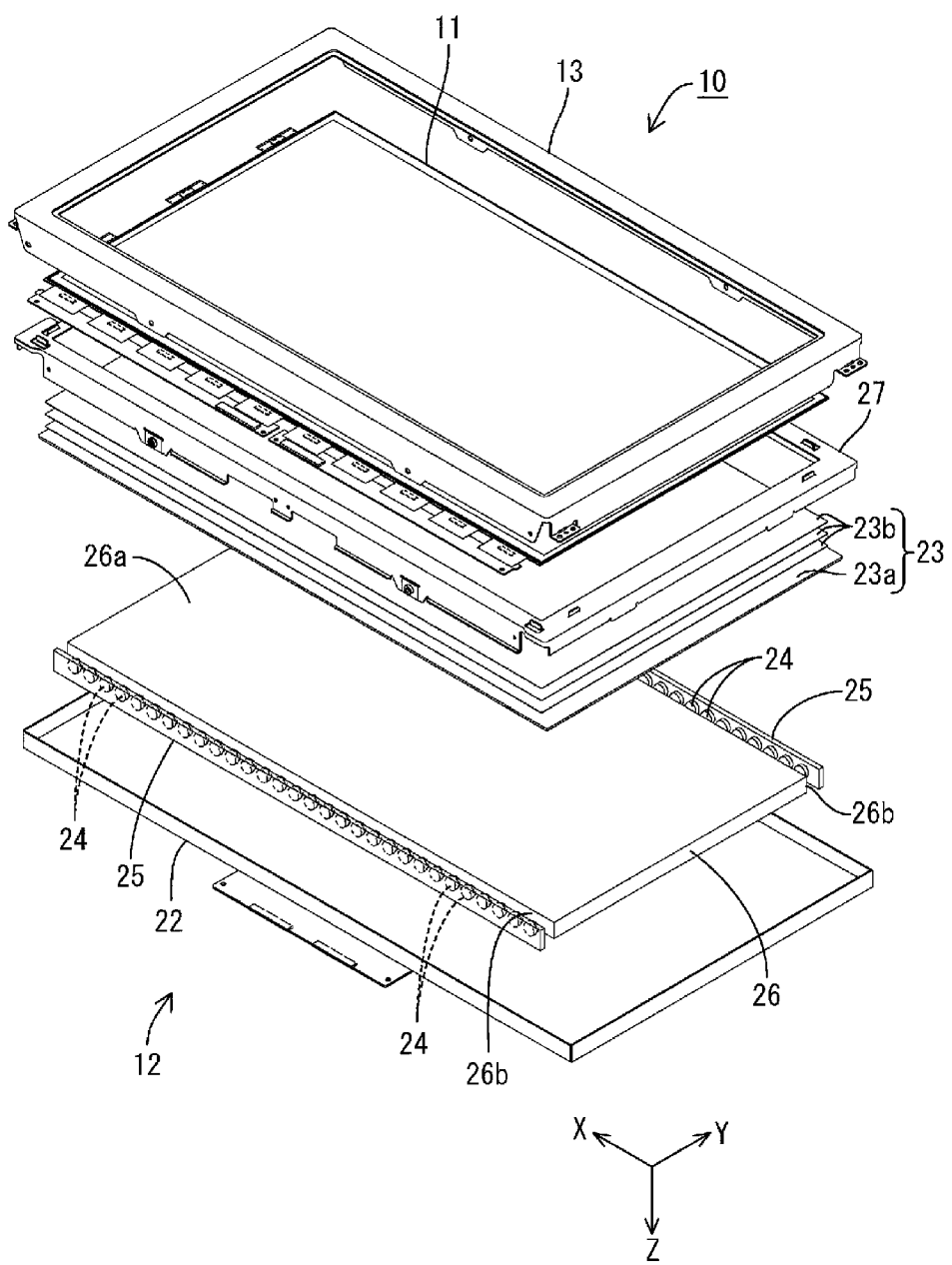
FIG. 5 is an exploded perspective view illustrating a schematic configuration of a liquid crystal display device with an edge light backlight unit.

The backlight unit 12 is of the edge light type and includes the LEDs 24 as the light sources. The backlight unit 12 is provided with, as shown in FIG. 5, a substantially box-like chassis 22 including an opening toward the light output surface side (the liquid crystal panel 11), and a group of optical members 23 (a diffuser plate (light diffusing member) 23a and a plurality of optical sheets 23b disposed between the diffuser plate 23a and the liquid crystal panel 11) covering the opening of the chassis 22. The chassis 22 houses: the LEDs 24 as the light source; LED boards 25 on which the LEDs 24 are mounted; a light guide member 26 that guides the light from the LEDs 24 to the optical members 23 (liquid crystal panel 11); and a frame 27 retaining the light guide member 26 from the front side. The backlight unit 12 is of the so-called edge light type (side light type), where the LEDs 24 mounted on the LED boards 25 are disposed at the ends of the light guide member 26. The edge light backlight unit 12 is integrally attached to the liquid crystal panel 11 via the frame-shaped bezel 13, thus constituting the liquid crystal display device 10.

Figure 6:
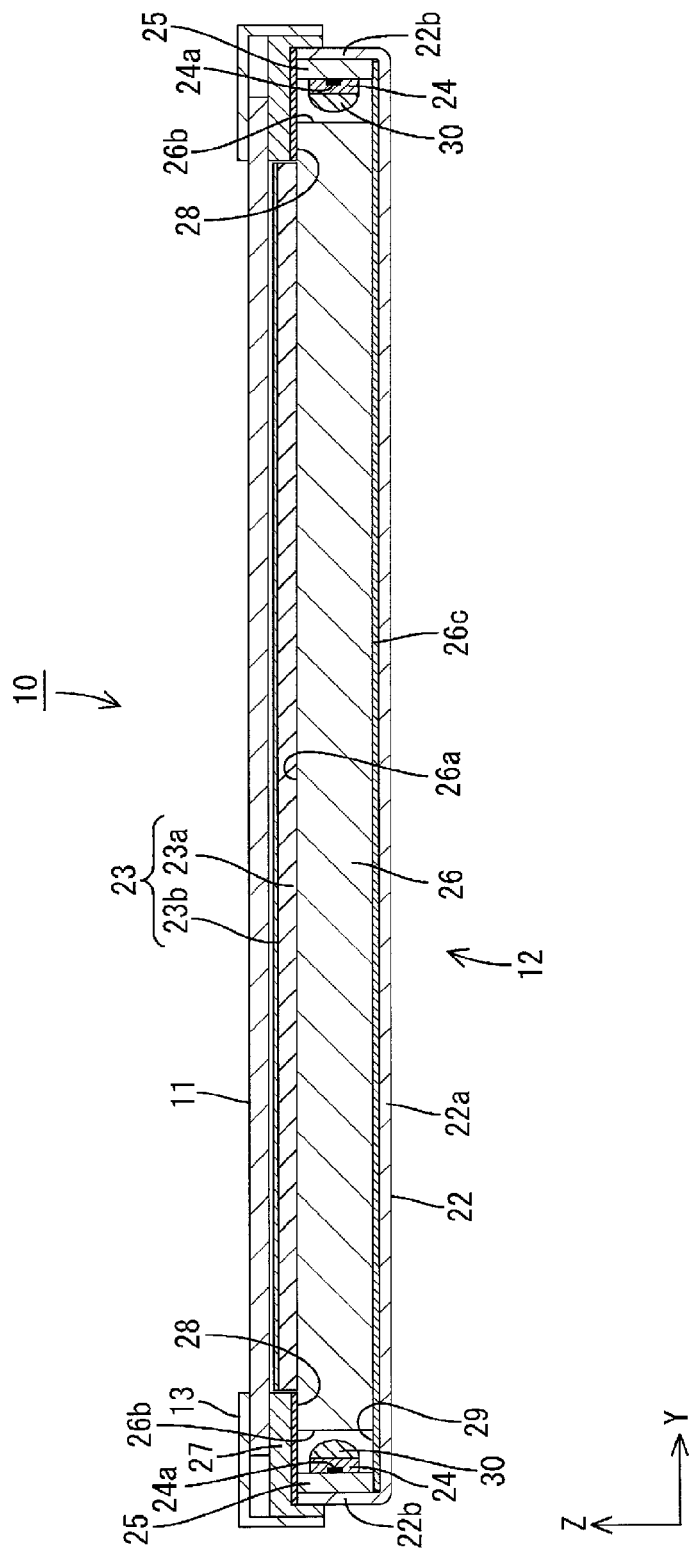
FIG. 6 is a cross sectional view illustrating a cross sectional configuration of the liquid crystal display device of FIG. 5 along a short side direction.
Figure 7:
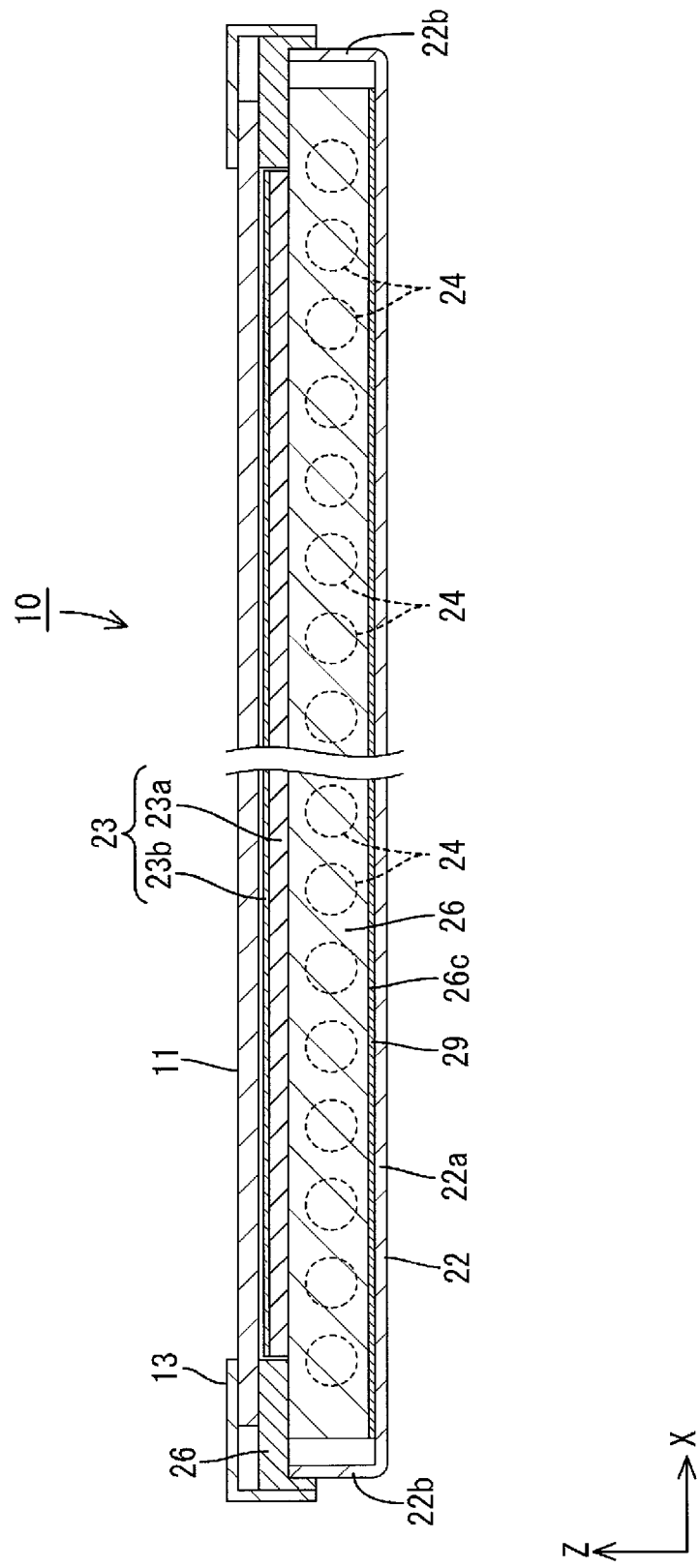
FIG. 7 is a cross sectional view illustrating a cross sectional configuration of the liquid crystal display device of FIG. 5 along a long side direction.

The chassis 22 is made of a metal and, as shown in FIGS. 6, and 7, includes a bottom plate 22a with a horizontally long square shape similar to the liquid crystal panel 11; and side plates 22b rising from the outer ends on the sides of the bottom plate 22a. Thus, the chassis 22 as a whole has a shallow substantially box-like shape opening toward the front side. The chassis 22 (bottom plate 22a) has a long side direction aligned with the X-axis direction (horizontal direction) and a short side direction aligned with the Y-axis direction (vertical direction). To the side plates 22b, the frame 27 and the bezel 13 can be secured by screws.

The optical members 23, as shown in FIG. 5, has a horizontally long square shape in plan view, similar to the liquid crystal panel 11 and the chassis 22. The optical members 23 are mounted on the front side (light output side) of the light guide member 26 to be interposed between the liquid crystal panel 11 and the light guide member 26. The optical members 23 include the diffuser plate 23a disposed on the rear side, and the optical sheets 23b disposed on the front side. The diffuser plate 23a includes a substantially transparent plate-like base substrate made of a resin with a predetermined thickness, in which a number of diffusing particles are dispersed. The diffuser plate 23a has the function of diffusing transmitted light. The optical sheets 23b are formed of a stack of three sheets each with a thickness smaller than the one of the diffuser plate 23a. Specific types of the optical sheets 23b may include a diffuser sheet, a lens sheet, and a reflection type polarizing sheet, from which one or more may be appropriately selected and used.

The frame 27, as shown in FIG. 5, has a frame shape extending along the outer peripheral ends of the light guide member 26 to retain substantially the entire outer peripheral ends of the light guide member 26 from the front side. The frame 27 is made of a synthetic resin and has a black surface, for example, thus providing light blocking property. To the rear side surfaces of the frame 27 on the long side portions thereof, i.e., on the surfaces facing the light guide member 26 and the LED boards 25, (LEDs 24), as shown in FIG. 6, first reflection sheets 28 reflecting light are attached. The first reflection sheets 28 are dimensioned to extend over substantially the entire length of the long side portions of the frame 27. Thus, the first reflection sheets 28 are directly abutted on the ends of the light guide member 26 on the side of the LEDs 24, and cover both the ends of the light guide member 26 and the LED boards 25 from the front side. The frame 27 is also configured to receive the outer peripheral ends of the liquid crystal panel 11 from the rear side.

Figure 8:
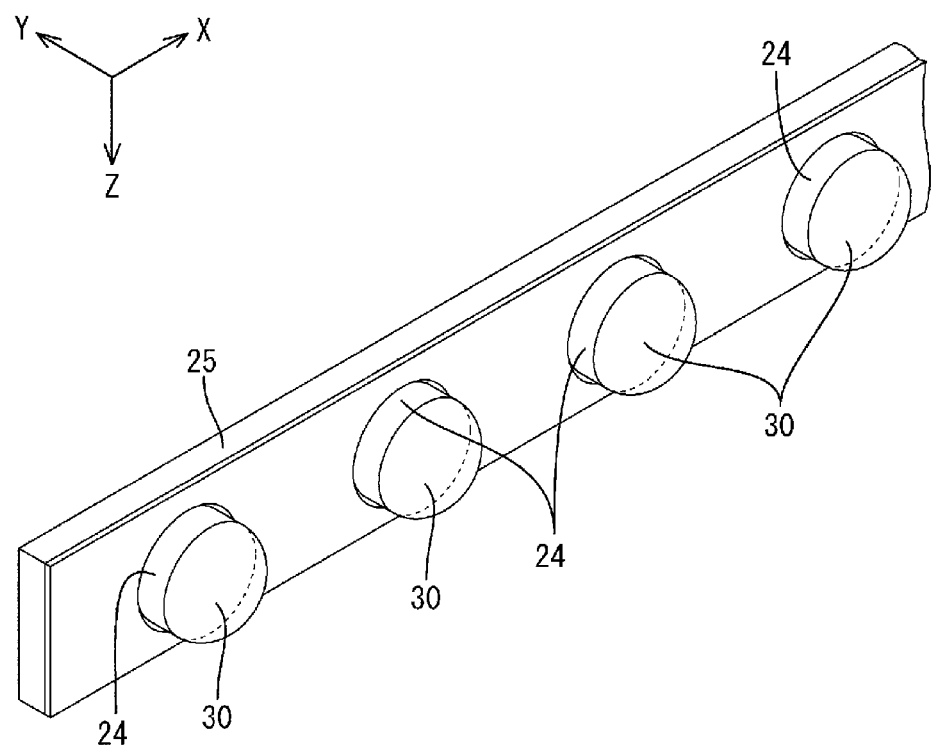
FIG. 8 is an enlarged perspective view of an LED board.

The LEDs 24 are mounted on LED boards 25 and the surface on the opposite side to the mounting surface on the LED boards 25 constitutes the light emitting surface as shown in FIG. 5, which is of the top type. On the light emitting side of the LEDs 24, as shown in FIGS. 6 and 8, lens members 30 outputting the light while being diffused at large angles are provided. The lens members 30 are disposed between the LEDs 24 and the light entrance surfaces 26b of the light guide member 26, and have a spherical light output surface to be convex toward the light guide member 26. The light output surface of the lens members 30 is curved along the longitudinal direction of the light entrance surfaces 26b of the light guide member 26, and has a substantially arched cross section. The detailed configuration of the LEDs 24 will be described later.

The LED board 25, as shown in FIG. 5, has a long plate-like shape extending along the long side direction of the chassis 22 (the X-axis direction; the longitudinal direction of the light entrance surfaces 26b of the light guide member 26). The LED boards 25 are housed in the chassis 22 with the main plate surfaces thereof being parallel with the X-axis direction and the Z-axis direction; namely, the main plate surfaces are orthogonal to the plate surfaces of the liquid crystal panel 11 and the light guide member 26 (optical members 23). The LED boards 25 are provided in a pair corresponding to the ends of the chassis 22 on the long sides, and are attached to the inner surfaces of the both side plates 22b on the long sides. The LEDs 24 with the above-described configuration are surface-mounted on the inner one of the main plate surfaces of the LED boards 25, that is the surface facing the light guide member 26 (the surface opposed to the light guide member 26). On the mounting surface of the LED boards 25, a plurality of the LEDs 24 is arranged side by side in a line along the length direction (X-axis direction). Thus, it can be said that a plurality of the LEDs 24 is arranged side by side in a line on each of the ends of the backlight unit 12 on the long sides along the long side direction. The pair of LED boards 25 is housed in the chassis 22 with the mounting surfaces of the LEDs opposed to each other. Therefore, the light emitting surfaces of the LEDs 24 mounted on the LED boards 25 are opposed to each other with the optical axes of the LEDs 24 substantially aligned with the Y-axis direction.

The base member of the LED boards 25 may be made of a metal, same as the chassis 22, such as aluminum based material. A wiring pattern (not shown) of a metal film, such as copper foil, is formed on a surface of the base member via an insulating layer. On an outer-most surface, a white reflective layer (not shown) with high light reflectivity is formed. By the wiring pattern, the LEDs 24 arranged side by side in a line on the LED boards 25 are connected in series. The material of the base member of the LED boards 25 may be an insulating material, such as ceramic material.

Next, the light guide member 26 will be described in detail. The light guide member 26 is made of a substantially transparent (highly light transmissive) synthetic resin material (such as an acrylic resin, such as PMMA, or polycarbonate) with a refractive index higher than air. The light guide member 26, as shown in FIG. 5, has a horizontally long square shape in plan view, similar to the liquid crystal panel 11 and the chassis 22, with a long side direction aligned with the x-axis direction and a short side direction aligned with the Y-axis direction. The light guide member 26 is disposed immediately under the liquid crystal panel 11 and the optical members 23 in the chassis 22 in a sandwiched manner with respect to the Y-axis direction between the pair of LED boards 25 disposed at the ends of the chassis 22 on the long sides. Thus, the LEDs 24 (LED boards 25) and the light guide member 26 are arranged along the Y-axis direction, while the optical members 23 (liquid crystal panel 11) and the light guide member 26 are arranged along the Z-axis direction, the arrangement directions being orthogonal to each other. The light guide member 26 has a function of introducing the light emitted from the LEDs 24 along the Y-axis direction, and causing the light to be output upward toward the optical members 23 (Z-axis direction) while allowing the light to travel in the light guide member 26. The light guide member 26 is slightly larger than the optical members 23, with the outer peripheral end portions extending outward beyond the outer peripheral end surfaces of the optical members 23 while retained by the frame 27 (FIGS. 6 and 7).

The light guide member 26 has a substantially plate-like shape extending along the bottom plate 22a of the chassis 22 and the plate surfaces of the optical members 23, with main plate surfaces parallel with the x-axis direction and the Y-axis direction. Of the main plate surfaces of the light guide member 26, one on the front side constitutes a light output surface 26a causing the internal light to be output toward the optical members 23 and the liquid crystal panel 11. Of the outer peripheral end surfaces of the light guide member 26 adjacent to the main plate surfaces, the elongated end surfaces on the long sides extend along the x-axis direction in an opposed manner to the LEDs (LED boards 25) with a predetermined interval therebetween. Namely, the elongated end surfaces constitute light entrance surfaces 26b, on which the light from the LEDs 24 enters. The light entrance surfaces 26b are parallel with the x-axis direction and the Z-axis direction and substantially orthogonal to the light output surface 26a. The LEDs 24 and the light entrance surfaces 26b are arranged along the Y-axis direction to be parallel with the light output surface 26a. A surface 26c of the light guide member 26 on the opposite side of the light output surface 26a is entirely covered with a second reflection sheet 29, which reflects the light in the light guide member 26 upward toward the front side. The second reflection sheet 29 extends to areas overlapping with the LED boards 25 (LEDs 24) in plan view. The second reflection sheet 29 sandwiches the LED boards 25 (LEDs 24) between with the first reflection sheet 28 on the front side. Thus, the light from the LEDs 24 is repeatedly reflected between the reflection sheets 28 and 29 to enter on the light entrance surfaces 26b efficiently. On at least one of the light output surface 26a and the surface 26c on the opposite side thereof in the light guide member 26, a reflecting portion (not shown) reflecting the internal light or a scattering portion (not shown) scattering the internal light is patterned with a predetermined in-plane distribution. Thus, output light from the light output surface 26a can be controlled to have a uniform in-plane distribution.

The configuration of the LEDs 24 will be described in detail. The LEDs 24 include LED chips 24a emitting blue light as light emitting sources, and a green phosphor and a red phosphor as phosphors emitting light upon excitation by the blue light. Specifically, the LEDs 24 include board portions fixed on the LED boards 25, on which the LED chips 24a are sealed with a resin material. The LED chip 24a mounted on the board portion has a dominant emission wavelength in a range of 420 nm to 500 nm, i.e., in the blue wavelength region, to emit blue light with high color purity. Preferably, the dominant emission wavelength of the LED chips 24a may be 451 nm. The resin material with which the LED chips 24a are sealed contains the green phosphor that emits green light upon excitation by the blue light emitted by the LED chips 24a, and the red phosphor that emits red light upon excitation by the blue light emitted by the LED chips 24a, the green phosphor and the red phosphor being dispersed at a predetermined ratio. On the basis of the blue light (light of blue component) emitted by the LED chips 24a, the green light (light of green component) emitted from the green phosphor, and the red light (light of red component) emitted from the red phosphor, the LEDs 24 as a whole can emit a predetermined color, such as white or bluish white. By combining the light of green component from the green phosphor and the light of red component from the red phosphor, yellow light can be obtained. Thus, it can be said that the LEDs 24 have both the light of blue component from the LED chips 24a and the light of yellow component. The chromaticity of the LEDs 24 may vary depending on the absolute or relative values of the contained amounts of the green or red phosphor. Thus, by appropriately adjusting the contained amounts of the green or red phosphor, the chromaticity of the LEDs 24 can be adjusted. According to the present embodiment, the green phosphor has a dominant emission peak in a green wavelength region of 500 nm to 570 nm, while the red phosphor has a dominant emission peak in a red wavelength region of 600 nm to 780 nm.

The green phosphor and the red phosphor of the LEDs 24 will be described. Preferably, as the green phosphor, β-SiAlON which is a type of SiAlON-based phosphor may be used. The SiAlON-based phosphor is a substance in which some of silicon atoms of silicon nitride are substituted with aluminum atoms and some of nitrogen atoms are substituted with oxygen atoms; namely, it is a nitride. The SiAlON-based phosphor as nitride has excellent emission efficiency and high durability compared to other phosphors comprising a sulfide or oxide, for example. The "high durability" means that, for example, its exposure to excitation light of high energy from the LED chip does not easily lead to a decrease in brightness over time. The SiAlON-based phosphor may use a rare-earth element (such as Tb, Yg, or Ag) as an activator. β-SiAlON which is a type of SiAlON-based phosphor is a substance expressed by the general formula $Si_{6-z}Al_zO_zN_{8-z}$:Eu (z is the amount of solid solution) or $(Si,Al)_6(O,N)_8$:Eu, in which aluminum and oxygen are dissolved in a β-type silicon nitride crystal. According to the present embodiment, β-SiAlON may use Eu (europium) as an activator. Thus, particularly high color purity of green light as emitted light can be obtained, which is extremely useful in adjusting the chromaticity of the LEDs 24. On the other hand, as a red color phosphor, CASN, which is a type of CASN-based phosphor, may preferably be used. The CASN-based phosphor is a nitride containing calcium atoms (Ca), aluminum atoms (Al), silicon atoms (Si), and nitrogen atoms (N). The CASN-based phosphor has excellent emission efficiency and durability, compared to other phosphors of, for example, a sulfide or an oxide. The CASN-based phosphor may use a rare-earth element (such as Tb, Yg, or Ag) as an activator. The CASN as a type of CASN-based phosphor uses Eu (europium) as the activator and is expressed by the composition formula $CaAlSiN_3$:Eu.

The green phosphor may be changed from the β-SiAlON as appropriate. Preferably, a YAG-based phosphor may be used as it enables high efficiency emission of light. A YAG-based phosphor has a garnet structure including a complex oxide of yttrium and aluminum, expressed by the chemical formula: $Y_3Al_5O_{12}$, where a rare-earth element (such as Ce, Tb, Eu, or Nd) is used as an activator. The YAG-based phosphor may have a part or all of the Y site substitutable by Gd, Tb, or the like, or a part of the Al site substitutable by Ga, in the chemical formula $Y_3Al_5O_{12}$, for example. In this way, the dominant emission wavelength of the YAG-based phosphor can be shifted toward the longer wavelength side or shorter wavelength side for adjustment. Specific examples of the YAG-based phosphor include $Y_3Al_5O_{12}$:Ce, $Y_3Al_5O_{12}$:Tb, (Y, Gd)$_3Al_5O_{12}$:Ce, $Y_3$(Al, Ga)$_5O_{12}$:Ce, $Y_3$(Al, Ga)$_5O_{12}$:Tb, (Y, Gd)$_3$(Al, Ga)$_5O_{12}$:Ce, (Y, Gd)$_3$(Al, Ga)$_5O_{12}$:Tb, and $Tb_3Al_5O_{12}$:Ce.

Other examples of the green phosphor include inorganic phosphors such as (Ba, Mg)$Al_{10}O_{17}$:Eu, Mn, $SrAl_2O_4$:Eu, $Ba_{1.5}Sr_{0.5}SiO_4$:Eu, $BaMgAl_{10}O_{17}$:Eu, Mn, $Ca_3$(Sc, Mg)$_2Si_3O_{12}$:Ce, $Lu_3Al_5O_{12}$:Ce, $CaSc_2O_4$:Ce, ZnS:Cu, Al, (Zn, Cd)S:Cu, Al, $Y_2SiO_5$:Tb, $Zn_2SiO_4$:Mn, (Zn, Cd)S:Cu, ZnS:Cu, $Gd_2O_2S$:Tb, (Zn, Cd)S:Ag, $Y_2O_2S$:Tb, (Zn, Mn)$_2SiO_4$, $BaAl_{12}O_{19}$:Mn, (Ba, Sr, Mg)O.a$Al_2O_3$:Mn, $LaPO_4$:Ce, Tb, $Zn_2SiO_4$:Mn, $CeMgAl_{11}O_{19}$:Tb, and $BaMgAl_{10}O_{17}$:Eu, Mn.

Similarly, the red phosphor may be appropriately changed from CASN. For example, inorganic phosphors such as (Sr, Ca)$AlSiN_3$:Eu, $Y_2O_2S$:Eu, $Y_2O_3$:Eu, $Zn_3(PO_4)_2$:Mn, (Y, Gd, Eu)$BO_3$, (Y, Gd, Eu)$_2O_3$, $YVO_4$:Eu, and $La_2O_2S$:Eu, Sm may be used.

<Configuration of Direct Backlight Unit>

Figure 9:
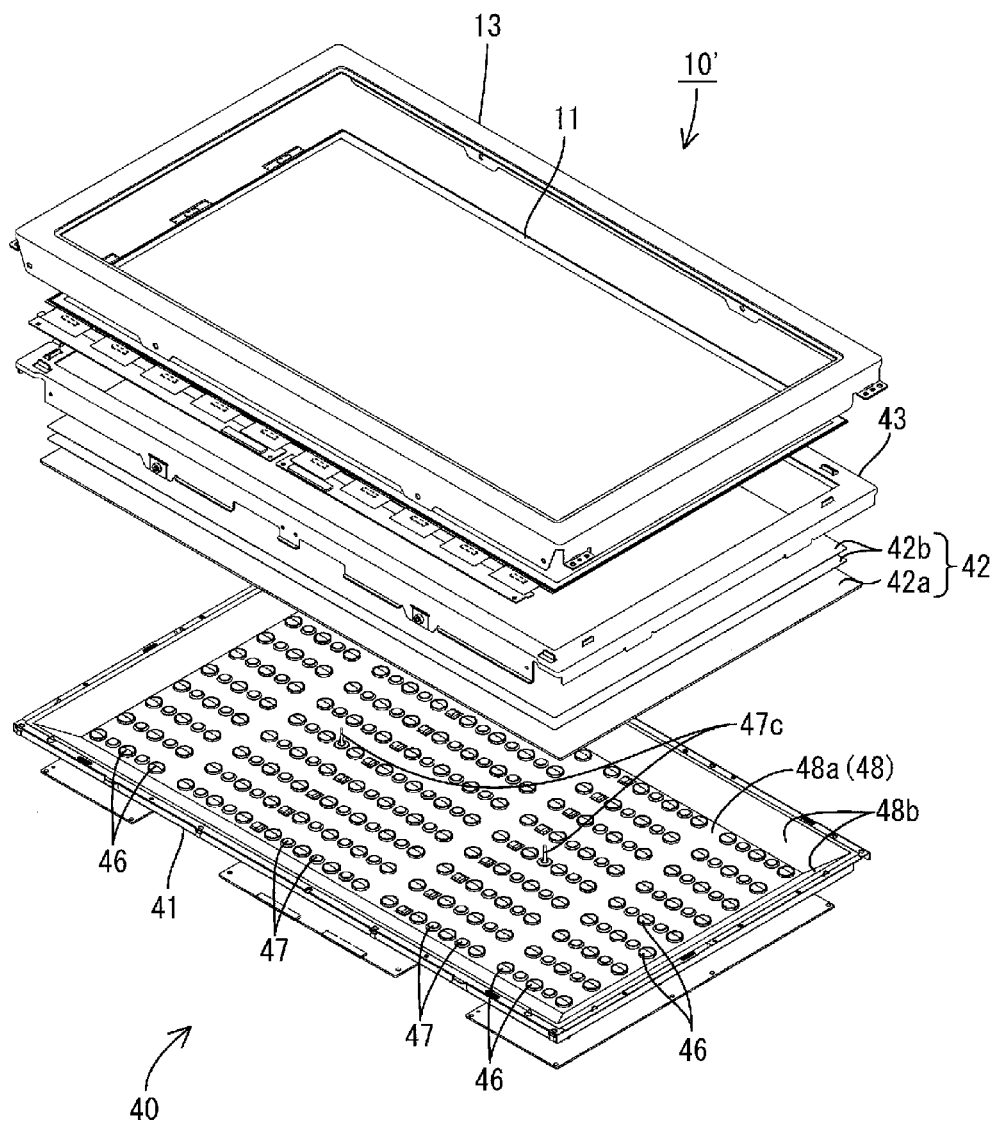
FIG. 9 is an exploded perspective view illustrating a schematic configuration of a liquid crystal display device with a direct backlight unit.

The configuration of the direct backlight unit 40 using the LEDs 44 as the light sources will be described. The backlight unit 40, as shown in FIG. 9, includes a substantially box-shaped chassis 41 with an opening on the light output surface side (the side of the liquid crystal panel 11); a group of optical members 42 covering the opening of the chassis 41; and a frame 43 disposed along the outer edges of the chassis 41 to sandwich the outer edges of the optical members 42 with the chassis 41. Further, in the chassis 41, there are provided the LEDs 44 disposed immediately under the optical member 41 (liquid crystal panel 11) in an opposed manner; LED boards 45 on which the LEDs 44 are mounted; and diffuser lenses 46 attached to the LED boards 45 at positions corresponding to the respective LEDs 44. The chassis 41 further includes holding members 47 holding the LED boards 45 between the holding members 47 and the chassis 41, and a reflection sheet 48 reflecting the light in the chassis 41 toward the optical members 42. Thus, the backlight unit 40 is of the direct type without the light guide member 26 used in the edge light backlight unit 12 (FIGS. 5 to 8). The direct backlight unit 40 is integrally assembled to the liquid crystal panel 11 with a frame-shaped bezel 13, thus constituting the liquid crystal display device 10'. Next, the constituent components of the direct backlight unit 40 will be described in detail.

The configuration of the optical members 42 may be similar to that of the edge light backlight unit 12 and therefore redundant description will be omitted. Description of the configuration of the frame 43 is omitted as it may be similar to the configuration of the edge light backlight unit 12 except for the absence of the first reflection sheets 28. Next, the constituent components of the backlight unit 40 will be described in detail.

Figure 10:
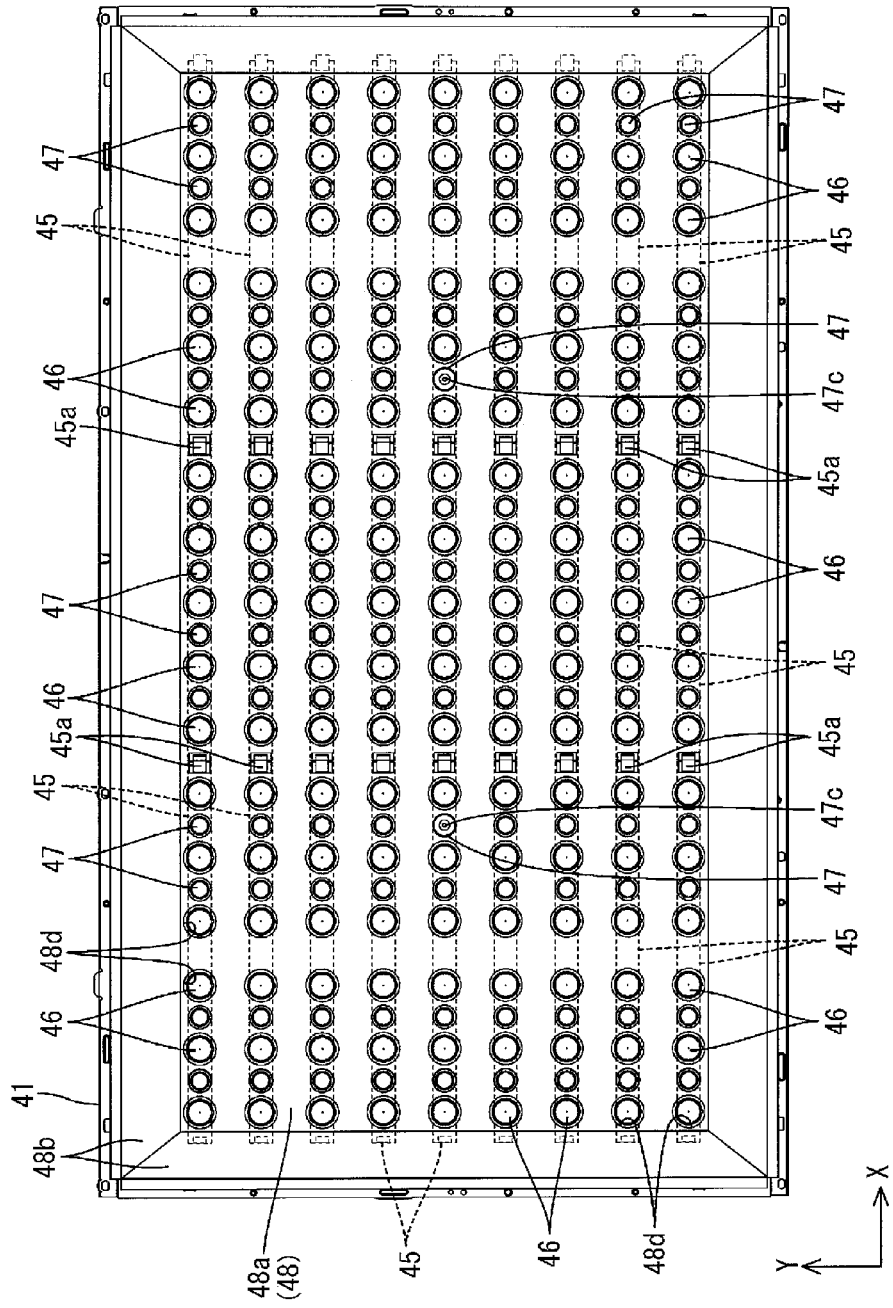
FIG. 10 is a plan view showing a planar configuration of the backlight unit of FIG. 9.
Figure 11:
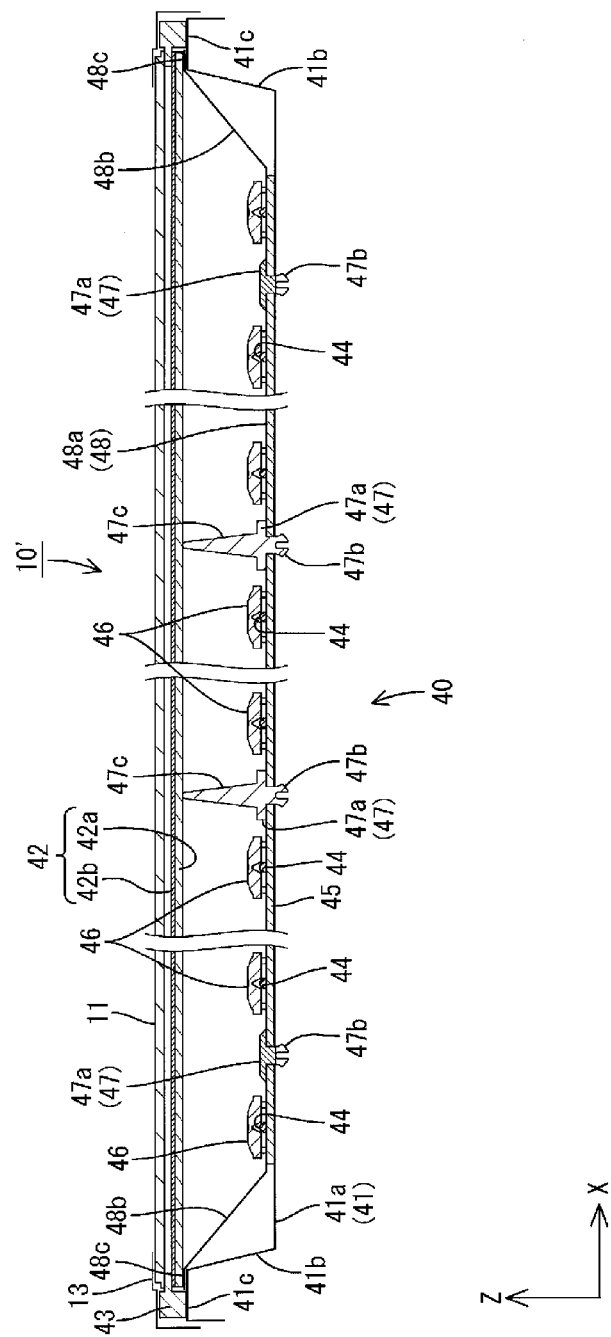
FIG. 11 is a cross sectional view illustrating a cross sectional configuration of the liquid crystal display device of FIG. 9 along the long side direction.
Figure 12:
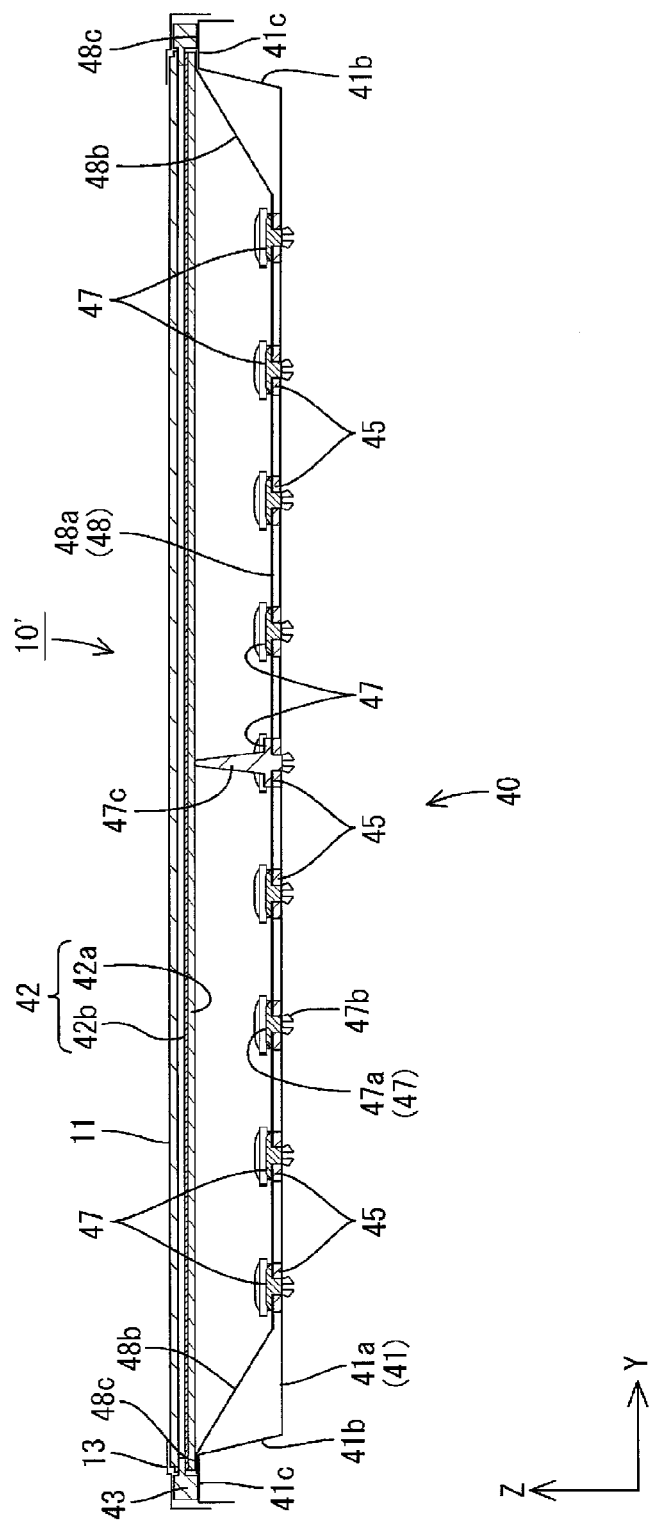
FIG. 12 is a cross sectional view illustrating a cross sectional configuration of the liquid crystal display device of FIG. 9 along the short side direction.

The chassis 41 may be made of a metal and include, as shown in FIGS. 10 to 12, a bottom plate 41a with a horizontally long square shape (rectangular shape; elongated square shape) similar to the liquid crystal panel 11; side plates 41b rising from the outer ends of the respective sides of the bottom plate 41a (a pair of long sides and a pair of short sides) toward the front side (light output side); and backing plates 41c extending outward from the rising ends of the side plates 41b. Thus, the chassis 41 as a whole has a shallow substantially box-like (substantially shallow dish-like) shape opening toward the front side. The chassis 41 has a long side direction aligned with the X-axis direction (horizontal direction) and a short side direction aligned with the Y-axis direction (vertical direction). The backing plates 41c of the chassis 41 are configured to receive the frame 43 and then the optical members 42, which will be described later, from the front side. The frame 43 is secured to the backing plates 41c by screws. The bottom plate 41a of the chassis 41 has open attaching holes attaching the holding members 47. Specifically, a plurality of the attaching holes is distributed on the bottom plate 41a at positions corresponding to the holding members 47.

Next, the LED boards 45 on which the LEDs 44 are mounted will be described. The detailed configuration of the LEDs 44 may be similar to that of the LEDs 24 described with reference to the edge light backlight unit 12, and therefore redundant description will be omitted. The LED boards 45, as shown in FIG. 10, include base members with a horizontally long square shape in plan view. The LED boards 45 are housed in the chassis 41 along the bottom plate 41a, with a long side direction of the base members aligned with the X-axis direction and a short side direction thereof aligned with the Y-axis direction. The LEDs 44 are surface-mounted on one of the plate surfaces of the base members of the LED boards 45 that faces the front side (i.e., facing the optical members 42). The LEDs 44, as shown in FIG. 11, have a light emitting surface opposed to the optical members 42 (liquid crystal panel 11), with an optical axis aligned with the Z-axis direction, which is orthogonal to the display surface of the liquid crystal panel 11. A plurality of the LEDs 44, as shown in FIG. 10, is arranged linearly side by side along the long side direction of the LED boards 45 (X-axis direction), and which are connected in series by a wiring pattern formed on the LED boards 45. The respective LEDs 44 have a substantially constant arrangement pitch; namely, the LEDs 44 are arranged at regular intervals. At the ends of the LED boards 45 in the long side direction, connector portions 45a are provided.

A plurality of the LED boards 45 with the above-described configuration is arranged side by side along each of the X-axis direction and the Y-axis direction in the chassis 41, as shown in FIG. 10, with their long side directions and short side directions aligned with one another. Thus, the LED boards 45 and the LEDs 44 mounted thereon are arranged in rows and columns (i.e., in a matrix; planar arrangement) in the chassis 41, with the X-axis direction (the long side direction of the chassis 41 and the LED boards 45) corresponding to the row direction and the Y-axis direction (the short side direction of the chassis 41 and the LED boards 45) corresponding to the column direction. Specifically, a total of 27 LED boards 45, or three in the X-axis direction times nine in the Y-axis direction, are arranged side by side within the chassis 41. The LED boards 45 arranged along the X-axis direction to constitute an each single row are electrically connected to each other via fitting connection of the adjacent connector portions 45a. The connector portions 45a corresponding to the ends of the chassis 41 in the X-axis direction are electrically connected to an external control circuit, which is not shown. Thus, the LEDs 44 disposed on the LED boards 45 forming the each row are connected in series to control turning on or off of a number of the LEDs 44 included in each line at once with the single control circuit, thus contributing to a decrease in cost. The LED boards disposed along the Y-axis direction have a substantially constant arrangement pitch. Thus, the LEDs 44 disposed along the bottom plate 41a in a planar manner within the chassis 41 are arranged at substantially regular intervals with respect to the X-axis direction and the Y-axis direction.

The diffuser lenses 46 are made of a substantially transparent (highly light transmissive) synthetic resin material (such as polycarbonate or acrylic material) with a refractive index higher than that of air. The diffuser lenses 46, as shown in FIGS. 10 and 11, have a predetermined thickness and are substantially circular in plan view. The diffuser lenses 46 are attached to the LED boards 45 in such a manner as to cover the LEDs 44 from the front side individually, i.e., to overlap with the individual LEDs 44 in plan view. The diffuser lenses 46 are configured to output the highly directional light emitted from the LEDs 44 while diffusing the light. Thus, the light emitted by the LEDs 44 has its directionality reduced through the diffuser lenses 46. Therefore, the regions between the adjacent LEDs 44 can be prevented from being visually recognized as dark portions even when the interval between the adjacent LEDs 44 is large. Accordingly, the installation number of the LEDs 44 can be decreased. The same number of the diffuser lenses 46 is installed as the LEDs 44 on the LED boards 45 at substantially concentric positions with the respective LEDs 44 in plan view.

Figure 22:
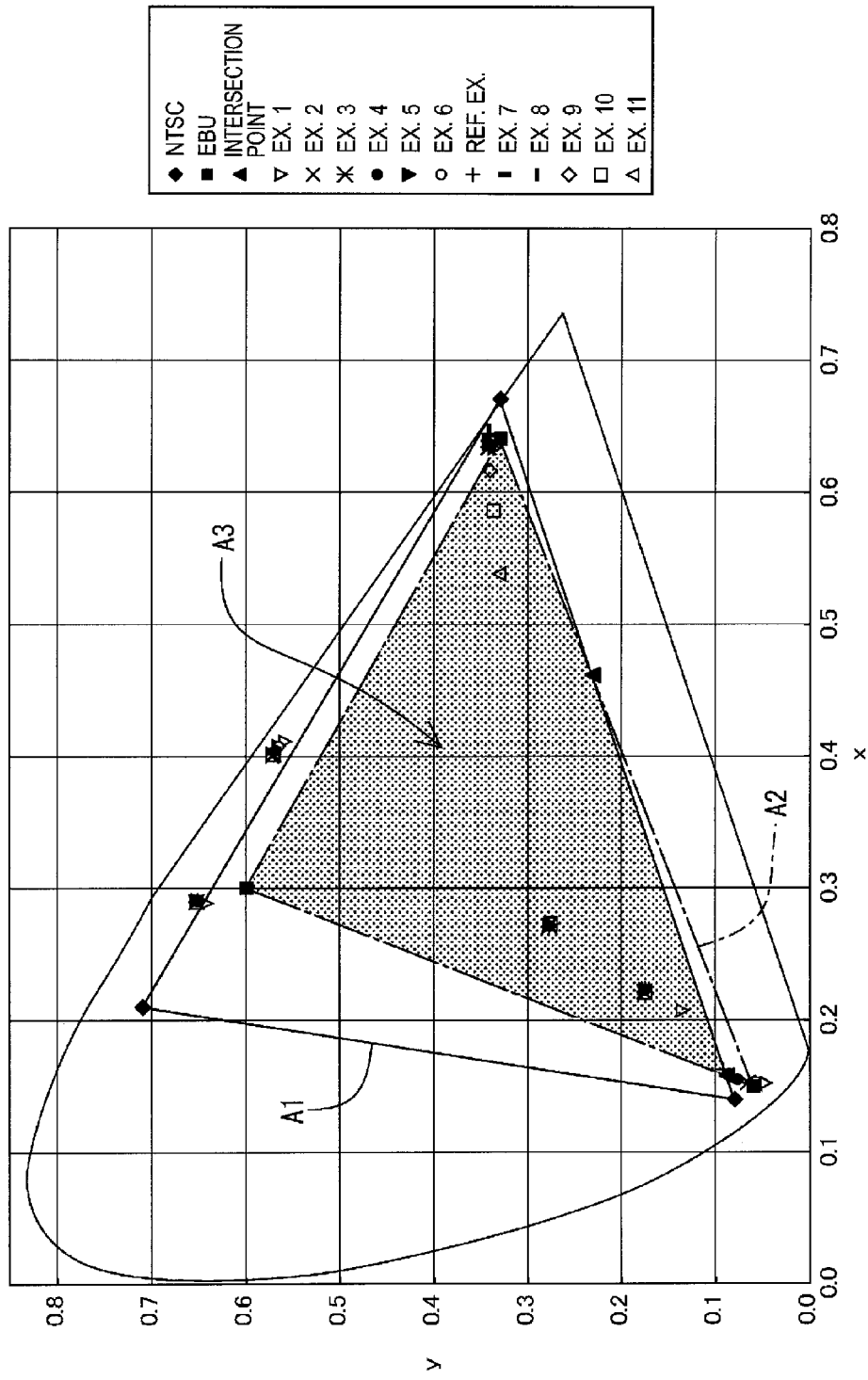
FIG. 22 is a CIE1931 chromaticity diagram illustrating the respective chromaticity coordinates of Table 2 (the first experiment example)

The holding members 47 is made of a synthetic resin, such as polycarbonate resin, and has a white surface for excellent light reflectivity. The holding members 47, as shown in FIGS. 10 to 12, include main body portions 47a extending along the plate surface of the LED boards 45, and fixing portions 47b protruding from the main body portions 47a toward the rear side, i.e., toward the chassis 41 and fixed thereon. The main body portions 47a have a substantially circular plate-like shape in plan view, and are configured to sandwich the LED boards 45 and a reflection sheet 48, which will be described later, with the bottom plate 41a of the chassis 41. The fixing portions 47b are configured to be locked on the bottom plate 41a through the insertion holes and attaching holes formed in the LED boards 45 and the bottom plate 41a of the chassis 41 at positions corresponding to the holding members 47. As shown in FIG. 22, a number of the holding members 47 are arranged side by side in rows and columns in the plane of the LED boards 45. Specifically, the holding members 47 are disposed between the adjacent diffuser lenses 46 (LEDs 44) with respect to the X-axis direction.

A pair of the holding members 47 disposed at the center of the screen includes support portions 47c protruding from the main body portions 47a toward the front side, as shown in FIGS. 10 to 12 to support the optical members 42 from the rear side. Therefore, a constant positional relationship can be maintained between the LEDs 44 and the optical members 42 in the Z-axis direction and inadvertent deformation of the optical members 42 can be regulated.

The reflection sheet 48 is made of a synthetic resin and has a white surface for excellent light reflectivity. The reflection sheet 48, as shown in FIGS. 10 to 12, is dimensioned to be laid over substantially the entire area of the inner surface of the chassis 41 to cover all the LED boards 45 disposed in rows and columns in the chassis 41 at once from the front side. The reflection sheet 48 is configured to reflect the light in the chassis 41 toward the optical members 42. The reflection sheet 48 includes a bottom portion 48a extending along the bottom plate 41a of the chassis 41 and dimensioned to cover most of the bottom plate 41a; four rising portions 48b rising from the respective outer ends of the bottom portion 48a toward the front side and inclined with respect to the bottom portion 48a; and extension portions 48c extending outward from the outer ends of the rising portions 48b and placed on the backing plates 41d of the chassis 41. The bottom portion 48a of the reflection sheet 48 is disposed on the front side surface of the LED boards 45, i.e., on the front side with respect to the mounting surface for the LEDs 44. The bottom portion 48a of the reflection sheet 48 has lens insertion holes 48d into which the diffuser lenses 46 are inserted at positions overlapping with the respective diffuser lenses 46 (LEDs 44) in plan view.

As described above, according to the present embodiment, the color filter 19 of the liquid crystal panel 11, as shown in FIGS. 2 and 4, includes the yellow color section Y in addition to the color sections R, G, and B as the three primary colors of light. Thus, the color gamut of the display image displayed by the transmitted light is expanded. Therefore, the image can be displayed with excellent color reproducibility. Further, the light transmitted through the yellow color section Y has wavelengths close to the peak of luminosity factor, and therefore, tends to be perceived by the human eye as being bright even at small energy level. Thus, sufficient brightness can be obtained even when the output from the LEDs 24 or 44 of the backlight unit 12 or 40 is restrained. Accordingly, the electric power consumption by the LEDs 24 or 40 can be decreased and thereby improved environmental friendliness can be obtained.

Figure 13:
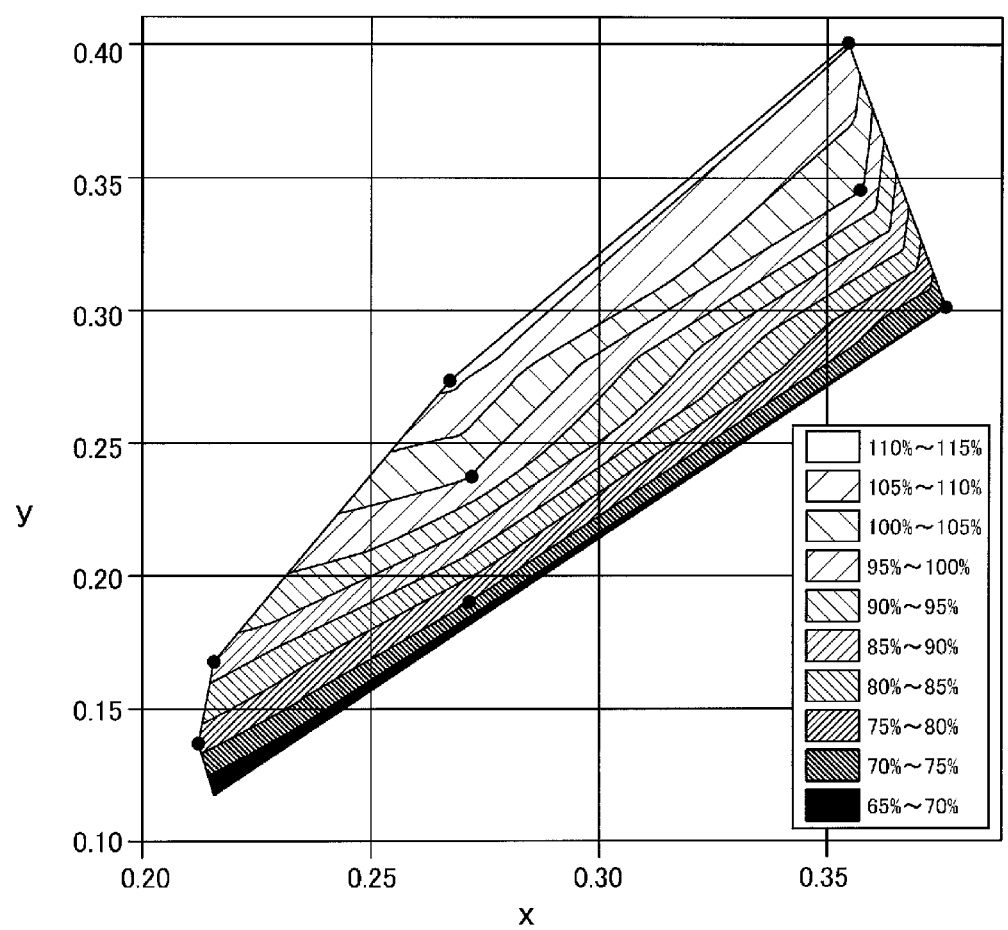
FIG. 13 is a CIE1931 chromaticity diagram illustrating the relationship between chromaticity and brightness of the LED.
Figure 14:
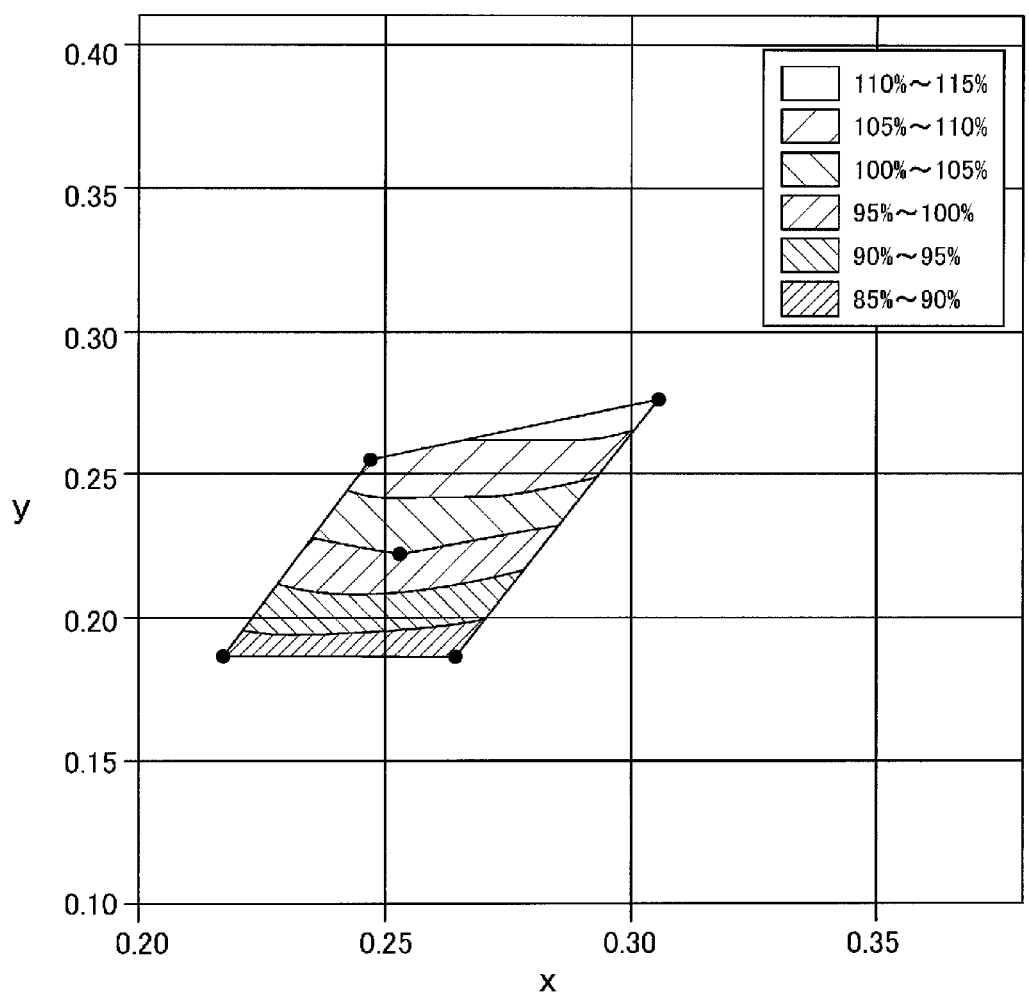
FIG. 14 is a CIE1931 chromaticity diagram illustrating the relationship between chromaticity and brightness of the cold cathode tube.

On the other hand, when the four-color liquid crystal panel 11 is used, the display image of the liquid crystal panel 11 may tend to have yellowish as a whole. This problem may be overcome by adjusting the chromaticity of the light sources of the backlight unit 12 or 40 toward blue, which is the complementary color of yellow, to correct the chromaticity of the display image. However, studies by the present inventor indicate that, when the chromaticity of the light sources is adjusted in accordance with the liquid crystal panel 11 including the yellow color section Y, sufficient brightness may not be obtained depending on the type of the light sources (LED or cold cathode tube) because of the compatibility concerning the chromaticity and brightness characteristics of the light sources or spectral characteristics with the liquid crystal panel 11. Now, the chromaticity and brightness characteristics depending on the different type of the light sources will be described with reference to FIGS. 13 and 14. FIGS. 13 and 14 are CIE (Commission Internationale de l'Eclairage: International Commission on Illumination) 1931 chromaticity diagrams, where the x-axis on the horizontal axis and the y-axis on the vertical axis show the x value and y value of chromaticity values. According to the present embodiment, each of regions with equal brightness of the light source is indicated by a different hatching, with the values (%) in the legends showing relative brightness values, or brightness ratios. In the chromaticity and brightness characteristics of the LEDs shown in FIG. 13, the lines dividing the regions with equal brightness, or "brightness contour lines", so to speak, are generally inclined toward upper-right with respect to the x-axis and the y-axis. Thus, the brightness of the LEDs tends not to decrease so much even when the chromaticity is shifted toward blue for chromaticity adjustment. On the other hand, in the chromaticity and brightness characteristics of the cold cathode tubes shown in FIG. 14, the brightness contour lines are generally parallel to the x-axis. Thus, when the chromaticity of the cold cathode tubes is shifted toward blue for chromaticity adjustment, the brightness tends to be relatively decreased compared to that of the LEDs. As a result, the brightness may become lower than that of the output light from the LEDs. Further, the cold cathode tubes, compared to the LEDs, have low compatibility with the four-color liquid crystal panel 11 in terms of spectral characteristics, which may further contribute to the relatively low brightness of the output light.

The present embodiment premises the use of the LEDs 24 and 44 as the light source. The LEDs 24 and 44 are excellent in compatibility in terms of chromaticity and brightness characteristics and spectral characteristics, for example. However, even in the case of the LEDs 24 and 44, in adjusting their chromaticity in accordance with the liquid crystal panel 11 including the yellow color section Y, some decrease in brightness is virtually inevitable, although not as much as in the case of other light sources such as the cold cathode tube. Thus, according to the present embodiment, on the premise of use of the LEDs 24 and 44 as the light sources, the following configuration is adopted in order to prevent the decrease in brightness of the LEDs 24 and 44 as a result of chromaticity adjustment while ensuring sufficient color reproducibility. Namely, the amount of light that belongs to the blue color in the transmitted light through the color sections R, G, B, and Y is increased by adjusting the chromaticity of the respective color sections R, G, B, and Y in the color filter 19. In this way, the amount of shifting of chromaticity toward blue upon chromaticity adjustment of the LEDs 24 and 44 can be decreased. As a result, the decrease in brightness of the LEDs 24 and 44 due to chromaticity and brightness characteristics can be prevented, and, in addition, the overall amount of transmitted light can be increased by the increase in the amount of transmitted light belonging to the blue color through the color sections R, G, B, and Y, thus increasing the brightness of the output light as a whole.

Figure 23:
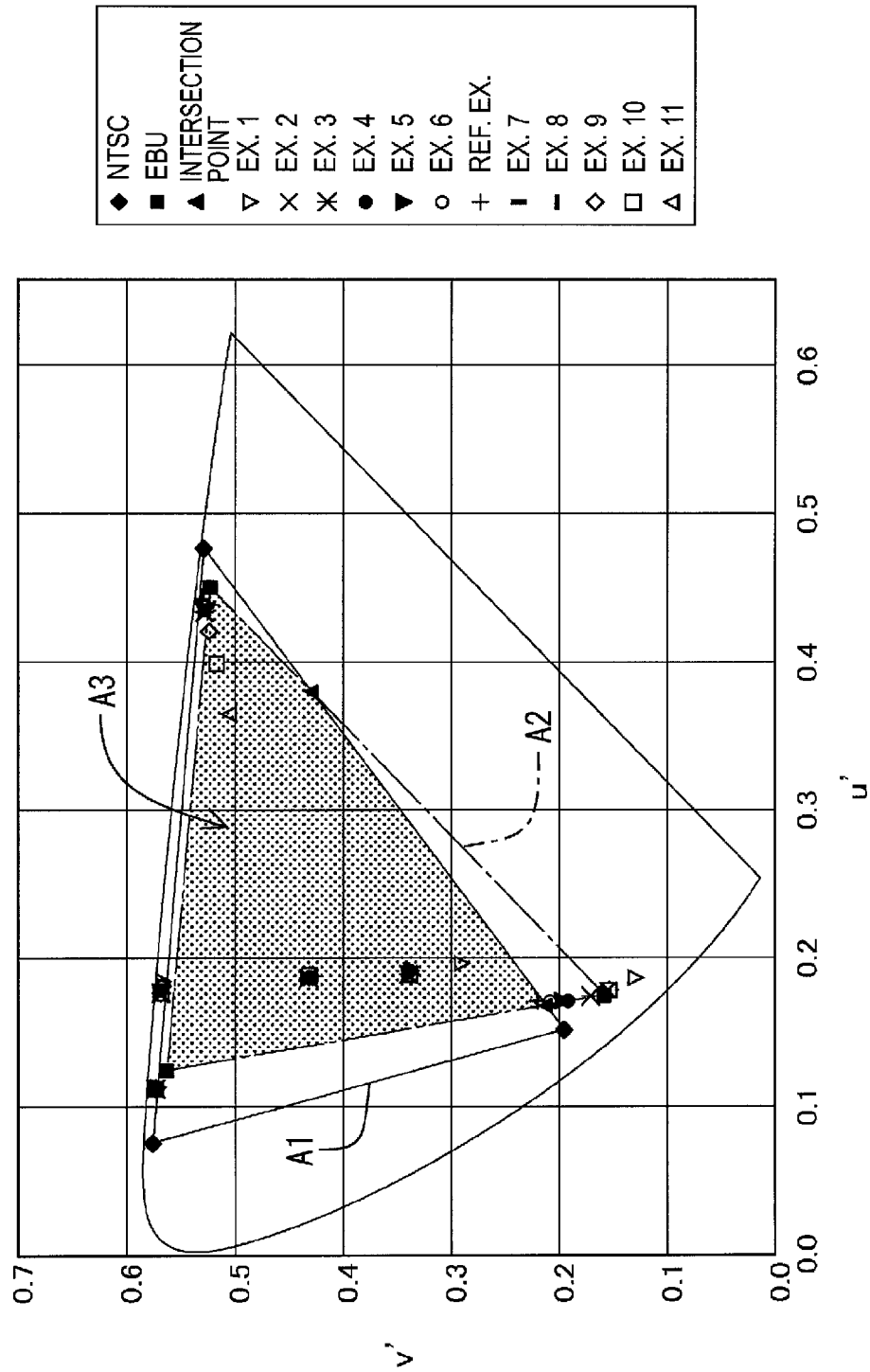
FIG. 23 is a CIE1976 chromaticity diagram illustrating the respective chromaticity coordinates of Table 2 (the first experiment example)
Figure 24:
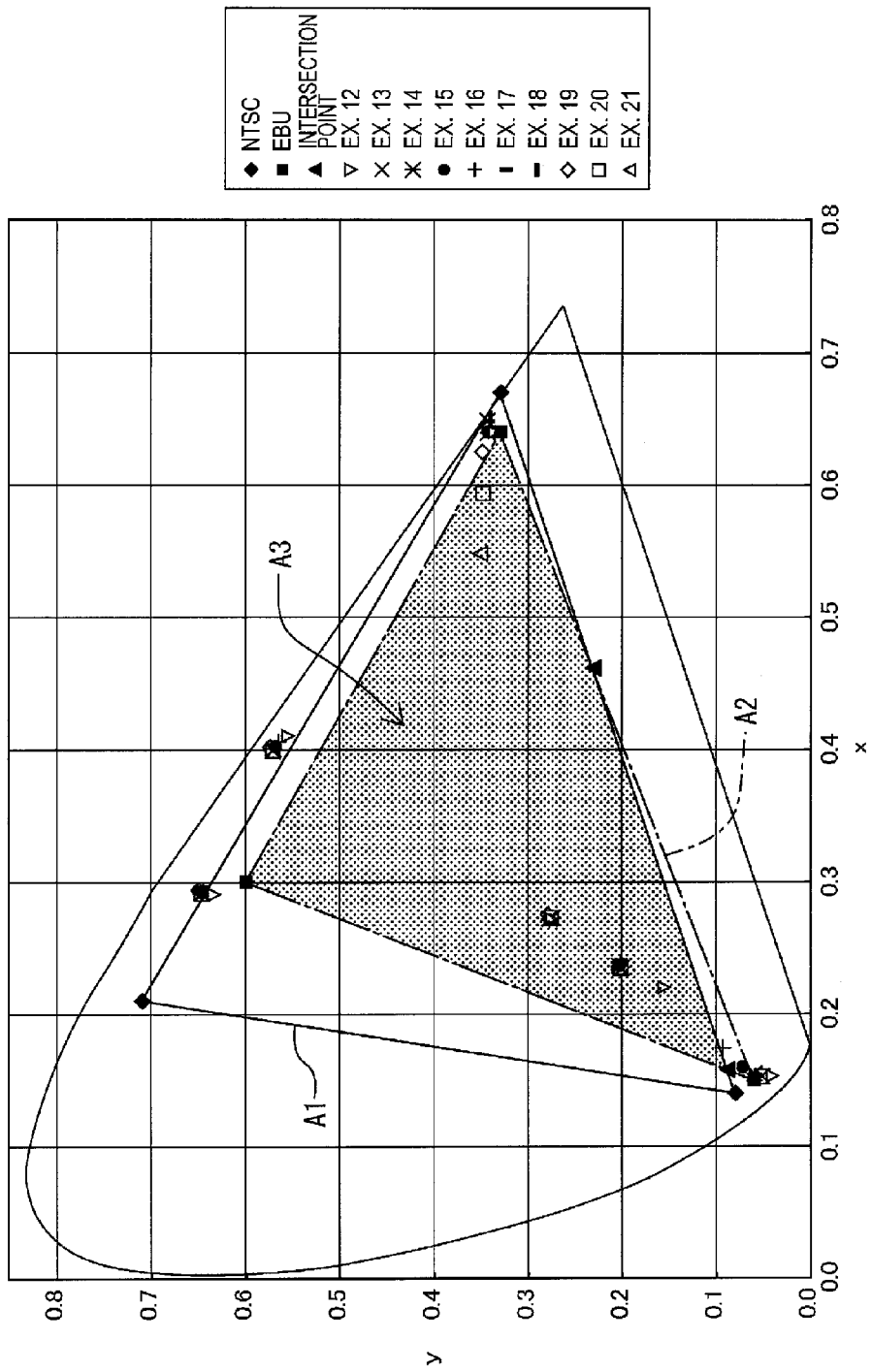
FIG. 24 is a CIE1931 chromaticity diagram illustrating the respective chromaticity coordinates of Table 3 (the second experiment example)
Figure 25:
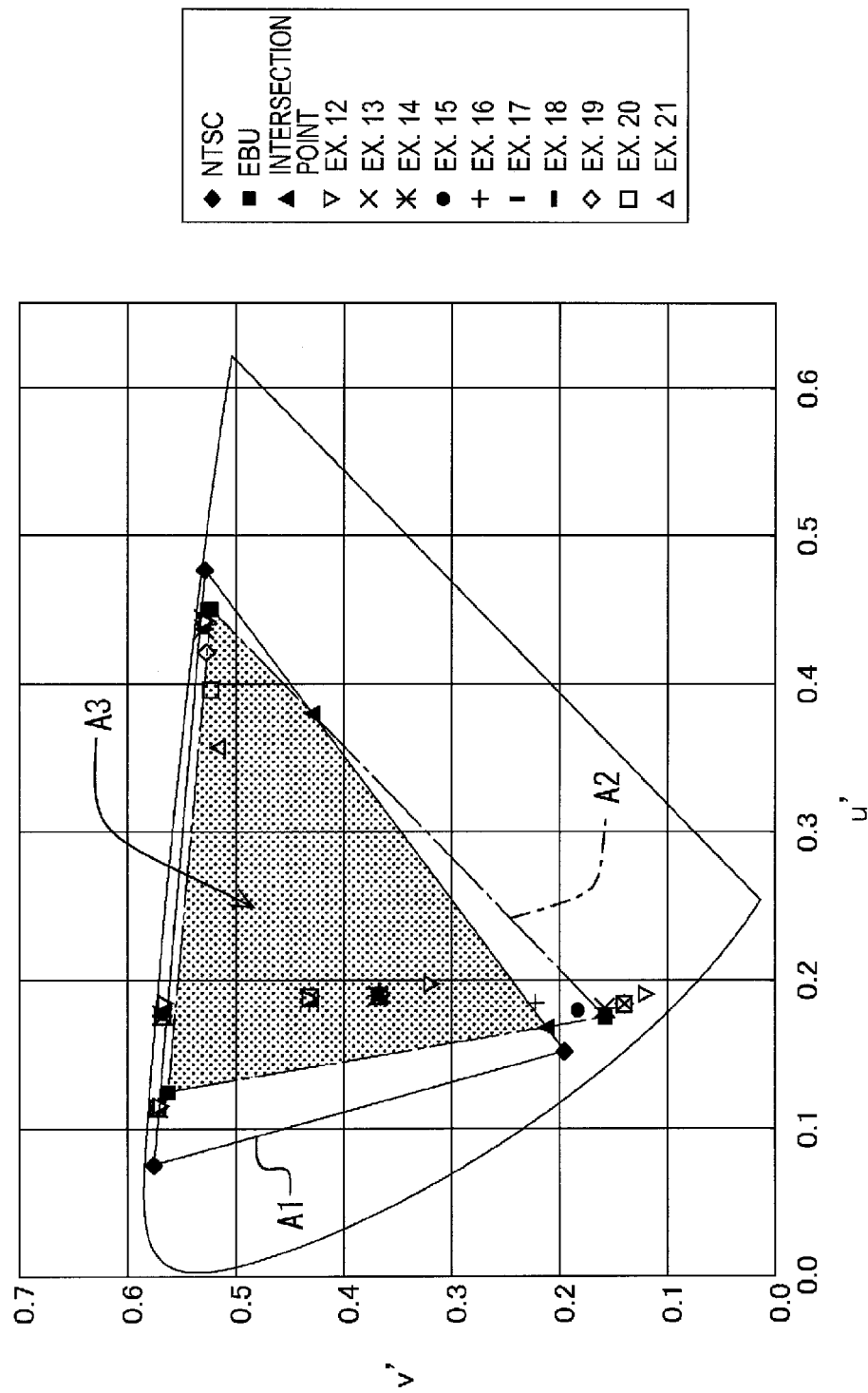
FIG. 25 is a CIE1976 chromaticity diagram illustrating the respective chromaticity coordinates of Table 3 (the second experiment example)

More specifically, according to the present embodiment, the color filter 19 is configured such that the chromaticity of the blue color in the output light obtained by passing the light from the LEDs 24 and 44 through the color sections R, G, B, and Y in the color filter 19 lies outside a common region A3 of a NTSC (National Television System Committee) chromaticity region A1 according to a NTSC standard and a EBU (European Broadcasting Union) chromaticity region A2 according to EBU standard in both the CIE1931 chromaticity diagrams shown in FIGS. 22 and 24 and the CIE1976 chromaticity diagrams shown in FIGS. 23 and 25. The NTSC chromaticity region A1, the EBU chromaticity region A2, and the common region A3 are defined by the chromaticity coordinates shown in the following Table 1. In order to verify the effects of the configuration according to the present embodiment, a first comparative experiment was conducted, as described below. to examine how the brightness and chromaticity of the output light would be changed depending on variation of the chromaticity setting of the color filter 19, specifically the film thickness of the color sections R, G, B, and Y. Tables 2 and 3 show the results of the first comparative experiment. Prior to the description of the first comparative experiment, the NTSC chromaticity region A1, the EBU chromaticity region A2, and the common region A3 will be described in detail with reference to the chromaticity diagrams of FIGS. 22 to 25 and Table 1. In FIGS. 22 to 25, the NTSC chromaticity region A1 is indicated by solid lines, the EBU chromaticity region A2 is indicated by dashed-dotted lines, and the common region A3 is indicated by hatching.

TABLE 1

|  |  | CIE1931 COORDINATES | | CIE1976 COORDINATES | |
| --- | --- | --- | --- | --- | --- |
|  |  | x | y | u' | v' |
| NTSC | R | 0.6700 | 0.3300 | 0.4769 | 0.5285 |
|  | G | 0.2100 | 0.7100 | 0.0757 | 0.5757 |
|  | B | 0.1400 | 0.0800 | 0.1522 | 0.1957 |
| EBU | R | 0.6400 | 0.3300 | 0.4507 | 0.5229 |
|  | G | 0.3000 | 0.6000 | 0.1250 | 0.5625 |
|  | B | 0.1500 | 0.0600 | 0.1754 | 0.1579 |

TABLE 1-continued

|  |  | CIE1931 COORDINATES | | CIE1976 COORDINATES | |
| --- | --- | --- | --- | --- | --- |
|  |  | x | y | u' | v' |
| INTERSECTION B/W NTSC AND EBU | RB LINE-RB LINE | 0.4616 | 0.2317 | 0.3801 | 0.4293 |
|  | RB LINE-BG LINE | 0.1579 | 0.0884 | 0.1686 | 0.2125 |

The x and y values of Table 1 correspond to the values of chromaticity coordinates in the CIE1931 chromaticity diagrams in FIGS. 22 and 24. According to the present embodiment, the reference coordinates for "white" are (0.272, 0.277) in the CIE1931 chromaticity diagrams shown in FIGS. 22 and 24. As the x and y values are decreased from the reference coordinates for white, the chromaticity is shifted toward blue (for more bluishness). Conversely, as the x and y values are increased, the chromaticity is shifted toward yellow (for more yellowishness). On the other hand, the u' and v' values of Table 1 correspond to the values of chromaticity coordinates in the CIE1976 chromaticity diagram in FIGS. 23 and 25. According to the present embodiment, the reference coordinates for "white" are (0.1882, 0.4313) in the CIE1976 chromaticity diagrams in FIGS. 23 and 25. As the v' value is decreased from the reference coordinates for white, the chromaticity is shifted toward blue (for more bluishness). As the v' value is increased, the chromaticity is shifted toward yellow (for more yellowishness).

The NTSC chromaticity region A1, the EBU chromaticity region A2, and the common region A3 will be described in detail. The NTSC chromaticity region A1 is defined by the chromaticity coordinates shown in Table 1. The NTSC chromaticity region A1 is defined in the CIE1931 chromaticity diagrams of FIGS. 22 and 24, by a triangle with the vertexes at the three points in which the values of (x, y) are the blue primary color point (0.14, 0.08), the green primary color point (0.21, 0.71), and the red primary color point (0.67, 0.33). In the CIE1976 chromaticity diagrams of FIGS. 23 and 25, the NTSC chromaticity region A1 is defined by a triangle with the vertexes at the three points in which the values of (u', v') are the green primary color point (0.0757, 0.5757), the blue primary color point (0.1522, 0.1957), and the red primary color point (0.4769, 0.5285). The EBU chromaticity region A2 is defined by the chromaticity coordinates shown in Table 1. The EBU chromaticity region A2 is, in the CIE1931 chromaticity diagrams of FIGS. 22 and 24, defined by a triangle with the vertexes at the three points in which the values of (x, y) are the blue primary color point (0.15, 0.06), the green primary color point (0.3, 0.6), and the red primary color point (0.64, 0.33). In the CIE1976 chromaticity diagrams of FIGS. 23 and 25, the EBU chromaticity region A2 is defined by a triangle with the vertexes at the three points in which the values of (u', v') are the green primary color point (0.1250, 0.5625), the blue primary color point (0.1754, 0.1579), and the red primary color point (0.4507, 0.5229).

The common region A3 is defined by the quadrangle region in which the two triangles of the NTSC chromaticity region A1 and the EBU chromaticity region A2 overlap with each other. The common region A3 is a chromaticity region required by both the NTSC standard and the EBU standard and is therefore a very important region for maintaining a certain level or higher of display quality (color reproducibility) of the display image. Specifically, the common region A3 is defined, in the CIE1931 chromaticity diagrams of FIGS. 22 and 24, by a quadrangle with the vertexes at the four points in which the values of (x, y) are: (0.1579, 0.0884) where a line (RB line) connecting the red and the blue primary color points of the NTSC chromaticity region A1 intersects a line (BG line) connecting the blue and the green primary color points of the EBU chromaticity region A2; (0.3, 0.6); (0.4616, 0.2317) where the RB line of the NTSC chromaticity region A1 intersects the RB line of the EBU chromaticity region A2; and (0.64, 0.33). In the CIE1976 chromaticity diagrams of FIGS. 23 and 25, the common region A3 is defined by a quadrangle with the vertexes at the four points in which the values of (u', v') are: (0.125, 0.5625); (0.1686, 0.2125) where the RB line of the NTSC chromaticity region A1 intersects the BG line of the EBU chromaticity region A2; (0.3801, 0.4293) where the RB line of the NTSC chromaticity region A1 intersects the RB line of the EBU chromaticity region A2; and (0.4507, 0.5229).

<First Comparative Experiment>

The first comparative experiment will be described in detail. The first comparative experiment involved: a first experiment example in which the liquid crystal display device 10 with the edge light backlight unit 12 (including LEDs 24 as the light sources) was used; and a second experiment example in which the liquid crystal display device 10' with the direct backlight unit 40 (including the LEDs 44 as the light sources) was used. In both the experiment examples, the chromaticity of the LEDs 24 and 44 as a result of chromaticity adjustment in accordance with changes in the area ratio of the color sections R, G, B, and Y, the film thickness of the blue color section B, the film thickness of the red color section R, or the like was measured, while the chromaticity, brightness, and NTSC ratio of the output light from the liquid crystal panel were measured. The results are shown in the following Tables 2 and 3 and FIGS. 22 to 25. Specifically, Table 2 and FIGS. 22 and 23 show the results according to the first experiment example while Table 3 and FIGS. 24 and 25 show the results according to the second experiment example.

The first experiment example involved: a first comparative example in which a liquid crystal panel (not shown) of the three primary color type including the three color sections R, G, and B with the same area ratio and film thickness was used; a first example in which the liquid crystal panel 11 of the four primary color type including the four color sections R, G, B, and Y with the same area ratio and film thickness was used; and a second example in which the liquid crystal panel 11 of the four primary color type including the four color sections R, G, B, and Y with the same film thickness was used, where the blue color section B or the red color section R had a relatively large area ratio compared to the yellow color section Y or the green color section G. The first experiment example further involved: a third to a sixth examples and a reference example in each of which, of the color sections R, G, B, and Y with the same area ratios as the second example, the film thickness of the blue color section B was thinner (smaller) than the film thickness of the other color section R, G, or Y; a seventh and an eighth examples in which the film thickness of the red color section R was thicker (greater) than the film thickness of the other color section G, B, or Y; and a ninth to an eleventh examples in which the film thickness of the red color section R was thinner (smaller) than the film thickness of the other color section G, B, or Y. In the second to the eleventh examples, the area ratio of the blue color section B or the red color section R was "1.6" with respect to the area ratio of the yellow color section Y or the green color section G defined as "1". Table 2 shows the results of measuring: the area ratio and film thickness of the respective color sections R, G, B, and Y; the brightness of the output light (display image) from the liquid crystal panel; the NTSC ratio of the chromaticity region of the output light; the chromaticity of the LEDs 24; and the chromaticity of each color of the output light according to the first comparative example, the first to the eleventh examples, and the reference example.

The second experiment example involved: a second comparative example in which a liquid crystal panel (not shown) of the three primary color type with the three color sections R, G, and B with the same area ratio and film thickness was used; a twelfth example in which the liquid crystal panel 11 of the four primary color type including the four color sections R, G, B and Y with the same area ratio and film thickness was used; and a thirteenth example in which the liquid crystal panel 11 of the four primary color type including the four color sections R, G, B, and Y with the same film thickness was used, where the blue color section B or the red color section R had a relatively large area ratio compared to the yellow color section Y or the green color section G. Further, the second experiment example involved a fourteenth to twenty-first examples including the color sections R, G, B, and Y with the same area ratios as the thirteenth example: in the fourteenth to the sixteenth examples, the film thickness of the blue color section B was thinner (smaller) than the film thickness of the other color section R, G, or Y; in the seventeenth and the eighteenth examples, the film thickness of the red color section R was thicker (greater) than the film thickness of the other color section G, B, or Y; and in the nineteenth to the twenty-first examples, the film thickness of the red color section R was thinner (smaller) than the film thickness of the other color section G, B, or Y. In the thirteenth to the twenty-first examples, the area ratio of the blue color section B or the red color section R was "1.6" with respect to the area ratio of the yellow color section Y or the green color section G defined as "1". Table 3 shows, similarly to Table 2, the results of measuring, in the second comparative example and the twelfth to the twenty-first examples: the area ratio and film thickness of the respective color sections R, G, B, and Y; the brightness of the output light (display image) from the liquid crystal panel; the NTSC ratio of the chromaticity region of the output light; the chromaticity of the LEDs 44; and the chromaticity of each color of the output light.

Figure 15:
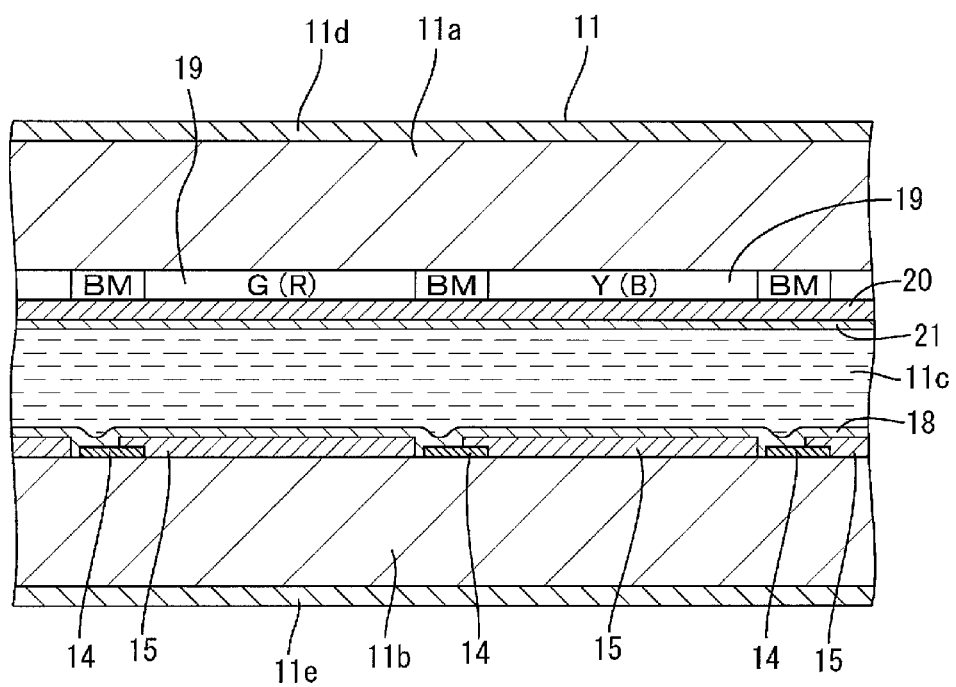
FIG. 15 is a cross sectional view showing a cross sectional configuration of the liquid crystal panel along a long side direction (cross sectional configuration of the color sections according to the second and the thirteenth examples)
Figure 16:
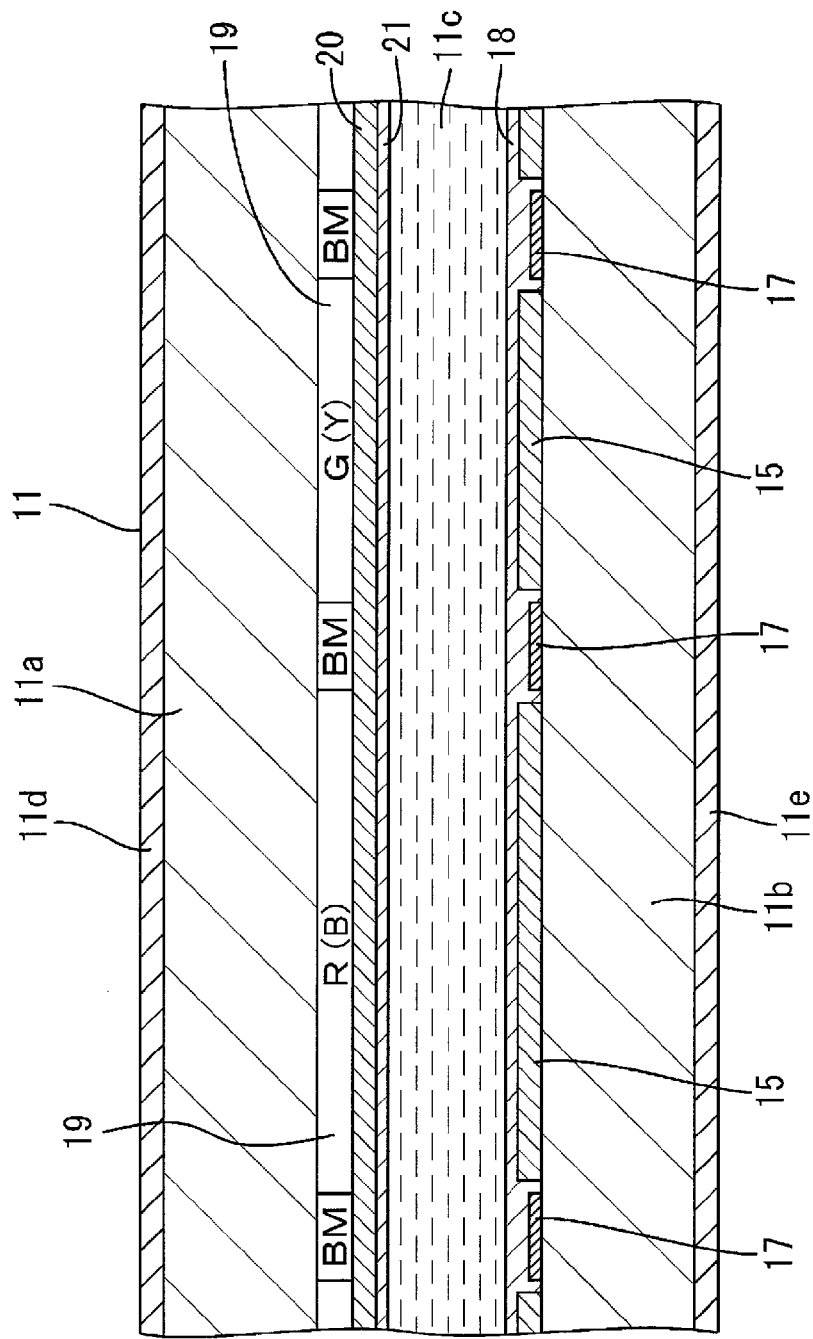
FIG. 16 is a cross sectional view showing a cross sectional configuration of the liquid crystal panel along a short side direction (cross sectional configuration of the color sections according to the second and the thirteenth examples)
Figure 17:
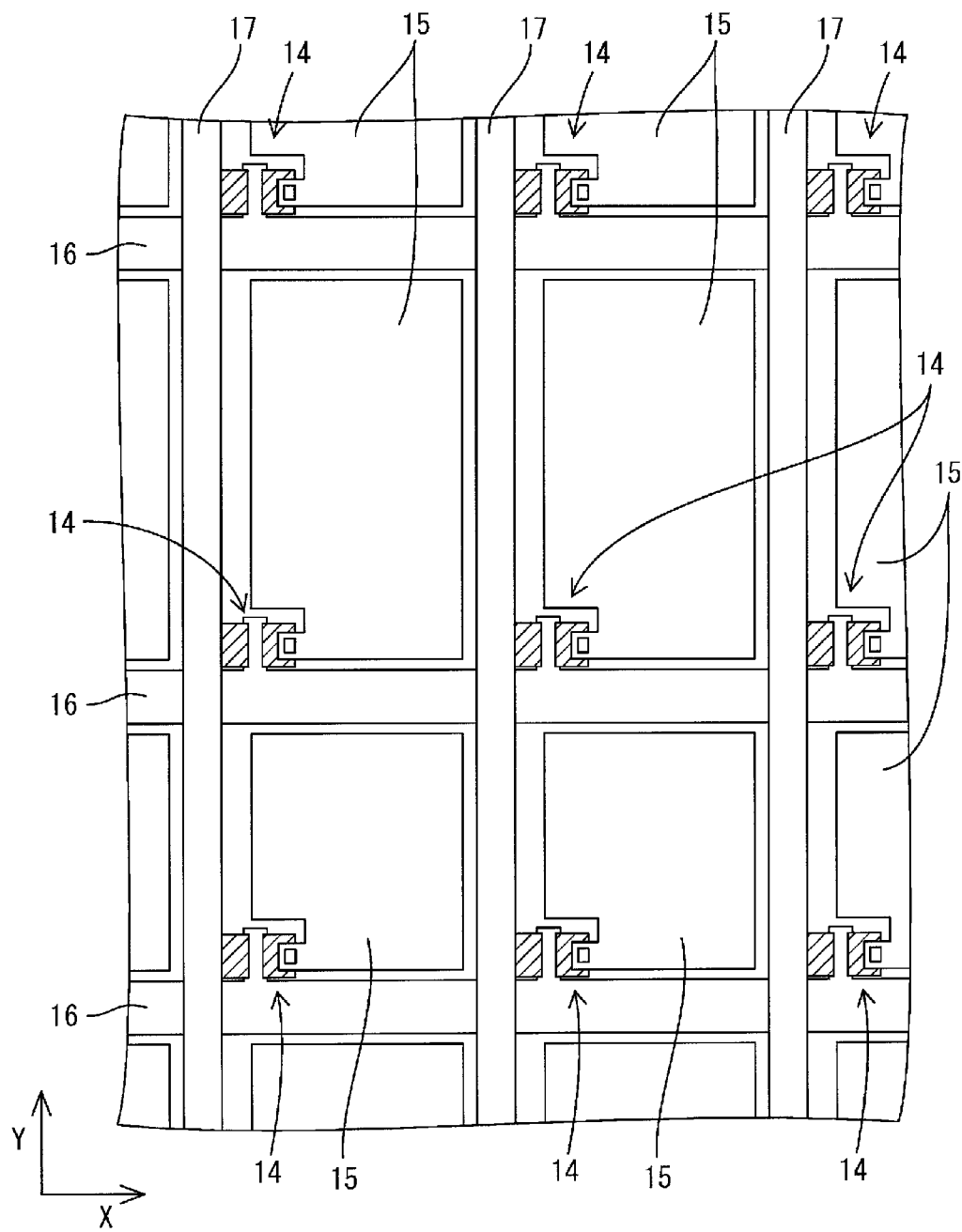
FIG. 17 is an enlarged plan view showing a planar configuration of an array substrate of FIGS. 15 and 16.
Figure 18:
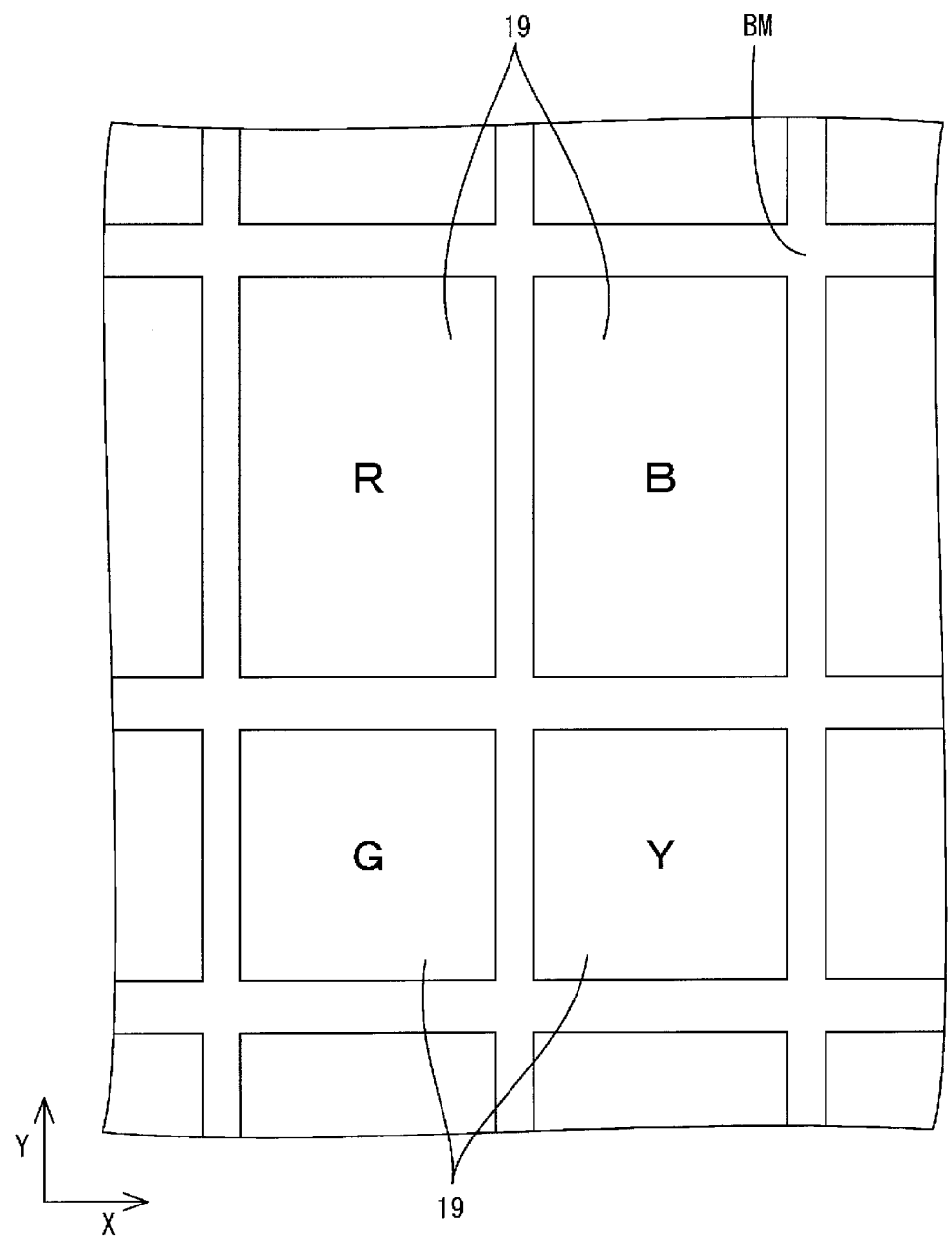
FIG. 18 is an enlarged plan view showing a planar configuration of a CF substrate of FIGS. 15 and 16.

The configuration of the color sections R, G, B, and Y in the second to the eleventh and the thirteenth to the twenty-first examples and the reference example will be described in detail, where the blue color section B or the red color section R had a relatively large area ratio compared to the yellow color section Y or the green color section G. The configuration of the color sections R, G, B, and Y in the first and the twelfth examples, where the color sections R, G, B, and Y have the same area ratio, is as already described above (see FIGS. 2 and 4). In the second to the eleventh examples, the thirteenth to the twenty-first examples, and the reference example, the color sections R, G, B and Y are arranged in rows and columns, as shown in FIG. 18, with the x-axis direction corresponding to the row direction and the Y-axis direction corresponding to the column direction. The color sections R, G, B, and Y have the same dimensions in the row direction (X-axis direction) (FIGS. 15 and 18), but have different dimensions in the column direction (Y-axis direction) with the color sections R, G, B, and Y in adjacent rows (FIGS. 16 and 18). Specifically, in the rows with the relatively large dimensions in the column direction, the red color section R and the blue color section B are disposed adjacent to each other in the row direction. In the rows with the relatively small dimensions in the column direction, the yellow color section Y and the green color section G are disposed adjacent to each other in the row direction. Thus, first rows with the relatively small dimensions in the column direction, in which the red color section R and the blue color section B are disposed alternately in the row direction, and second rows with the relatively large dimensions, in the column direction in which the yellow color section Y and the green color section G are disposed alternately in the row direction, are alternately and repeatedly disposed in the column direction. In this way, the area of the red color section R or the blue color section B is made larger than the area of the yellow color section Y or the green color section G. The blue color section B and the red color section R have the same area. Similarly, the yellow color section Y and the green color section G have the same area. The green color section G is disposed adjacent to the red color section R in the column direction. The yellow color section Y is disposed adjacent to the blue color section B in the column direction. Because of the above described configuration of the color filter 19, in the array substrate 11b, as shown in FIG. 17, the pixel electrodes 15 disposed in adjacent rows have different dimensions in the column direction. Namely, among the pixel electrodes 15, those overlapping with the red color section R or the blue color section B have the area larger than the area of those overlapping with the yellow color section Y or the green color section G. All the source wires 17 are arranged at a regular pitch, while the gate wires 16 are arranged at two different pitches depending on the dimensions of the pixel electrodes 15. In FIGS. 16 and 18, the area of the red color section R or the blue color section B is approximately 1.6 times as large as the area of the yellow color section Y or the green color section G.

Figure 19:
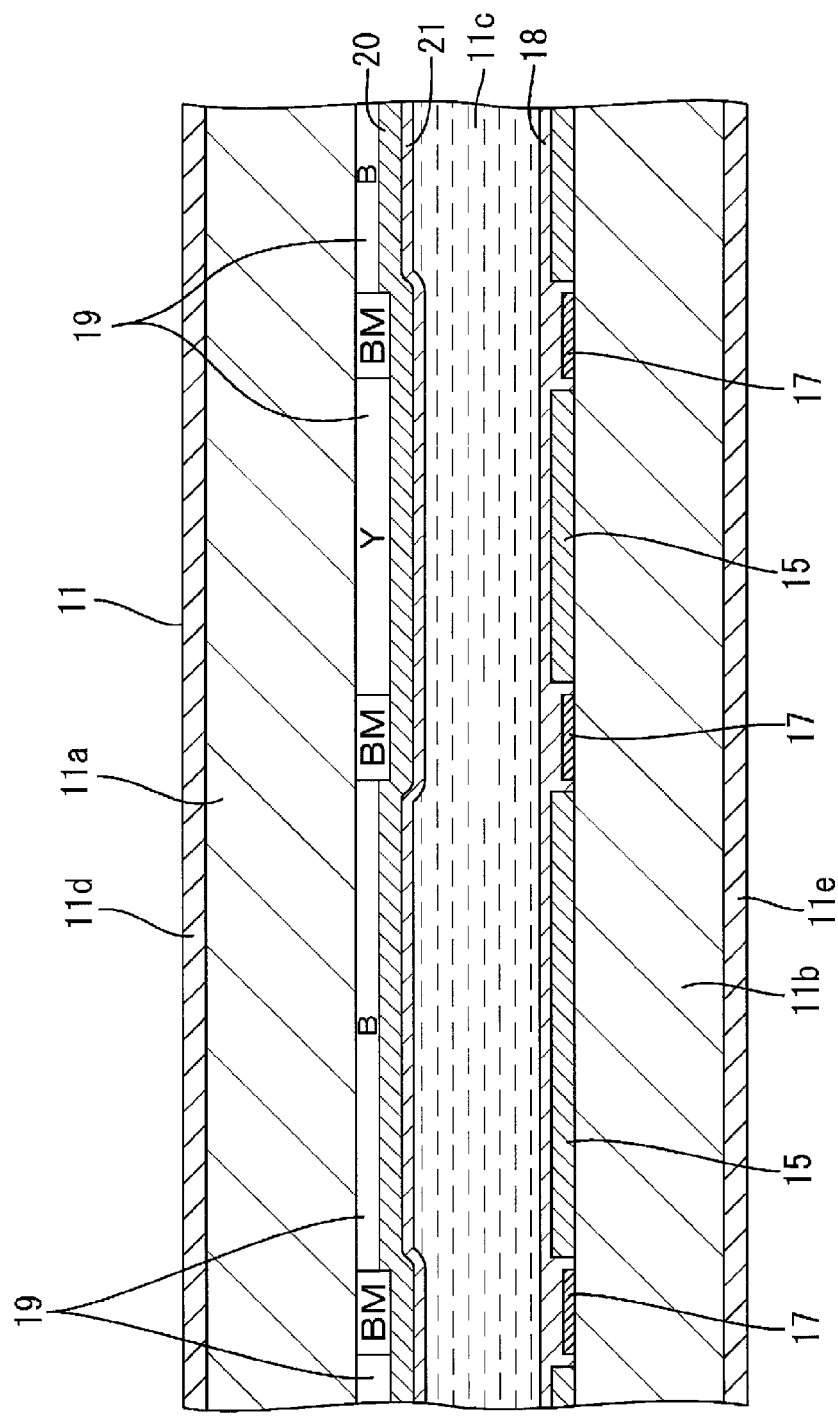
FIG. 19 is a cross sectional view showing a cross sectional configuration of the color sections according to the third to the sixth examples, the reference example, and the fourteenth to the sixteenth examples.

Next, the film thickness of the color sections R, G, B, and Y in the first to the twenty-first examples and the reference example will be described in detail. In the first and the twelfth examples, as shown in FIG. 2, the color sections R, G, B, and Y with the same area ratio have the uniform film thickness of 2.1 μm. Similarly, in the second and the thirteenth examples, as shown in FIGS. 15 and 16, the color sections R, G, B, and Y with the different area ratios have the uniform film thickness of 2.1 μm (for the values of film thickness, see Tables 2 and 3). In the third to the sixth examples, the fourteenth to the sixteenth examples, and the reference example, as shown in FIG. 19, of the color sections R, G, B, and Y with the different area ratios, the blue color section B has a film thickness smaller than the other color section R, G, or Y. Specifically, in the third and the fourteenth examples, the blue color section B has the film thickness of 1.8 μm, which is about 85.7% (relative value) of the film thickness of the other color section R, G, or Y (being uniform at 2.1 μm). In the fourth and the fifteenth examples, the blue color section B has the film thickness of 1.5 μm, which is about 71.4% of the film thickness of the other color section R, G, or Y. In the fifth example, the blue color section B has the film thickness of 1.4 μm, which is about 66.7% of the film thickness of the other color section R, G, or Y. In the sixth example, the blue color section B has the film thickness of 1.3 μm, which is about 61.9% of the film thickness of the other color section R, G, or Y. In the sixteenth example and the reference example, the blue color section B has the film thickness of 1.2 μm, which is about 57.1% of the film thickness of the other color section R, G, or Y. Thus, in the third to the sixth examples according to the first experiment example, the film thickness of the blue color section B is in the range of 61.9% to 85.8% of the film thickness of the other color section R, G, or Y. In the fourteenth to the sixteenth examples according to the second experiment example, the film thickness of the blue color section B is in the range of 57.1% to 85.8% of the film thickness of the other color section R, G, or Y.

Figure 20:
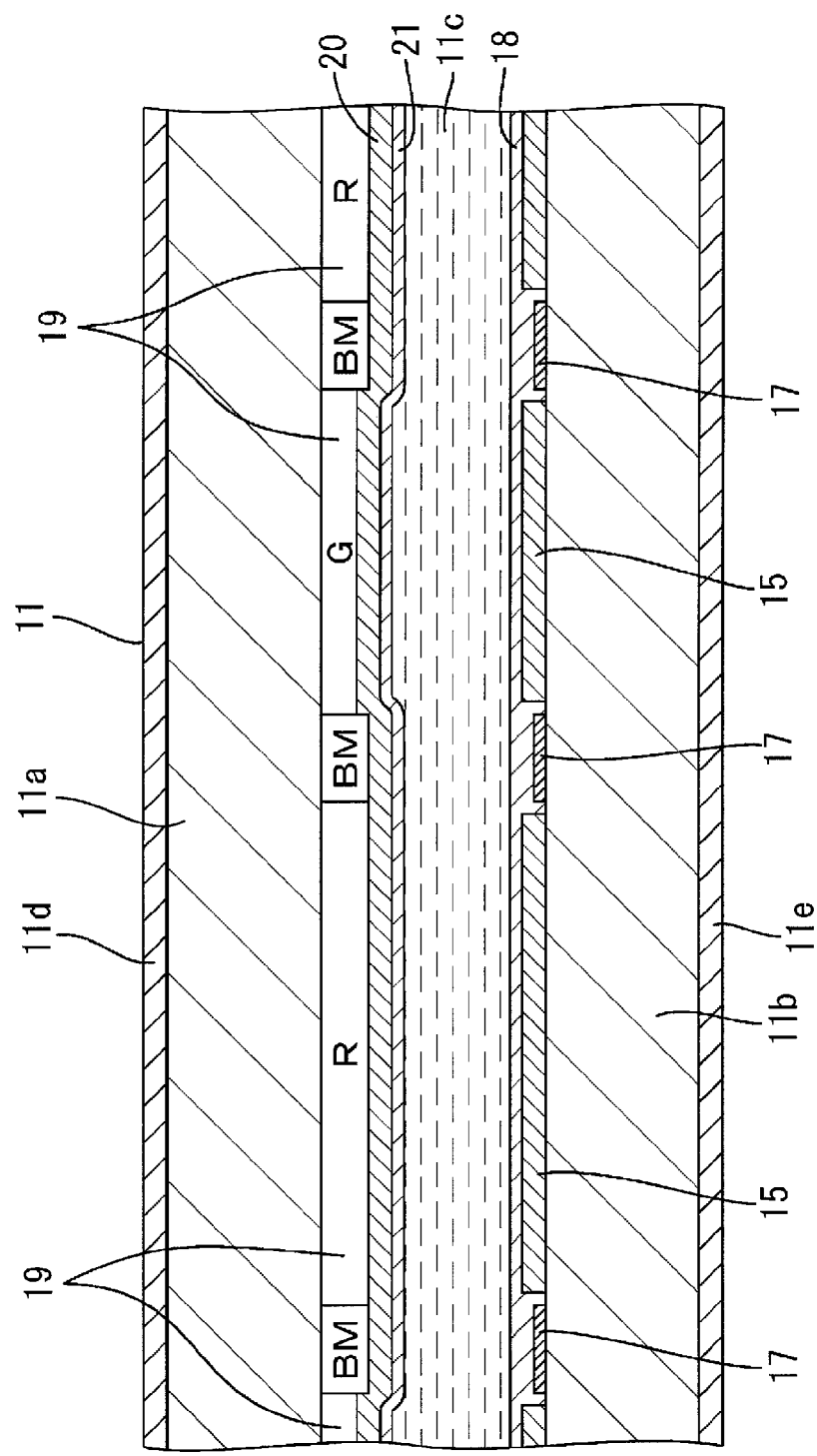
FIG. 20 is a cross sectional view showing a cross sectional configuration of the color sections according to the seventh and the eighth examples, and the seventeenth and the eighteenth examples.
Figure 21:
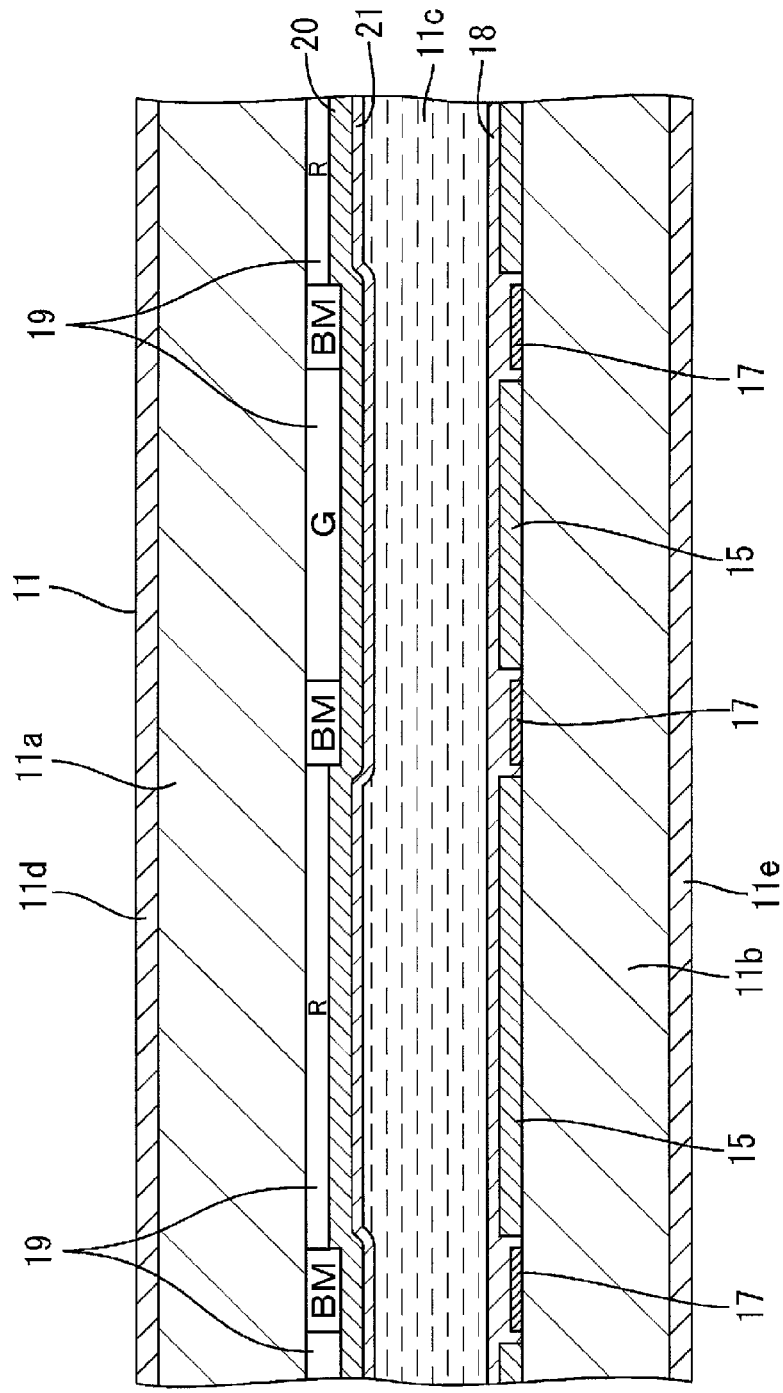
FIG. 21 is a cross sectional view showing a cross sectional configuration of the color sections according to the ninth to the eleventh examples and the nineteenth to the twenty-first examples.

On the other hand, in the seventh, the eighth, the seventeenth, and the eighteenth examples, as shown in FIG. 20, of the color sections R, G, B, and Y with the different area ratios, the red color section R has a film thickness greater than the other color section G, B, or Y. Specifically, in the seventh and the seventeenth examples, the red color section R has the film thickness of 2.3 μm, which is about 109.5% of the film thickness of the other color section G, B, or Y (which is uniform at 2.1 μm). In the eighth and the eighteenth examples, the red color section R has the film thickness of 2.5 μm, which is about 119.0% of the film thickness of the other color section G, B, or Y. In the ninth to the eleventh examples and the nineteenth to the twenty-first examples, as shown in FIG. 21, of the color sections R, G, B, and Y with the different area ratios, the red color section R has a film thickness smaller than the film thickness of the other color section G, B, or Y. Specifically, in the ninth and the nineteenth examples, the red color section R has the film thickness of 1.8 μm, which is about 85.7% of the film thickness of the other color section G, B, or Y (uniform at 2.1 μm). In the tenth and the twentieth examples, the red color section R has the film thickness of 1.5 μm, which is about 71.4% of the film thickness of the other color section G, B, or Y. In the eleventh and the twenty-first example, the red color section R has the film thickness of 1.2 μm, which is about 57.1% of the film thickness of the other color section G, B or Y. Thus, in the ninth to the eleventh examples according to the first experiment example and in the nineteenth to the twenty-first examples according to the second experiment example, the red color section R has a film thickness in the range of 57.1% to 85.8% of the film thickness of the other color section G, B, or Y.

In Tables 2 and 3, the NTSC ratio of the chromaticity region of the output light is the area ratio of the chromaticity region of the output light with respect to the NTSC chromaticity region A1, which is measured in each of the respective comparative examples, the examples, and the reference example. When the NTSC ratio is 70% or more in each of the CIE1931 chromaticity diagram and the CIE1976 chromaticity diagram, it can be said that sufficient color reproducibility, or display quality, for viewing the liquid crystal display devices 10 and 10' is ensured. Because the NTSC ratio of the EBU chromaticity region A2 is 72%, it can be said that the chromaticity region of the same level as the EBU standard or higher is ensured when, preferably, the chromaticity region of output light is 72% or more, whereby better display quality can be obtained.

In the examples and the reference example, the chromaticity of the LEDs 24 and 44 was adjusted in accordance with the changes in the area ratio of the respective color sections R, G, B, and Y and the film thickness of the blue color section B or the red color section R to correct the chromaticity of the output light (display image) from the liquid crystal panel 11 to be white. The chromaticity of the respective colors of the output light shown in Tables 2 and 3 was obtained by passing light through the color sections R, G, B and Y in the color filter 19 and measuring the output light by using a spectrophotometer, for example, while controlling the driving of the TFTs 14 to display the respective colors. Specifically, for the "chromaticity of output light at the time of yellow color display", for example, the transmitted light was measured by controlling the driving of the TFTs 14 such that the transmittance of the yellow color section Y was substantially 100% while the transmittance of the other color sections R, G, and B was substantially 0%. The measurements were conducted similarly for the other colors. The chromaticity of the LEDs 24 and 44 and the chromaticity of the output light according to the examples and the reference example are plotted on the chromaticity diagrams of FIGS. 22 to 25, where the chromaticity region of each of the examples and the reference example is indicated by a quadrangle region enclosed by the four points of the chromaticity of the output light at the time of red color display (red color chromaticity; red primary color point); the chromaticity of the output light at the time of green color display (green color chromaticity; green primary color point); the chromaticity of the output light at the time of blue color display (blue color chromaticity; blue primary color point); and the chromaticity of the output light at the time of yellow color display (yellow color chromaticity; yellow color primary color point).

In the examples and the reference example, the respective color sections R, G, B, and Y have a certain pigment concentration. Thus, the chromaticity of the respective color sections R, G, B, and Y is varied depending on the size of their film thickness. Specifically, as the film thickness becomes smaller, color purity decreases and the chromaticity region becomes smaller; yet the amount of transmitted light belonging to the corresponding color is increased. Conversely, as the film thickness is increased, the amount of transmitted light belonging to the corresponding color decreases; yet color purity increases and the chromaticity region becomes larger. Namely, in the color sections R, G, B, and Y, as the film thickness becomes smaller, brightness increases although color reproducibility may deteriorate. Conversely, as the film thickness is increased, excellent color reproducibility can be obtained although brightness may be decreased.

The X, Y, and Z values shown in Tables 2 to 3 indicate the tristimulus values in an XYZ color system. Particularly, the Y value is used as an index of luminance, i.e., brightness. According to the present embodiment, the brightness of output light are calculated on the basis of the Y value, and the brightness of the output light shown in Tables 2 to 3 indicates relative values with respect to the brightness of the comparative examples 1 and 2 as 100% respectively (reference). Specifically, the brightness of the light source is calculated on the basis of the Y value at the "chromaticity of the light source", and the brightness of the output light is calculated on the basis of the Y value at the "chromaticity of the output light at the time of white display". The x value and the y value may be expressed by using the X value, the Y value, and the Z value above described according to the following expressions (1) and (2). Similarly, the u' and v' values can also be expressed by using the X value, the Y value, and the Z value according to expressions (3) and (4).

[Expression 1]

$$x = X/(X+Y+Z) \tag{1}$$

[Expression 2]

$$y = Y/(X+Y+Z) \tag{2}$$

[Expression 3]

$$u' = 4X/(X+15Y+3Z) \tag{3}$$

[Expression 4]

$$v' = 9Y/(X+15Y+3Z) \tag{4}$$

TABLE 2

|  |  | \multicolumn{7}{c}{1ST EXPERIMENTAL EXAMPLE} |
|---|---|---|---|---|---|---|---|---|
|  |  | C. EX. 1 | EX. 1 | EX. 2 | EX. 3 | EX. 4 | EX. 5 | EX. 6 |
| AREA | R | 1 | 1 | 1.6 | 1.6 | 1.6 | 1.6 | 1.6 |
| RATIO | Y | 0 | 1 | 1 | 1 | 1 | 1 | 1 |
|  | G | 1 | 1 | 1 | 1 | 1 | 1 | 1 |
|  | B | 1 | 1 | 1.6 | 1.6 | 1.6 | 1.6 | 1.6 |
| FILM | R | 2.1 | 2.1 | 2.1 | 2.1 | 2.1 | 2.1 | 2.1 |
| THICK- | Y | — | 2.1 | 2.1 | 2.1 | 2.1 | 2.1 | 2.1 |
| NESS | G | 2.1 | 2.1 | 2.1 | 2.1 | 2.1 | 2.1 | 2.1 |
| (μm) | B | 2.1 | 2.1 | 2.1 | 1.8 | 1.5 | 1.4 | 1.3 |
| OUTPUT LIGHT BRIGHTNESS |  | 100.00% | 109.52% | 113.48% | 115.58% | 118.07% | 118.15% | 119.42% |
| NTSC RATIO (CIE1931) |  | 78.69% | 80.81% | 80.31% | 79.44% | 78.10% | 77.59% | 76.76% |
| NTSC RATIO (CIE1976) |  | 87.34% | 95.31% | 88.91% | 85.72% | 81.63% | 80.48% | 78.32% |
| LED | x | 0.245 | 0.2074 | 0.2207 | 0.2215 | 0.2227 | 0.2234 | 0.2234 |
| CHRO- | y | 0.206 | 0.1358 | 0.1761 | 0.1765 | 0.1765 | 0.1749 | 0.1749 |
| MATICITY | u' | 0.1967 | 0.1968 | 0.189 | 0.1895 | 0.1906 | 0.1921 | 0.1921 |
|  | v' | 0.3721 | 0.29 | 0.3392 | 0.3398 | 0.34 | 0.3384 | 0.3384 |
|  | X | 202.2577 | 205.7999 | 201.6922 | 201.8649 | 202.278 | 202.8865 | 202.8865 |
|  | Y | 170.0346 | 134.7787 | 160.877 | 160.8463 | 160.3282 | 158.836 | 158.836 |
|  | Z | 453.123 | 651.8115 | 551.1226 | 548.6399 | 545.7444 | 546.4987 | 546.4987 |
| WHITE | x | 0.272 | 0.2711 | 0.2719 | 0.2711 | 0.2711 | 0.272 | 0.2713 |
| CHRO- | y | 0.2761 | 0.2779 | 0.2779 | 0.2778 | 0.2779 | 0.2761 | 0.2767 |
| MATICITY | u' | 0.1886 | 0.1872 | 0.1878 | 0.1872 | 0.1872 | 0.1886 | 0.1878 |
|  | v' | 0.4307 | 0.4318 | 0.4319 | 0.4317 | 0.4318 | 0.4307 | 0.431 |
|  | X | 1.758675 | 1.915593 | 1.981636 | 2.01313 | 2.055423 | 2.078031 | 2.090677 |
|  | Y | 1.784997 | 1.963968 | 2.0256 | 2.06303 | 2.107557 | 2.109049 | 2.131688 |
|  | Z | 2.92225 | 3.187331 | 3.280955 | 3.350732 | 3.419692 | 3.452955 | 3.482956 |
| RED | x | 0.6449 | 0.6333 | 0.6334 | 0.6341 | 0.6354 | 0.6368 | 0.6368 |
| CHRO- | y | 0.3406 | 0.3365 | 0.3432 | 0.3429 | 0.3423 | 0.3415 | 0.3415 |
| MATICITY | u' | 0.445 | 0.4389 | 0.433 | 0.4338 | 0.4354 | 0.4373 | 0.4373 |
|  | v' | 0.5288 | 0.5247 | 0.5279 | 0.5278 | 0.5278 | 0.5277 | 0.5277 |
|  | X | 0.678809 | 0.348747 | 0.465895 | 0.472971 | 0.485823 | 0.498022 | 0.498022 |
|  | Y | 0.358531 | 0.18529 | 0.252452 | 0.255787 | 0.261717 | 0.267071 | 0.267071 |
|  | Z | 0.015322 | 0.016637 | 0.01717 | 0.017095 | 0.017009 | 0.017036 | 0.017036 |

TABLE 2-continued

| | | | | | | | | |
|---|---|---|---|---|---|---|---|---|
| YELLOW CHRO-MATICITY | x | — | 0.4113 | 0.4 | 0.4015 | 0.4044 | 0.4078 | 0.4078 |
| | y | — | 0.5587 | 0.5729 | 0.5716 | 0.569 | 0.5657 | 0.5657 |
| | u' | — | 0.1852 | 0.1763 | 0.1773 | 0.1794 | 0.1818 | 0.1818 |
| | v' | — | 0.5661 | 0.5682 | 0.5681 | 0.5678 | 0.5674 | 0.5674 |
| | X | — | 0.665097 | 0.603453 | 0.607161 | 0.612611 | 0.614999 | 0.614999 |
| | Y | — | 0.903409 | 0.86428 | 0.864518 | 0.861979 | 0.853135 | 0.853135 |
| | Z | — | 0.048443 | 0.040851 | 0.040703 | 0.040363 | 0.039889 | 0.039889 |
| GREEN CHRO-MATICITY | x | 0.2972 | 0.2886 | 0.2892 | 0.2896 | 0.2903 | 0.291 | 0.291 |
| | y | 0.6518 | 0.6425 | 0.6535 | 0.6533 | 0.6526 | 0.6515 | 0.6515 |
| | u' | 0.1162 | 0.1139 | 0.1127 | 0.1129 | 0.1133 | 0.1137 | 0.1137 |
| | v' | 0.5736 | 0.5707 | 0.573 | 0.573 | 0.5728 | 0.5728 | 0.5728 |
| | X | 0.547062 | 0.307739 | 0.296588 | 0.2964 | 0.294982 | 0.291304 | 0.291304 |
| | Y | 1.199872 | 0.685226 | 0.670285 | 0.668705 | 0.663164 | 0.652118 | 0.652118 |
| | Z | 0.093873 | 0.073537 | 0.058764 | 0.058542 | 0.058088 | 0.057549 | 0.057549 |
| BLUE CHRO-MATICITY | x | 0.1515 | 0.1524 | 0.1518 | 0.1527 | 0.1553 | 0.157 | 0.1593 |
| | y | 0.0661 | 0.0468 | 0.0584 | 0.0662 | 0.0769 | 0.0806 | 0.0861 |
| | u' | 0.1736 | 0.1872 | 0.1787 | 0.1751 | 0.172 | 0.1719 | 0.1715 |
| | v' | 0.1704 | 0.1293 | 0.1547 | 0.1708 | 0.1916 | 0.1986 | 0.2086 |
| | X | 0.536331 | 0.569168 | 0.597838 | 0.621984 | 0.657575 | 0.676436 | 0.699668 |
| | Y | 0.233913 | 0.174982 | 0.22988 | 0.269473 | 0.32562 | 0.347345 | 0.378014 |
| | Z | 2.770619 | 2.990956 | 3.111273 | 3.181013 | 3.250422 | 3.284349 | 3.314121 |

| | | | 1ST EXPERIMENTAL XAMPLE | | | | | |
|---|---|---|---|---|---|---|---|---|
| | | | REF. EX. | EX. 7 | EX. 8 | EX. 9 | EX. 10 | EX. 11 |
| AREA RATIO | | R | 1.6 | 1.6 | 1.6 | 1.6 | 1.6 | 1.6 |
| | | Y | 1 | 1 | 1 | 1 | 1 | 1 |
| | | G | 1 | 1 | 1 | 1 | 1 | 1 |
| | | B | 1.6 | 1.6 | 1.6 | 1.6 | 1.6 | 1.6 |
| FILM THICK-NESS (μm) | | R | 2.1 | 2.3 | 2.5 | 1.8 | 1.5 | 1.2 |
| | | Y | 2.1 | 2.1 | 2.1 | 2.1 | 2.1 | 2.1 |
| | | G | 2.1 | 2.1 | 2.1 | 2.1 | 2.1 | 2.1 |
| | | B | 1.2 | 2.1 | 2.1 | 2.1 | 2.1 | 2.1 |
| OUTPUT LIGHT BRIGHTNESS | | | 121.03% | 112.29% | 111.94% | 113.69% | 115.29% | 118.20% |
| NTSC RATIO (CIE1931) | | | 75.73% | 81.61% | 82.46% | 77.69% | 73.10% | 65.76% |
| NTSC RATIO (CIE1976) | | | 75.77% | 91.09% | 92.30% | 85.65% | 79.60% | 69.93% |
| LED CHRO-MATICITY | x | | 0.2236 | 0.2211 | 0.2212 | 0.2209 | 0.2209 | 0.2214 |
| | y | | 0.1753 | 0.1747 | 0.1748 | 0.1748 | 0.1753 | 0.1767 |
| | u' | | 0.1921 | 0.19 | 0.1901 | 0.1898 | 0.1895 | 0.1893 |
| | v' | | 0.3388 | 0.3378 | 0.3379 | 0.3379 | 0.3384 | 0.34 |
| | X | | 202.8785 | 202.1412 | 202.133 | 202.0417 | 201.9401 | 201.7828 |
| | Y | | 159.0247 | 159.7365 | 159.7786 | 159.8882 | 160.2431 | 161.0345 |
| | Z | | 545.2393 | 552.2485 | 552.0782 | 552.736 | 551.7966 | 548.5738 |
| WHITE CHRO-MATICITY | x | | 0.2711 | 0.2725 | 0.2721 | 0.2729 | 0.2729 | 0.2726 |
| | y | | 0.2779 | 0.2761 | 0.2761 | 0.2761 | 0.2761 | 0.2761 |
| | u' | | 0.1872 | 0.189 | 0.1887 | 0.1893 | 0.1893 | 0.189 |
| | v' | | 0.4318 | 0.4308 | 0.4307 | 0.4309 | 0.4309 | 0.4308 |
| | X | | 2.107016 | 1.978505 | 1.969474 | 2.00626 | 2.03475 | 2.083434 |
| | Y | | 2.160463 | 2.004301 | 1.998117 | 2.029406 | 2.057906 | 2.109896 |
| | Z | | 3.505423 | 3.277463 | 3.270618 | 3.315425 | 3.362131 | 3.449182 |
| RED CHRO-MATICITY | x | | 0.6369 | 0.6417 | 0.6469 | 0.6165 | 0.5863 | 0.5384 |
| | y | | 0.3415 | 0.3428 | 0.3426 | 0.3411 | 0.3373 | 0.3314 |
| | u' | | 0.4374 | 0.4403 | 0.4448 | 0.4208 | 0.3992 | 0.365 |
| | v' | | 0.5277 | 0.5292 | 0.53 | 0.5239 | 0.5167 | 0.5055 |
| | X | | 0.499595 | 0.463836 | 0.455056 | 0.489973 | 0.515814 | 0.55953 |
| | Y | | 0.267866 | 0.247784 | 0.240999 | 0.27105 | 0.296715 | 0.344361 |
| | Z | | 0.016998 | 0.011177 | 0.007398 | 0.033725 | 0.067258 | 0.135349 |
| YELLOW CHRO-MATICITY | x | | 0.408 | 0.4024 | 0.4024 | 0.4017 | 0.4013 | 0.401 |
| | y | | 0.5656 | 0.5707 | 0.5707 | 0.5713 | 0.5717 | 0.5721 |
| | u' | | 0.1819 | 0.178 | 0.178 | 0.1775 | 0.1772 | 0.177 |
| | v' | | 0.5674 | 0.5679 | 0.5679 | 0.568 | 0.5681 | 0.5681 |
| | X | | 0.616368 | 0.604586 | 0.604733 | 0.603508 | 0.60402 | 0.606797 |
| | Y | | 0.854448 | 0.85743 | 0.857704 | 0.858233 | 0.860464 | 0.865629 |
| | Z | | 0.039886 | 0.040516 | 0.040521 | 0.040596 | 0.040667 | 0.040765 |
| GREEN CHRO-MATICITY | x | | 0.2911 | 0.2897 | 0.2897 | 0.2895 | 0.2894 | 0.2895 |
| | y | | 0.6515 | 0.6528 | 0.6528 | 0.6529 | 0.6531 | 0.6534 |
| | u' | | 0.1138 | 0.113 | 0.113 | 0.1129 | 0.1128 | 0.1128 |
| | v' | | 0.5728 | 0.573 | 0.573 | 0.573 | 0.573 | 0.5731 |
| | X | | 0.291719 | 0.293795 | 0.293892 | 0.294194 | 0.295037 | 0.296867 |
| | Y | | 0.6529 | 0.662086 | 0.662318 | 0.663518 | 0.665749 | 0.670124 |
| | Z | | 0.05752 | 0.058396 | 0.058398 | 0.058498 | 0.058563 | 0.058613 |

TABLE 2-continued

|  |  |  |  |  |  |  |  |
|---|---|---|---|---|---|---|---|
| BLUE | x | 0.1626 | 0.1518 | 0.1518 | 0.1518 | 0.1518 | 0.1518 |
| CHRO- | y | 0.0927 | 0.0578 | 0.0579 | 0.0579 | 0.0581 | 0.0585 |
| MATICITY | u' | 0.1717 | 0.1791 | 0.1791 | 0.1791 | 0.1789 | 0.1787 |
|  | v' | 0.2203 | 0.1535 | 0.1537 | 0.1537 | 0.1541 | 0.1549 |
|  | X | 0.728552 | 0.598822 | 0.598649 | 0.599372 | 0.598437 | 0.595148 |
|  | Y | 0.415354 | 0.228139 | 0.228161 | 0.228578 | 0.228927 | 0.22934 |
|  | Z | 3.336564 | 3.117702 | 3.116739 | 3.120443 | 3.115119 | 3.096881 |

TABLE 3

|  |  | 2ND EXPERIMENTAL EXAMPLE | | | | | |
|---|---|---|---|---|---|---|---|
|  |  | C. EX. 2 | EX. 12 | EX. 13 | EX. 14 | EX. 15 | EX. 16 |
| AREA | R | 1 | 1 | 1.6 | 1.6 | 1.6 | 1.6 |
| RATIO | Y | 0 | 1 | 1 | 1 | 1 | 1 |
|  | G | 1 | 1 | 1 | 1 | 1 | 1 |
|  | B | 1 | 1 | 1.6 | 1.6 | 1.6 | 1.6 |
| FILM | R | 2.1 | 2.1 | 2.1 | 2.1 | 2.1 | 2.1 |
| THICK- | Y | — | 2.1 | 2.1 | 2.1 | 2.1 | 2.1 |
| NESS | G | 2.1 | 2.1 | 2.1 | 2.1 | 2.1 | 2.1 |
| (μm) | B | 2.1 | 2.1 | 2.1 | 1.8 | 1.5 | 1.2 |
| OUTPUT LIGHT BRIGHTNESS | | 100.00% | 116.08% | 116.38% | 119.06% | 121.53% | 124.51% |
| NTSC RATIO (CIE1931) | | 78.91% | 81.00% | 80.76% | 79.70% | 77.89% | 74.22% |
| NTSC RATIO (CIE1976) | | 90.74% | 97.97% | 92.45% | 88.70% | 83.47% | 75.16% |
| LED | x | 0.2627 | 0.22 | 0.2347 | 0.2361 | 0.237 | 0.2382 |
| CHRO- | y | 0.2349 | 0.1576 | 0.2013 | 0.2035 | 0.2033 | 0.2019 |
| MATICITY | u' | 0.1985 | 0.1977 | 0.1898 | 0.19 | 0.1909 | 0.1926 |
|  | v' | 0.3994 | 0.3187 | 0.3663 | 0.3685 | 0.3685 | 0.3674 |
|  | X | 199.7113 | 205.5049 | 200.4383 | 200.3449 | 200.6694 | 201.3409 |
|  | Y | 178.5595 | 147.2838 | 171.8895 | 172.6781 | 172.113 | 170.666 |
|  | Z | 381.9506 | 581.4801 | 481.6713 | 475.5019 | 474.0082 | 473.4042 |
| WHITE | x | 0.2721 | 0.2717 | 0.2722 | 0.2719 | 0.2711 | 0.2711 |
| CHRO- | y | 0.2761 | 0.2773 | 0.2761 | 0.2779 | 0.2779 | 0.2779 |
| MATICITY | u' | 0.1887 | 0.1879 | 0.1887 | 0.1878 | 0.1872 | 0.1872 |
|  | v' | 0.4307 | 0.4315 | 0.4307 | 0.4319 | 0.4318 | 0.4318 |
|  | X | 8.070673 | 9.318878 | 9.395512 | 9.535475 | 9.705006 | 9.942306 |
|  | Y | 8.187661 | 9.51437 | 9.52875 | 9.74852 | 9.950654 | 10.19411 |
|  | Z | 13.39983 | 15.47133 | 15.59388 | 15.79145 | 16.1459 | 16.53991 |
| RED | x | 0.6486 | 0.6399 | 0.6389 | 0.6394 | 0.6402 | 0.6416 |
| CHRO- | y | 0.3408 | 0.3384 | 0.3441 | 0.344 | 0.3436 | 0.3426 |
| MATICITY | u' | 0.4479 | 0.4428 | 0.4368 | 0.4373 | 0.4383 | 0.4404 |
|  | v' | 0.5295 | 0.5268 | 0.5293 | 0.5293 | 0.5293 | 0.5291 |
|  | X | 2.968953 | 1.620234 | 2.109619 | 2.139744 | 2.176333 | 2.237481 |
|  | Y | 1.560237 | 0.856948 | 1.1363 | 1.15133 | 1.167855 | 1.194903 |
|  | Z | 0.048635 | 0.054936 | 0.056005 | 0.055332 | 0.055165 | 0.055091 |
| YELLOW | x | — | 0.4101 | 0.3993 | 0.4002 | 0.4022 | 0.4058 |
| CHRO- | y | — | 0.5574 | 0.5715 | 0.5709 | 0.5691 | 0.5657 |
| MATICITY | u' | — | 0.185 | 0.1763 | 0.1769 | 0.1783 | 0.1808 |
|  | v' | — | 0.5657 | 0.5678 | 0.5677 | 0.5675 | 0.5672 |
|  | X | — | 3.198684 | 2.819918 | 2.846127 | 2.859429 | 2.875569 |
|  | Y | — | 4.347383 | 4.036298 | 4.060034 | 4.046 | 4.008457 |
|  | Z | — | 0.252928 | 0.206207 | 0.205757 | 0.204446 | 0.201991 |
| GREEN | x | 0.2998 | 0.2905 | 0.2912 | 0.2916 | 0.2921 | 0.293 |
| CHRO- | y | 0.6458 | 0.6354 | 0.6472 | 0.6473 | 0.6468 | 0.6456 |
| MATICITY | u' | 0.1181 | 0.1157 | 0.1144 | 0.1145 | 0.1148 | 0.1153 |
|  | v' | 0.5726 | 0.5694 | 0.572 | 0.572 | 0.572 | 0.5718 |
|  | X | 2.632124 | 1.557748 | 1.452878 | 1.460855 | 1.454531 | 1.438697 |
|  | Y | 5.669051 | 3.406603 | 3.229506 | 3.243446 | 3.220842 | 3.170069 |
|  | Z | 0.476962 | 0.39716 | 0.307335 | 0.306045 | 0.304292 | 0.301277 |
| BLUE | x | 0.1528 | 0.153 | 0.1528 | 0.1547 | 0.1599 | 0.1744 |
| CHRO- | y | 0.0585 | 0.0424 | 0.0515 | 0.0599 | 0.0722 | 0.0932 |
| MATICITY | u' | 0.18 | 0.1911 | 0.1845 | 0.1815 | 0.1803 | 0.1851 |
|  | v' | 0.155 | 0.1191 | 0.1399 | 0.1581 | 0.1832 | 0.2225 |
|  | X | 2.489251 | 2.79633 | 2.874192 | 2.987956 | 3.233315 | 3.791868 |
|  | Y | 0.952634 | 0.774258 | 0.969874 | 1.156189 | 1.459148 | 2.027061 |
|  | Z | 12.85057 | 14.70428 | 14.97215 | 15.17219 | 15.52937 | 15.92848 |

TABLE 3-continued

| | | 2ND EXPERIMENTAL EXAMPLE | | | | |
|---|---|---|---|---|---|---|
| | | EX. 17 | EX. 18 | EX. 19 | EX. 20 | EX. 21 |
| AREA RATIO | R | 1.6 | 1.6 | 1.6 | 1.6 | 1.6 |
| | Y | 1 | 1 | 1 | 1 | 1 |
| | G | 1 | 1 | 1 | 1 | 1 |
| | B | 1.6 | 1.6 | 1.6 | 1.6 | 1.6 |
| FILM THICKNESS (μm) | R | 2.3 | 2.5 | 1.8 | 1.5 | 1.2 |
| | Y | 2.1 | 2.1 | 2.1 | 2.1 | 2.1 |
| | G | 2.1 | 2.1 | 2.1 | 2.1 | 2.1 |
| | B | 2.1 | 2.1 | 2.1 | 2.1 | 2.1 |
| OUTPUT LIGHT BRIGHTNESS | | 115.80% | 115.45% | 117.31% | 118.92% | 121.79% |
| NTSC RATIO (CIE1931) | | 82.02% | 82.90% | 77.88% | 72.99% | 65.14% |
| NTSC RATIO (CIE1976) | | 94.59% | 96.06% | 87.95% | 80.68% | 69.37% |
| LED CHROMATICITY | x | 0.2355 | 0.2355 | 0.2349 | 0.2349 | 0.2354 |
| | y | 0.2014 | 0.2015 | 0.2015 | 0.202 | 0.2034 |
| | u' | 0.1905 | 0.1904 | 0.1899 | 0.1897 | 0.1895 |
| | v' | 0.3665 | 0.3666 | 0.3665 | 0.367 | 0.3683 |
| | X | 200.6416 | 200.6296 | 200.4595 | 200.3333 | 200.1458 |
| | Y | 171.6318 | 171.6767 | 171.9123 | 172.2636 | 172.953 |
| | Z | 479.8096 | 479.6128 | 480.9727 | 480.1269 | 477.0833 |
| WHITE CHROMATICITY | x | 0.2729 | 0.2725 | 0.2729 | 0.2729 | 0.2726 |
| | y | 0.2761 | 0.2761 | 0.2761 | 0.2761 | 0.2761 |
| | u' | 0.1893 | 0.189 | 0.1893 | 0.1893 | 0.189 |
| | v' | 0.4309 | 0.4308 | 0.4309 | 0.4309 | 0.4308 |
| | X | 9.374069 | 9.331776 | 9.495178 | 9.625624 | 9.846231 |
| | Y | 9.481534 | 9.452688 | 9.604789 | 9.736979 | 9.971734 |
| | Z | 15.49018 | 15.45693 | 15.69048 | 15.90669 | 16.30405 |
| RED CHROMATICITY | x | 0.6464 | 0.6512 | 0.6225 | 0.5937 | 0.5476 |
| | y | 0.3425 | 0.3413 | 0.3461 | 0.3485 | 0.3521 |
| | u' | 0.4445 | 0.4496 | 0.4214 | 0.3962 | 0.3573 |
| | v' | 0.5299 | 0.5302 | 0.5272 | 0.5232 | 0.5169 |
| | X | 2.092403 | 2.053199 | 2.202694 | 2.324434 | 2.535783 |
| | Y | 1.108826 | 1.076211 | 1.224579 | 1.364499 | 1.63047 |
| | Z | 0.035986 | 0.023745 | 0.111271 | 0.226167 | 0.464353 |
| YELLOW CHROMATICITY | x | 0.4007 | 0.4007 | 0.3995 | 0.3991 | 0.3988 |
| | y | 0.5702 | 0.5702 | 0.5713 | 0.5717 | 0.5721 |
| | u' | 0.1773 | 0.1773 | 0.1764 | 0.1762 | 0.1759 |
| | v' | 0.5676 | 0.5676 | 0.5677 | 0.5678 | 0.5678 |
| | X | 2.832479 | 2.833134 | 2.823526 | 2.824843 | 2.834927 |
| | Y | 4.030487 | 4.031761 | 4.037243 | 4.046862 | 4.066434 |
| | Z | 0.20528 | 0.205297 | 0.206049 | 0.206376 | 0.206634 |
| GREEN CHROMATICITY | x | 0.2916 | 0.2916 | 0.2913 | 0.2912 | 0.2912 |
| | y | 0.6469 | 0.6469 | 0.6472 | 0.6474 | 0.6477 |
| | u' | 0.1146 | 0.1146 | 0.1144 | 0.1143 | 0.1143 |
| | v' | 0.5719 | 0.5719 | 0.572 | 0.572 | 0.5721 |
| | X | 1.449866 | 1.450336 | 1.453052 | 1.456804 | 1.464026 |
| | Y | 3.21663 | 3.217752 | 3.228782 | 3.239071 | 3.256314 |
| | Z | 0.305998 | 0.305995 | 0.307062 | 0.30735 | 0.307288 |
| BLUE CHROMATICITY | x | 0.1528 | 0.1528 | 0.1528 | 0.1527 | 0.1527 |
| | y | 0.0515 | 0.0515 | 0.0516 | 0.0517 | 0.052 |
| | u' | 0.1845 | 0.1845 | 0.1845 | 0.1843 | 0.1841 |
| | v' | 0.1399 | 0.1399 | 0.1401 | 0.1404 | 0.141 |
| | X | 2.86321 | 2.86209 | 2.870138 | 2.865416 | 2.848095 |
| | Y | 0.965599 | 0.965617 | 0.969047 | 0.970158 | 0.970412 |
| | Z | 14.91444 | 14.90828 | 14.95039 | 14.92377 | 14.82848 |

First, a comparison of the first comparative example and the first example in the first experiment example using the edge light backlight unit 12 indicates that, as shown in Table 2, the values of both the brightness of the output light and the NTSC ratio are increased by changing the liquid crystal panel from the three primary color type to the four primary color type. In other words, by including the yellow color section Y in the color filter 19, both brightness and color reproducibility tend to be increased. However, with regard to the chromaticity of the output light at the time of red color display (red color chromaticity), it is seen that the Y value, or brightness, decreases significantly compared to the other colors as the liquid crystal panel is changed from the three primary color type to the four primary color type. This is supposedly due to the fact that in the liquid crystal panel 11 of the four primary color type, the number of the sub-pixels constituting each pixel is increased from three to four compared to the three primary color type. Thus, the area of each sub-pixel is decreased, causing the decrease in the brightness of red light in particular. On the other hand, the x value, the y value, the u' value, the v' value, and the Y value concerning the chromaticity of the LED are all lower in the first example than in the first comparative example. This indicates that, when the LED is subjected to chromaticity adjustment to correct the chromaticity of the display image in accordance with the liquid crystal panel of the four color type, the chromaticity of the LED is shifted toward blue and the brightness of the LED itself is decreased. These tendencies are also seen in the second experiment example using the direct backlight unit 40 (see the chromaticity of the LED, the brightness of output light, the NTSC ratio, and the Y value concerning the chromaticity of output light at the time of red color display in the second comparative example and the twelfth example in Table 3).

A comparison of the first example and the second example in the first experiment example indicates that, as shown in Table 2, by increasing the area ratio of the blue color section B or the red color section R relative to the yellow color section Y or the green color section G, the x value, the y value, the u' value, the v' value, and the Y value concerning the chromaticity of the LED, and the brightness of output light are all increased, and that the Y value concerning the chromaticity of the output light at the time of red color display is increased. It is also seen that, with regard to the values concerning the chromaticity of the LED, the chromaticity of the LED is shifted more toward yellow in the second example than in the first example, and that the brightness of the LED itself is relatively high in the second example than in the first example. This is supposedly due to the fact that, by increasing the area ratio of the blue color section B, more blue light, which is the complementary color to yellow, can be included in the transmitted light through the color filter 19. Therefore, when adjusting the chromaticity of the LED to correct the chromaticity of the display image, the chromaticity of the LED does not need to be adjusted so much toward blue and therefore the decrease in brightness of the LED as a result of chromaticity adjustment is suppressed. And the brightness of output light in the second example is improved due to its higher brightness of the LED than in the first example. With regard to the Y value concerning the chromaticity of the output light at the time of red color display, it is supposed that by increasing the area ratio of the red color section R, more red light can be included in the transmitted light through the color filter 19. In this way, the decrease in brightness of the red light as a result of the adoption of the four color type can be suppressed. These tendencies are also seen in the second experiment example using the direct backlight unit 40 (see the chromaticity of the LED, the brightness of output light, and the Y value concerning the chromaticity of output light at the time of red color display in the twelfth example and the thirteenth example shown in Table 3). In the first experiment example, the difference in brightness value of the output light between the first and the second examples is 3.96% whereas in the second experiment example, the difference in brightness value of the output light between the twelfth and the thirteenth examples is 0.3%. Thus, it can be seen that the effect of improving brightness of the output light by the adoption of the above-described area ratio is relatively high in the case where the edge light backlight unit 12 is used (the first experiment example) compared to the case where the direct backlight unit 40 is used (the second experiment example). This is supposedly due to the presence or absence of the light guide member 26 in the backlight units 12 and 40.

Next, a comparison of the examples according to the first experiment example and the examples according to the second experiment example indicates that, as shown in Tables 2 and 3, the brightness and the NTSC ratio in output light are generally high in the second experiment example compared to the first experiment example, and that the chromaticity of the LED in the first experiment example is generally relatively shifted toward blue compared to the second experiment example. This indicates the following. Namely, with regard to the chromaticity of the LED, because the edge light backlight unit 12 of the first experiment example includes the light guide member 26 made of a material that tends to have yellowishness in the transmitted light, the chromaticity of the LEDs 24 needs to be adjusted toward blue as the complementary color to yellow, in view of the presence of the light guide member 26. On the other hand, the direct backlight unit 40 according to the second experiment example is not provided with the light guide member 26 of the edge light type. Therefore, the chromaticity of the LEDs 44 can be relatively shifted toward yellow. Thus, it is thought that the decrease in brightness as a result of the chromaticity adjustment of the LED is more suppressed in the second experiment example than in the first experiment example, resulting in the relatively high brightness of the output light in the second experiment example. In order to adjust the chromaticity of the LED toward blue, the content of phosphors in the LED may be decreased to increase blue light output from the LED chip. Conversely, in order to adjust the chromaticity of the LED toward yellow, the content of phosphors in the LED may be increased. Thus, more of the blue light output from the LED chip is used as excitation light for the increased phosphors, thereby decreasing the amount of blue light contained in the output light.

In the first to the twenty-first examples in the first experiment example and the second experiment example, the chromaticity of the output light at the time of blue color display (chromaticity of blue; blue primary color point) lies outside the common region A3 in the respective chromaticity diagrams shown in FIGS. 22 to 25. As mentioned above, the common region A3 is a very important region for maintaining a certain level or higher of display quality (color reproducibility) of the display image, and it is preferable that as much of the common region A3 as possible be included in the chromaticity region of the output light. In this respect, in the first to the twenty-first examples, the chromaticity of the blue color is set outside the common region A3. Thus, most or substantially the entire chromaticity region belonging to the blue color in the common region A3 is included in the chromaticity region belonging to the blue color in the chromaticity region of the output light. Thus, sufficient color reproducibility for viewing the liquid crystal display devices 10 and 10' can be ensured. The "chromaticity region of the output light" herein refers to the quadrangle region with the vertexes corresponding to the chromaticity of the respective colors of red, blue, yellow, and green of the output light in the first to the twenty-first examples (the primary color points). Among others, the chromaticity region belonging to the blue color refers to a predetermined region near the chromaticity of the blue color (primary color point); specifically, an overlapping area of a region enclosed by a circle with a radius corresponding to a distance from the chromaticity of the blue color at the center to the chromaticity of the white color (the chromaticity of the output light at the time of white color display), and the chromaticity region of the output light.

When setting the color filter 19, the amount of transmitted light belonging to the blue color tends to be increased as the chromaticity of the blue color of the output light lies closer to the common region A3, although the chromaticity region may become smaller (color reproducibility is decreased). Specifically, a comparison of the second to the sixth examples in the first experiment example indicates that, as shown in FIGS. 22 and 23, the chromaticity of the blue color of the output light tends to be closer to the common region A3 in the order of the second, third, fourth, fifth, and sixth examples (i.e., as the film thickness becomes smaller); namely, the chromaticity of the blue color of the output light tends to be shifted toward yellow. A comparison of the second example as the farthest one and the sixth example as the closest one with respect to the common region A3 shows that, although the NTSC ratio is lower in the sixth example than in the second example, the Y value of the chromaticity of the blue color is higher in the sixth example than in the second example. This indicates that, as the film thickness of the blue color section B is decreased, the Y value of the chromaticity of the blue color, i.e., the amount of transmitted light belonging to the blue color, is increased, and the chromaticity of the LED does not need to be adjusted so much toward blue. Therefore, the decrease in brightness of the LEDs 24 as a result of chromaticity adjustment can be more suppressed. Thus, as the film thickness of the blue color section B is decreased, the overall amount of transmitted light (the Y value of the chromaticity of the output light at the time of white color display in Table 2) is also increased, resulting in an improvement in the brightness of the output light. On the other hand, the NTSC ratio value tends to be increased in the order of the sixth, fifth, fourth, third, and second examples, indicating that as the film thickness is increased, color reproducibility improves. In the reference example (where the film thickness of the blue color section B is 1.2 μm), a higher brightness value of the output light is obtained than in the sixth example (where the film thickness of the blue color section B is 1.3 μm); however, because the chromaticity of the blue color lies within the common region A3, the chromaticity region belonging to the blue color in the chromaticity region of the output light is smaller in the reference example than in the second to the sixth examples. Therefore, the reference example is slightly inferior in color reproducibility. In the reference example, the NTSC ratio value is the smallest in comparison to the second to the sixth examples. As also seen from Table 3, and FIGS. 24 and 25, roughly the similar results are obtained in the second experiment example. Specifically, a comparison of the thirteenth to the sixteenth examples indicates that the chromaticity of the blue color of the output light tends to be closer to the common region A3 in the order of the thirteenth, fourteenth, fifteenth, and sixteenth examples. A comparison of the thirteenth example as the farthest one and the sixteenth example as the closest one with respect to the common region A3 shows that, although the NTSC ratio is lower in the sixteenth example than in the thirteenth example, the Y value of the chromaticity of the blue color is higher in the sixteenth example than in the thirteenth example. Conversely, the NTSC ratio is higher in the thirteenth example than in the sixteenth example although the Y value of the chromaticity of the blue color is lower in the thirteenth example than in the sixteenth example.

More specifically, a comparison of the second to the sixth examples according to the first experiment example indicates that, as shown in Table 2, in the third to the sixth examples where the film thickness of the blue color section B is smaller than that of the other color section R, G, or Y, the chromaticity of the blue color is greater than the chromaticity in the second example (when the color sections R, G, B, and Y have the same film thickness) in terms of both the y and v' values; specifically, the y value is 0.059 or more and the v' value is 0.155 or more. Further, the chromaticity of the blue color in the third to the sixth examples is, as shown in FIGS. 22 and 23, set to lie outside the common region A3 and within the EBU chromaticity region A2. Thus, compared to the second example in which the chromaticity of the blue color is set to lie outside the EBU chromaticity region A2, the chromaticity of the blue color in each of the third to the sixth examples is relatively close to the common region A3; namely, it is shifted toward yellow. Thus, the amount of transmitted light belonging to the blue color (the Y value of the chromaticity of the blue color in Table 2) is relatively large in the third to the sixth examples compared to the second example. As a result, the brightness of the output light is increased. In other words, because the chromaticity of the blue color in the second example is set to lie outside each of the common region A3 and EBU chromaticity region A2, the chromaticity of the blue color in the second example lies relatively far from the common region A3; namely, it is shifted toward the blue side compared to the third to the sixth examples, in which the chromaticity of the blue color is set to lie within the EBU chromaticity region A2. Accordingly, in the second example, the chromaticity region belonging to the blue color is larger than in the third to the sixth examples. Therefore, the NTSC ratio of 80% or more can be ensured and better color reproducibility can be obtained. Of the thirteenth to the sixteenth examples according to the second experiment example, the chromaticity of the blue color in the fourteenth to the sixteenth examples is greater than in the thirteenth example in terms of the y value and the v' value, as shown in Table 3; specifically, the y value is 0.059 or more and the v' value is 0.155 or more. Further, the chromaticity of the blue color in the fifteenth and the sixteenth examples lies outside the common region A3 and within the EBU chromaticity region A2, as shown in FIGS. 24 and 25, whereas the chromaticity of the blue color in the thirteenth and the fourteenth examples lies outside the common region A3 and the EBU chromaticity region A2. Thus, substantially the same effects as according to the first experiment example are obtained in each case.

As described above, the brightness of the output light tends to be increased as the film thickness of the blue color section B is decreased. However, when the film thickness ratio of the blue color section B with respect to the other color section R, G, or Y drops below 50%, a problem occurs in electrostatic capacity formed between the substrates 11a and 11b of the liquid crystal panel 11. Specifically, the liquid crystal panel 11, as shown in FIGS. 2, 15, and 16, includes the pair of substrates 11a and 11b sandwiching the liquid crystal layer 11c. When controlling the state of alignment of liquid crystal molecules contained in the liquid crystal layer 11c, the value of electrostatic capacity formed between the substrates 11a and 11b must be considered as an important factor. Thus, when the aforementioned film thickness ratio is 50% or less, the discrepancy in electrostatic capacity between the blue color section B and the other color sections R, G, and Y is too large. Thus, it may become difficult to control the liquid crystal molecules, or the transmittance of light. On the other hand, when the aforementioned film thickness ratio is 90% or more, the increase in the amount of transmitted light belonging to the blue color due to the difference in film thickness between the blue color section B and the other color section R, G, or Y may be significantly small. Therefore, sufficient effects cannot be obtained. In this respect, in the third to the sixth examples according to the first experiment example, the aforementioned film thickness ratio is set in the range of 61.8% to 85.8%. Similarly, in the fourteenth to the sixteenth examples according to the second experiment example, the aforementioned film thickness ratio is set in the range of 57.1% to 85.8%. Thus, the state of alignment of the liquid crystal molecules contained in the liquid crystal layer 11c can be preferably controlled by application of an electric field, and the amount of transmitted light belonging to the blue color can be sufficiently increased. Therefore, sufficiently high brightness of the output light can be obtained. Further, the color sections other than the blue color section B, namely the respective color sections R, G, and Y for the colors of red, green, and yellow, have the same film thickness. In addition, the green and yellow color sections G and Y have the same area. Thus, in these color sections, the aforementioned electrostatic capacity is substantially the same. Therefore, the state of alignment of the liquid crystal molecules can be easily controlled by application of an electric field, and the circuit design of the liquid crystal panel 11 can be simplified.

A comparison of the reference example according to the first experiment example and the sixteenth example according to the second experiment example shows the following. Despite the fact that the film thickness of the blue color section B is 1.2 μm in both cases, the chromaticity of the blue color is within the common region A3 in the reference example according to the first experiment example, as shown in FIGS. 22 and 23, whereas outside the common region A3 in the sixteenth example according to the second experiment example, as shown in FIGS. 24 and 25. This is thought to be due to the fact that, with a comparison of the second example according to the first experiment example and the thirteenth example according to the second experiment example, both of which the film thickness of the blue color section B is 2.1 μm, the second example is closer to the common region A3 than the thirteenth example. Namely, the chromaticity of the blue color of the output light tends to be shifted further toward yellow in the first experiment example with the edge light backlight unit 12, than in the second experiment example with the direct backlight unit 40. This is believed to be due to the fact that in the first experiment example, the chromaticity of the LEDs 24 is adjusted in view of the presence of the light guide member 26 as well as the yellow color section Y, whereas in the second experiment example, the chromaticity of the LEDs 44 is adjusted in view of the yellow color section Y but without consideration of the light guide member 26. On the basis of the above tendency, the following can be said. Namely, in the first experiment example, the chromaticity of the blue color of the output light can lie closer to the common region A3, even when the film thickness of the blue color section B is the same as in the second experiment example. Thus, the amount of light belonging to the blue color in the output light can be increased and therefore the brightness of the output light can be increased. In other words, in the first experiment example, the film thickness of the blue color section B can be maintained relatively large compared to the second experiment example such that the difference in film thickness from the other color sections R, G, and Y becomes small, thereby making the problem of electrostatic capacity difficult to occur. On the other hand, in the second experiment example, the chromaticity of the blue color of the output light can be maintained outside the common region A3 even when the film thickness of the blue color section B is made smaller than in the first experiment example. Thus, the effect of improving the brightness of the output light by decreasing the film thickness of the blue color section B can be obtained in a more preferable manner. In the reference example according to the first experiment example, the film thickness ratio of the blue color section B to the other color section R, G, or Y is approximately 57.1%, whereas in the sixth example, the film thickness ratio is approximately 61.9%. Thus, in the first experiment example using the edge light backlight unit 12, the chromaticity of the blue color of the output light may be too close to the common region A3 or it may even lies within the common region A3 when the film thickness ratio of the blue color section B is less than 60%. Accordingly, in the first experiment example, the film thickness ratio of more than 60% is preferable from the viewpoint of ensuring color reproducibility.

Further, the seventh and the eighth example according to the first experiment example differ from the second to the sixth examples in that the film thickness of the red color section R is greater than that of the other color section B, G, or Y. In the seventh and the eighth example, the chromaticity of the red color of the output light lies within the NTSC region A1 and outside the common region A3, as shown in FIGS. 22 and 23, specifically, farther from the common region A3 than in the first example. The positions of the other primary color points (the chromaticity of each of blue, green, and yellow) are substantially the same between the seventh and the eighth example and the second to the sixth examples. Thus, in the seventh and the eighth examples, compared to the second to the sixth examples, the chromaticity region belonging to the red color and the chromaticity region of the output light as a whole are expanded, so that the NTSC ratio is relatively large and excellent color reproducibility can be obtained. More specifically, the NTSC ratio of the eighth example is greater than that of the seventh example; thus, it can be said that the color reproducibility tends to be improved as the film thickness is increased. The same can be said for the seventeenth and eighteenth examples according to the second experiment example.

In the first experiment example, the ninth to the eleventh examples differ from the second to the eighth examples in that the film thickness of the red color section R is smaller than that of the other color section B, G, or Y. In the ninth to the eleventh examples, the chromaticity of the red color of the output light lies within the common region A3, as shown in FIGS. 22 and 23; namely, the chromaticity region belonging to the red color is smaller than in the second to the eighth examples in which the chromaticity lies outside the common region A3. On the other hand, the brightness of the output light is greater in the ninth to the eleventh examples than in the second to the eighth examples, specifically, in the order of the ninth, tenth, and eleventh examples. Thus, it can be said that the brightness of the output light tends to be increased as the film thickness of the red color section R is decreased. This is thought to be due to the fact that as the film thickness of the red color section R is decreased, the amount of transmitted light belonging to the red color is increased. Among the ninth to the eleventh examples, the ninth and the tenth examples have the NTSC ratio of 72% or greater. Therefore, it can be said that high brightness can be obtained while color reproducibility is taken into consideration. The same applies to the nineteenth to the twenty-first examples according to the second experiment example.

In the first to the twenty-first examples, as shown in FIGS. 22 to 25, the chromaticity of each of the green and yellow colors lies outside the common region A3. Thus, compared to the case where the chromaticity of these colors is set to lie within the common region A3, the chromaticity regions belonging to each of the green and yellow colors are expanded. Therefore, high color reproducibility can be obtained.

As described above, the liquid crystal display device 10 or 10' according to the present embodiment includes the liquid crystal panel 11 in which the pair of substrates 11a and 11b sandwich the liquid crystal layer 11c between, the liquid crystal layer 11c including liquid crystals as a substance of which the optical characteristics vary upon electric field application; and the backlight unit 12 or 40 irradiating the liquid crystal panel 11 with light. One of the pair of substrates 11a and 11b of the liquid crystal panel 11 includes the color filter 19 including the plurality of the color sections R, G, B, and Y exhibiting the colors of red, green, blue, and yellow, respectively. The backlight units 12 or 40 are provided with the LEDs 24 or 44, respectively, as the light sources. The color filter 19 is configured such that the chromaticity of the blue color of the output light obtained by passing the light from the LEDs 24 or 44 though the color sections R, G, B, and Y in the color filter 19 lies outside the common region A3 of the NTSC chromaticity region A1 according to the NTSC standard and the EBU chromaticity region A2 according to the EBU standard in both the CIE1931 chromaticity diagram and the CIE1976 chromaticity diagram.

Thus, the color filter 19 is formed in one of the pair of substrates 11a and 11b of the liquid crystal panel 11, and the color filter 19 includes the yellow color section Y in addition to the red, green, and blue color sections R, G, and B as the three primary colors of light. Thus, the color reproduction range that the human eye can perceive, i.e., the color gamut, can be expanded, and also the color reproducibility for the colors of objects in the natural world can be increased. Therefore, improved display quality can be obtained. In addition, the light that transmit through the yellow color section Y of the color sections R, G, B, and Y constituting the color filter 19 has wavelengths close to the peak of luminosity factor. Thus, the light tends to be perceived by the human eye as being bright, i.e., as having high brightness, even when the amount of energy of the light is small. Thus, sufficient brightness can be obtained even when the output of the light sources 24 or 31 is restrained, leading to the reduction of the electric power consumption by the light sources 24 or 31 and superior environmental friendliness. In other words, the resulting high brightness can be utilized for providing a sharp sense of contrast, thereby enabling further improvement in display quality.

On the other hand, when the yellow color section Y is included in the color filter 19, the output light from the liquid crystal panel 11, i.e., the display image, tends to have yellowishness as a whole. In order to avoid this, the chromaticity of the display image may be corrected by controlling the application of electric field to each of the color sections R, G, B, and Y to adjust the amount of transmitted light. However, in this technique, the amount of transmitted light tends to be decreased as a result of chromaticity correction, possibly resulting in a decrease in brightness of the output light. The present inventor conducted researches and came to the conclusion that the chromaticity of the display image can be corrected without a decrease in brightness of the output light by adjusting the chromaticity of the light source used in the backlight units 12 and 40. In addition, according to the present embodiment, the LEDs 24 and 44 are used as the light sources. The LEDs 24 and 44, compared to other light sources such as cold cathode tubes, can maintain relatively high brightness when subjected to chromaticity adjustment in accordance with the liquid crystal panel 11 including the yellow color section Y for reasons such as, for example, good compatibility in spectral characteristics.

However, even in the case of the LEDs 24 and 44, when their chromaticity is adjusted in accordance with the liquid crystal panel 11 including the yellow color section Y, it is virtually inevitable that some decrease in brightness arises, although not as much as in the case of other light sources such as the cold cathode tube. Thus, according to the present embodiment, on the premise that the LEDs 24 and 44 are used as the light sources, the following configuration is adopted to suppress the decrease in brightness of the LEDs 24 and 44 as a result of chromaticity adjustment while sufficient color reproducibility is ensured. Namely, according to the present embodiment, the color filter 19 is configured such that the chromaticity of the blue color of the output light obtained by passing the light from the LEDs 24 and 44 through the color sections R, G, B, and Y in the color filter 19 lies outside the common region A3 of the NTSC chromaticity region A1 according to the NTSC standard and the EBU chromaticity region A2 according to the EBU standard in both the CIE1931 chromaticity diagram and the CIE1976 chromaticity diagram. This configuration enables the common region A3 to be generally included in the chromaticity region belonging to the blue color of the output light, ensuring sufficient color reproducibility. In setting of the color filter 19, the amount of transmitted light belonging to the blue color can be increased as the chromaticity of the blue color of the output light becomes closer to the common region A3 outside the common region A3, although this may result in a decrease in color reproducibility. Thus, according to the configuration, the chromaticity of the LEDs 24 and 44 does not need to be shifted toward the blue side so much for adjustment. Further, the overall amount of transmitted light is increased, resulting in an increase in the brightness of the output light. In this way, the decrease in brightness of the LEDs 24 and 44 as a result of chromaticity adjustment can be suppressed, and high brightness of the output light can be maintained.

The "NTSC chromaticity region A1 according to the NTSC standard" refers to the region within a triangle with the vertexes at the three points in which the values of (x, y) are (0.14, 0.08), (0.21, 0.71), and (0.67, 0.33) in the CIE1931 chromaticity diagram, or the region within a triangle with the vertexes at the three points in which the values of (u', v') are (0.0757, 0.5757), (0.1522, 0.1957), and (0.4769, 0.5285) in the CIE1976 chromaticity diagram.

The "EBU chromaticity region A2 according to the EBU standard" refers to the region within a triangle with the vertexes at the three points in which the values of (x, y) are (0.15, 0.06), (0.3, 0.6), and (0.64, 0.33) in the CIE1931 chromaticity diagram, or the region within a triangle with the vertexes at the three points in which the values of (u', v') are (0.125, 0.5625), (0.1754, 0.1579), and (0.4507, 0.5229) in the CIE1976 chromaticity diagram.

The "common region A3" refers to the region within a quadrangle with the vertexes at the four points in which the values of (x, y) are (0.1579, 0.0884), (0.3, 0.6), (0.4616, 0.2317), and (0.64, 0.33) in the CIE1931 chromaticity diagram, or the region within a quadrangle with the vertexes at the four points in which the values of (u', v') are (0.125, 0.5625), (0.1686, 0.2125), (0.3801, 0.4293), and (0.4507, 0.5229) in the CIE1976 chromaticity diagram.

The color filter 19 may be configured such that the chromaticity of the blue color of the output light lies within the EBU chromaticity region A2 in both the CIE1931 chromaticity diagram and the CIE1976 chromaticity diagram. In setting of the color filter 19, the amount of transmitted light belonging to the blue color tends to be increased and the chromaticity of the blue color of the output light tends to be shifted toward yellow, as the chromaticity of the blue color of the output light lies closer to the common region A3. On the other hand, in the chromaticity region belonging to the blue color outside the common region A3, when the region within the EBU chromaticity region A2 is compared to the region outside the EBU chromaticity region A2, the former is relatively shifted toward yellow and the latter is relatively shifted toward blue. Thus, by setting the chromaticity of the blue color of the output light to lie outside the common region A3 and within the EBU chromaticity region A2, the amount of transmitted light belonging to the blue color is relatively increased compared to the case where the chromaticity of the blue color lies outside the common region A3 and the EBU chromaticity region A2. Accordingly, the decrease in brightness of the LEDs 24 and 44 that could be caused as a result of the chromaticity adjustment of the LEDs 24 and 44 can be more preferably suppressed, and the brightness of the output light can be further increased.

The "region outside the common region A3 and within the EBU chromaticity region A2" refers to the region within a triangle with the vertexes at the three points in which the values of (x, y) are (0.15, 0.06), (0.1579, 0.0884), and (0.4616, 0.2317) in the CIE1931 chromaticity diagram, or the region within a triangle with the vertexes at the three points in which the values of (u', v') are (0.1686, 0.2125), (0.1754, 0.1579), and (0.3801, 0.4293) in the CIE1976 chromaticity diagram.

The color filter 19 may be configured such that the chromaticity of the blue color of the output light lies outside the EBU chromaticity region A2 in both the CIE1931 chromaticity diagram and the CIE1976 chromaticity diagram. In setting of the color filter 19, the chromaticity region belonging to the blue color of the output light tends to be expanded and the chromaticity of the blue color of the output light tends to be shifted toward blue, as the chromaticity of the blue color of the output light is located farther from the common region A3. On the other hand, in the chromaticity region belonging to the blue color outside the common region A3, when the region within the EBU chromaticity region A2 is compared with the region outside the EBU chromaticity region A2, the former is relatively shifted toward yellow and the latter is relatively shifted toward blue. Thus, by setting the chromaticity of the blue color of the output light to lies outside the common region A3 and the EBU chromaticity region A2, the chromaticity region belonging to the blue color of the output light is more expanded than in the case where the chromaticity of the blue color lies outside the common region A3 and within the EBU chromaticity region A2. Therefore, excellent color reproducibility can be obtained.

The color filter 19 may be configured such that the chromaticity of the blue color of the output light has the y value of 0.059 or more in the CIE1931 chromaticity diagram. In this way, the amount of transmitted light belonging to the blue color tends to be increased as the y value is increased from 0.059 in the CIE1931 chromaticity diagram (closer to the common region A3). Therefore, the possible decrease in brightness of the LEDs 24 and 44 as result of the chromaticity adjustment of the LEDs 24 and 44 can be more preferably suppressed, and the brightness of the output light can be further increased. It is noted that the coordinates where the y value is 0.059 in the CIE1931 chromaticity diagram lie outside the NTSC chromaticity region A1 and the EBU chromaticity region A2.

The color filter 19 may be configured such that the chromaticity of the blue color of the output light has the v' value of 0.155 or more in the CIE1976 chromaticity diagram. In this way, the amount of transmitted light belonging to the blue color tends to be increased as the v' value is increased from 0.155 (closer to the common region A3) in the CIE1976 chromaticity diagram. Therefore, the decrease in brightness of the LEDs 24 and 44 which may be caused as a result of the chromaticity adjustment of the LEDs 24 and 44 can be more preferably suppressed, and the brightness of the output light can be further increased. It is noted that the coordinates where the v' value is 0.155 in the CIE1976 chromaticity diagram lie outside the NTSC chromaticity region A1 and the EBU chromaticity region A2.

The blue color section B may have a relatively small film thickness compared to the film thickness of the red color section R or the green color section G. When the film thickness of the blue color section B is made relatively small compared to the film thickness of the red color section R or the green color section G, the amount of transmitted light belonging to the blue color is increased compared to the case where the color sections R, G, and B have the same film thickness, although the chromaticity region belonging to the blue color of the output light may be decreased. Thus, the decrease in brightness of the LEDs 24 and 44 which may be caused as a result of the adjustment of the chromaticity of the LEDs 24 and 44 can be more preferably suppressed and the brightness of the output light can be further increased.

The red color section R and the green color section G may have substantially the same film thickness. In this way, with regard to the red color section R and the green color section G, the electrostatic capacity formed between the substrates 11a and 11b can be made substantially the same. Therefore, the optical characteristics of the substance between the substrates 11a and 11b can be easily controlled by application of an electric field. Thus, the optical transmittance through the red color section R and the green color section G can be easily controlled, leading to the simplified circuit design of the liquid crystal panel 11.

The yellow color section Y may have substantially the same film thickness as the red color section R or the green color section G. In this way, the electrostatic capacity formed between the substrates 11a and 11b can be made substantially the same with regard to the yellow color section Y in addition to the red color section R and the green color section G. Thus, the circuit design of the liquid crystal panel 11 can be more simplified.

The edge light backlight unit 12 is provided with the light guide member 26 with the end portions in an opposed manner with respect to the LEDs 24. The light from the LEDs 24 is guided toward the liquid crystal panel 11 through the light guide member 26. Thus, in the edge light backlight unit 12 with the light guide member 26, compared to the direct backlight unit 40, the optical path length of the light emitted from the LEDs 24 to the liquid crystal panel 11 is long, and absorption of light by the light guide member 26 occurs as the light travels in the light guide member 26, which may result in a decrease in brightness. In addition, generally the light guide member 26 has slight yellowishness. Thus, as the light from the LEDs 24 passes through the light guide member 26, the transmitted light is shifted toward yellow. Then the resultant yellowish light is irradiated on the liquid crystal panel 11 including the yellow color section Y. Therefore, in order to correct the chromaticity of the display image, the chromaticity of the LEDs 24 needs to be adjusted further toward blue, possibly resulting in a greater decrease in brightness for the chromaticity adjustment. In this respect, according to the present embodiment, the decrease in brightness as a result of chromaticity adjustment of the LEDs 24 can be effectively suppressed for the above reasons. Thus, high brightness of the output light can be preferably maintained.

On the other hand, when the chromaticity of the LEDs 24 is adjusted as described above in view of the presence of the light guide member 26, the color purity of the blue color of the output light from the liquid crystal panel 11 tends to be decreased compared to the direct type. Thus, when the film thickness of the blue color section B is decreased, the chromaticity of the blue color of the output light becomes closer to the common region A3 outside the common region A3 in the edge light type than in the direct type. This means that the chromaticity of the blue color of the output light can lie closer to the common region A3 without decreasing the film thickness of the blue color section B so much. The brightness tends to be increased as the chromaticity of the blue color of the output light lies closer to the common region A3 outside the common region A3. Thus, in the backlight unit 12 with the light guide member 26 according to the present embodiment, a sufficient brightness increasing effect can be obtained without decreasing the film thickness of the blue color section B so much. The film thickness of the color section R, G, B, or Y is a factor affecting the variation in the value of the electrostatic capacity formed between the substrates 11a and 11b. For example, when the difference in film thickness among the color sections R, G, B, and Y is too large, a large difference may be caused in the value of electrostatic capacity among the color sections R, G, B, and Y, possibly resulting in the inability to appropriately control the optical characteristics of the substance between the substrates 11a and 11b. In this respect, according to the present embodiment, the film thickness of the blue color section B does not need to be decreased so much. Accordingly, the optical characteristics of the substance between the substrates 11a and 11b can be controlled with little occurrence of problems, providing a simplified circuit design of the liquid crystal panel 11.

The blue color section B may have a film thickness in the range of 60% to 90% of the film thickness of the red color section R or the green color section G. If the film thickness ratio of the blue color section B to the red color section R or the green color section G is smaller than 60%, the chromaticity of the blue color of the output light may be too close to the common region A3, possibly adversely affecting the color reproducibility. On the other hand, if the film thickness ratio is more than 90%, the difference in film thickness between the red or green color section R or G and the blue color section B is too small. Thus, only a little increase in the amount of transmitted light belonging to the blue color is obtained, possibly resulting in insufficient effect. In this respect, by limiting the film thickness ratio in the range of 60% to 90% as according to the present embodiment, sufficient color reproducibility can be ensured and the amount of transmitted light belonging to the blue color can be sufficiently increased. Therefore, the decrease in brightness as a result of chromaticity adjustment of the LEDs 24 can be preferably suppressed.

The blue color section B may have a film thickness in the range of 61.8% to 85.8% of the film thickness of the red color section R or the green color section G. By thus limiting the film thickness ratio of the blue color section B to the red color section R or the green color section G in the range of 61.8% to 85.8%, sufficient color reproducibility can be ensured, and the amount of transmitted light belonging to the blue color can be more sufficiently increased. Therefore, the decrease in brightness as a result of chromaticity adjustment of the LEDs 24 can be more preferably suppressed.

In the embodiment where the edge light backlight unit 12 is used, the red color section R or the green color section G may have the film thickness of 2.1 μm, while the blue color section B may have the film thickness in the range of 1.3 μm to 1.8 μm. By thus setting the film thickness of the respective color sections R, G, and B, sufficient color reproducibility can be ensured and the amount of transmitted light belonging to the blue color can be further sufficiently increased. Therefore, the decrease in brightness as a result of chromaticity adjustment of the LEDs 24 can be more preferably suppressed. Particularly, by setting the film thickness of the blue color section B at 1.3 μm, extremely high brightness can be obtained while sufficient color reproducibility is ensured. Conversely, by setting the film thickness of the blue color section B at 1.8 μm, extremely good color reproducibility can be obtained while sufficient brightness is ensured.

The light guide member 26 includes the elongated light entrance surfaces 26b on the ends facing the LEDs 24. The LEDs 24 include the lens members 30 that cover the light output side of the LEDs 24 and diffuse light. The lens members 30 are opposed to the light entrance surfaces 26b of the light guide member 26 and curved along the longitudinal direction of the light entrance surfaces 26b to be convex toward the light guide member 26. In this way, the light emitted by the LEDs 24 is caused to spread in the longitudinal direction of the light entrance surfaces 26b by the lens members 30. Therefore, the dark portions that could be formed at the light entrance surfaces 26b of the light guide member 26 can be reduced. Thus, even when the distance between the LEDs 24 and the light guide member 26 is short and the number of the LEDs 24 is small, light with uniform brightness can enter on over the entire light entrance surfaces 26b of the light guide member 26.

The edge light backlight unit 12 is provided with the reflection sheets 28 and 29 between the LEDs and the light guide member 26 and along the longitudinal direction of the light entrance surfaces 26b. In this way, the light scattered from the lens member 30 outside the light guide member 26 can be reflected by the reflection sheets 28 and 29 to enter on the light guide member 26. Thus, the entrance efficiency of the light emitted by the LEDs 24 on the light guide member 26 can be increased.

The light guide member 26 may include a substance with a higher refractive index than that of air. In this way, the light entering the light guide member 26 from the LEDs 24 can be caused to travel efficiently toward the liquid crystal panel 11.

The direct backlight unit 40 is provided with the chassis 41 housing the LEDs 44, and the optical member 42. The chassis 41 includes the bottom plate 41a disposed on the opposite side to the light output side with respect to the LEDs 44. The optical member 42 is disposed on the light output side in an opposed manner with respect to the bottom plate 41a and the LEDs 44. In this way, the light emitted from the LEDs 44 is irradiated onto the optical member 42 disposed on the light output side in an opposed manner with respect to the bottom plate 41a and the LEDs 44, and then output via the optical member 42 toward the liquid crystal panel 11. The so-called direct backlight unit 40 is not provided with the light guide member 26 unlike the edge light backlight unit 12. Thus, because the optical path length of the light emitted from the LEDs 44 to the liquid crystal panel 11 is relatively short, the amount of light that reaches the liquid crystal panel 11 is relatively increased. In addition, the light from the LEDs 44 does not pass through the light guide member 26 in the path to the liquid crystal panel 11 to avoid becoming yellowish. Thus, the decrease in brightness of the LEDs 44 as a result of chromaticity adjustment can be suppressed to be relatively small. Accordingly, in the direct backlight unit 40, relatively high brightness of the output light can be obtained compared to the edge light backlight unit 12.

On the other hand, in the direct backlight unit 40 according to the present embodiment, compared to the edge light backlight unit 12, there is no need to adjust the chromaticity of the LEDs 44 in view of the presence of the light guide member 26. Thus, the color purity of the blue color of the output light from the liquid crystal panel 11 tends to be increased compared to the edge light type. Thus, when the film thickness of the blue color section B is small, the chromaticity of the blue color of the output light of the direct type lies relatively far from the common region A3 compared to the edge light type. Accordingly, the chromaticity of the blue color of the output light can be maintained outside the common region A3 even when the film thickness of the blue color section B is decreased compared to the edge light type. Thus, the effect of increasing the brightness of the output light by decreasing the film thickness of the blue color section B can be more preferably obtained. Thus, extremely high brightness can be obtained while sufficient color reproducibility is ensured.

The blue color section B may have a film thickness in the range of 50% to 90% of the film thickness of the red color section R or the blue color section G. If the film thickness ratio of the blue color section B to the red color section R or the green color section G is less than 50%, the chromaticity of the blue color of the output light may be too close to the common region A3, and the color reproducibility may be adversely affected. Further, the discrepancy between the red or green color section R or G and the blue color section B may become too large in terms of the electrostatic capacity formed between the substrates 11a and 11b, possibly resulting in inability of appropriately controlling the optical characteristics of the substance disposed between the substrates 11a and 11b by application of an electric field. On the other hand, if the film thickness ratio is more than 90%, the difference in film thickness between the red or green color section R or G and the blue color section B may be too small. Thus, the increase in the amount of transmitted light belonging to the blue color may become too small to provide sufficient effects. In this respect, by setting the film thickness ratio in the range of 50% to 90% as according to the present embodiment, sufficient color reproducibility can be ensured and, in addition, the optical characteristics of the substance between the substrates 11a and 11b can be appropriately controlled by application of an electric field. Further, the amount of transmitted light belonging to the blue color can be sufficiently increased to preferably suppress the decrease in brightness as a result of chromaticity adjustment of the LEDs 44.

The blue color section B may have a film thickness in the range of 57.1% to 85.8% of the film thickness of the red color section R or the green color section G. By thus setting the film thickness ratio of the blue color section B to the red color section R or the green color section G in the range of 57.1% to 85.8%, sufficient color reproducibility can be ensured; the optical characteristics of the substance between the substrates 11a and 11b can be appropriately controlled by application of an electric field; and further the amount of transmitted light belonging to the blue color can be sufficiently increased. Therefore, the decrease in brightness as a result of chromaticity adjustment of the LEDs 44 can be more preferably suppressed.

In the embodiment using the direct backlight unit 40, the red color section R or the green color section G may have a film thickness of 2.1 μm while the blue color section B may have a film thickness in the range of 1.2 μm to 1.8 μm. By thus setting the film thickness of the respective color sections R, G, and B, sufficient color reproducibility can be ensured; the optical characteristics of the substance between the substrates 11a and 11b can be appropriately controlled by application of an electric field; and further the amount of transmitted light belonging to the blue color can be sufficiently increased. Therefore, the decrease in brightness as a result of chromaticity adjustment of the LEDs 44 can be more preferably suppressed. Particularly, by setting the film thickness of the blue color section B at 1.2 μm, extremely high brightness can be obtained while sufficient color reproducibility is ensured. Conversely, by setting the film thickness of the blue color section B at 1.8 μm, extremely good color reproducibility can be obtained while sufficient brightness is ensured.

On the light output side of the LEDs 44, the diffuser lenses 46 diffusing the light from the LEDs 44 may be disposed. In this way, the light emitted from the LEDs 44 can be output while being diffused by the diffuser lenses 46. Thus, unevenness in the output light is difficult to occur, decreasing the number of the LEDs 44 installed. Therefore, cost reduction can be achieved.

The color filter 19 is configured such that the chromaticity of the red color of the output light lies within the common region A3 of the NTSC chromaticity region A1 according to the NTSC standard and the EBU chromaticity region A2 according to the EBU standard in both the CIE1931 chromaticity diagram and the CIE1976 chromaticity diagram. Thus, because the chromaticity of the red color of the output light is set to lie within the common region A3, the amount of transmitted light belonging to the red color is increased compared to the case set to lie outside the common region A3. And then, the overall amount of transmitted light is also increased. Thus, the brightness of the output light can be increased.

The red color section R may have a relatively small film thickness compared to the film thickness of the blue color section B or the green color section G. By thus making the film thickness of the red color section R relatively small compared to the film thickness of the blue color section B or the green color section G, the amount of transmitted light belonging to the red color is increased compared to the case where the color sections R, G, and B have the same film thickness, although the chromaticity region belonging to the red color of the output light may be decreased. Thus, the brightness of the output light can be increased.

The color filter 19 may be configured such that the chromaticity of the red color of the output light lies outside the common region A3 of the NTSC chromaticity region A1 according to the NTSC standard and the EBU chromaticity region A2 according to the EBU standard in both the CIE1931 chromaticity diagram and the CIE1976 chromaticity diagram. Thus, because the chromaticity of the red color of the output light is set to lie outside the common region A3, the chromaticity region belonging to the red color of the output light is expanded compared to the case where the chromaticity of the red color of the output light lies within the common region A3. Thus, the color reproducibility can be increased.

Further, the red color section R may have a relatively large film thickness compared to the film thickness of the blue color section B or the green color section G. By thus relatively increasing the film thickness of the red color section R compared to the film thickness of the blue color section B or the green color section G, the chromaticity region belonging to the red color of the output light is expanded compared to the case where the color sections R, G, and B have the same film thickness, although the amount of transmitted light belonging to the red color may be decreased. Thus, high color reproducibility can be obtained.

The color filter 19 may be configured such that the chromaticity of the green color of the output light lies outside the common region A3 of the NTSC chromaticity region A1 according to the NTSC standard and the EBU chromaticity region A2 according to the EBU standard in both the CIE1931 chromaticity diagram and the CIE1976 chromaticity diagram. In this way, because the chromaticity of the green color of the output light is set to lie outside the common region A3, the chromaticity region belonging to the green color of the output light is expanded compared to the case set to lie within the common region A3. Thus, the color reproducibility can be increased.

The color filter 19 may be configured such that the chromaticity of the yellow color of the output light lies outside the common region A3 of the NTSC chromaticity region A1 according to the NTSC standard and the EBU chromaticity region A2 according to the EBU standard in both the CIE1931 chromaticity diagram and the CIE1976 chromaticity diagram. In this way, because the chromaticity of the yellow color of the output light is set to lie outside the common region A3, the chromaticity region belonging to the yellow color of the output light is expanded compared to the case set to lie within the common region A3. Thus, the color reproducibility can be increased.

The color sections R, G, B, and Y may have substantially the same film thickness. In this way, when some of the color sections R, G, B, and Y have the same area, those with the same area of the color sections R, G, B, and Y have substantially the same electrostatic capacity formed between the substrates 11a and 11b. Therefore, the optical characteristics of the substance between the substrates 11a and 11b can be more easily controlled by application of an electric field. Thus, the optical transmittance through the color sections R, G, B, and Y can be more easily controlled, leading to an extremely simple circuit design of the liquid crystal panel 11 with high color reproducibility.

Of the color sections R, G, B, and Y, the blue color section B or the red color section R may have a relatively large area compared to the color section Y exhibiting yellow or the green color section G. In this way, the transmitted light through the color filter 19 of the liquid crystal panel 11 tends to have relatively large amount of blue light or red light compared to yellow light or green light. Namely, the color filter 19 is configured to transmit relatively large amount of blue light compared to yellow light, which is the complementary color of blue. Thus, the display image is prevented from having yellowishness. As a result, the chromaticity of the LEDs 24 and 44 does not need to be adjusted so much toward blue in order to correct the chromaticity of the display image. Therefore, the decrease in brightness of the LEDs 24 and 44 as a result of chromaticity adjustment can be preferably suppressed. When the number of the color sections is increased from three to four, the number of sub-pixels constituting each pixel is increased from three to four. The resultant decrease in the area of the individual sub-pixels may cause a decrease in the brightness of red light in particular. In this respect, according to the present embodiment, the color filter 19 is configured to transmit relatively large amount of red light compared to yellow light or green light. Thus, the decrease in brightness of red light, which may be caused by the increase in the number of colors of the liquid crystal panel 11 to four, can be suppressed. Accordingly, the overall brightness of the output light can be increased.

The area ratio of the blue color section B or the red color section R to the yellow color section Y or the green color section G may be 1.6. By thus setting the area ratio of the blue color section B or the red color section R to the yellow color section Y or the green color section G at 1.6, the extremely high brightness of the output light can be achieved. In the liquid crystal panel 11 according to the present embodiment, the optical transmittance through the color sections R, G, B, and Y is controlled by varying the optical characteristics of the substance between the pair of substrates 11a and 11b by application of an electric field. When the area ratio is larger than 1.6, the optical transmittance may not be controlled easily. In this respect, according to the present embodiment, by setting the area ratio at 1.6, the optical transmittance through the color sections R, G, B, and Y can be appropriately controlled. Therefore, the liquid crystal panel 11 can be designed advantageously.

The blue color section B and the red color section R may have the same area. In this way, in the blue color section B and the red color section R, the electrostatic capacity formed between the substrates 11a and 11b can be made substantially the same. Accordingly, the optical characteristics of the substance between the substrates 11a and 11b can be more easily controlled by application of an electric field. Thus, the optical transmittance through the blue color section B or the red color section R can be more easily controlled, leading to an extremely simplified circuit design of the liquid crystal panel 11 with high brightness.

The yellow color section Y and the green color section G may have the same area. In this way, in the yellow color section Y and the green color section G, the electrostatic capacity formed between the substrates 11a and 11b can be made substantially the same. Thus, the optical characteristics of the substance between the substrates 11a and 11b can be more easily controlled by application of an electric field. Accordingly, the optical transmittance through the yellow color section Y or the green color section G can be easily controlled, leading to an extremely simplified circuit design of the liquid crystal panel 11 with high brightness.

The chromaticity region of the output light may occupy 70% or more of the NTSC chromaticity region A1. In this way, sufficient color reproducibility for displaying an image can be ensured, resulting in good display quality.

The display panel may be the liquid crystal panel 11 including the liquid crystal layer 11c as the substance of which the optical characteristics vary by application of an electric field. In this way, the display panel can be applied for various purposes, such as for television or personal computer displays, particularly for large screens.

The television receiver TV according to the present embodiment includes the liquid crystal display device 10 and the tuner T as a reception unit configured to receive a television signal. According to such a television receiver TV, the liquid crystal display device 10, which displays a television image based on the television signal, can appropriately correct the chromaticity of the display image while high brightness is obtained. Therefore, the television image can be displayed with high display quality.

The television receiver TV further includes the image conversion circuit VC that converts the television image signal output from the tuner T into an image signal of the respective colors of red, green, blue, or yellow. In this way, the television image signal is converted by the image conversion circuit VC into the image signal corresponding to the respective color sections R, G, B, or Y of the red, green, blue, or yellow included in the color filter 19. Therefore, the television image can be displayed with high display quality.

While the first embodiment of the present invention has been described above, the present invention is not limited to the embodiment and may include the following modifications. In the following modifications, components similar to those of the embodiment will be designated by similar reference signs and their description and illustration may be omitted.

<First Modification of the First Embodiment>

A first modification of the first embodiment will be described with reference to FIG. 26 or 27. In the first modification, the yellow color section Y or the green color section G has a different area ratio from the blue color section B or the red color section R. In addition, the shape of the color sections R, G, B and Y and the shape of pixel electrodes 15-1 are modified.

Figure 26:
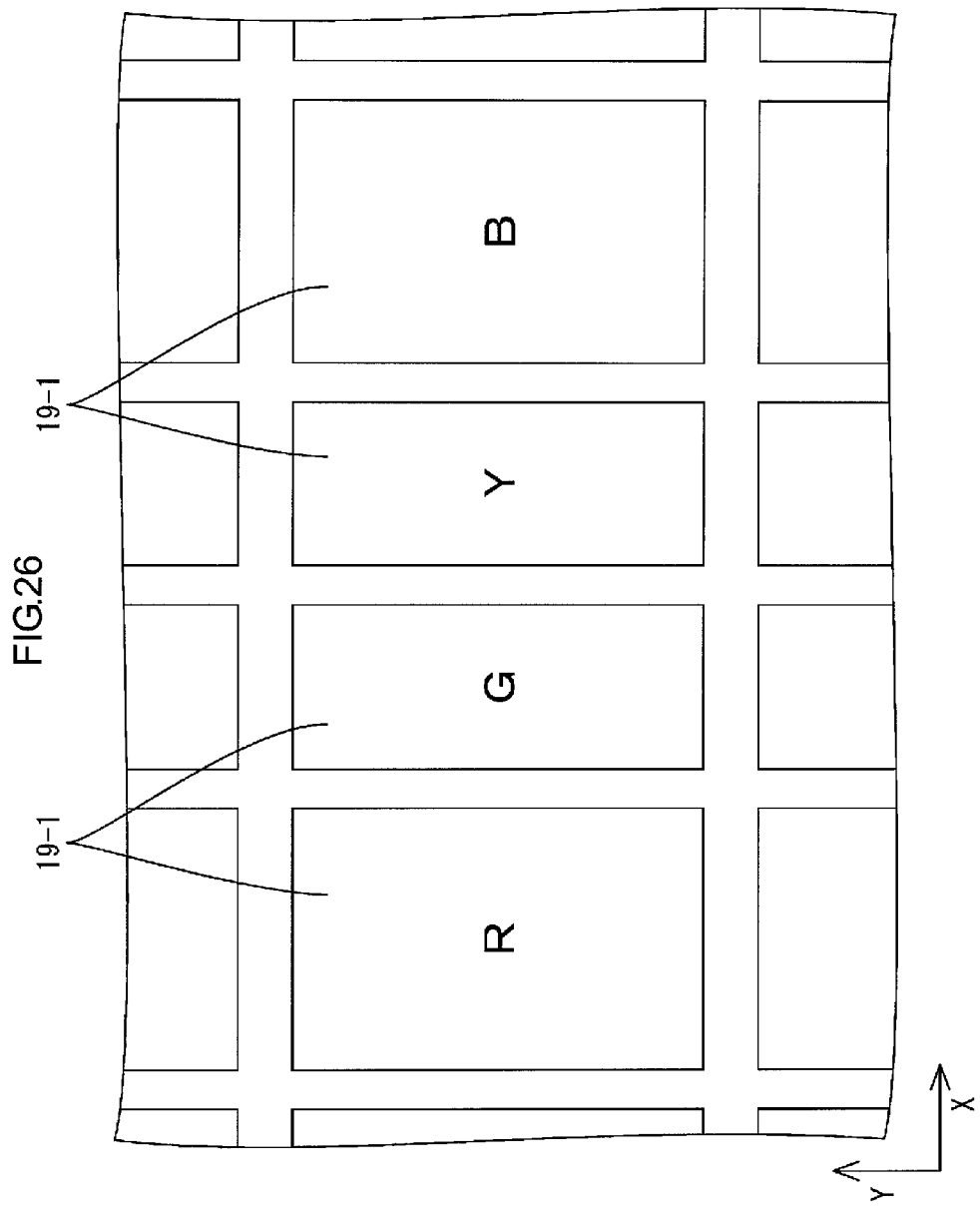
FIG. 26 is an enlarged plan view illustrating a planar configuration of a CF substrate according to the first modification of the first embodiment.
Figure 27:
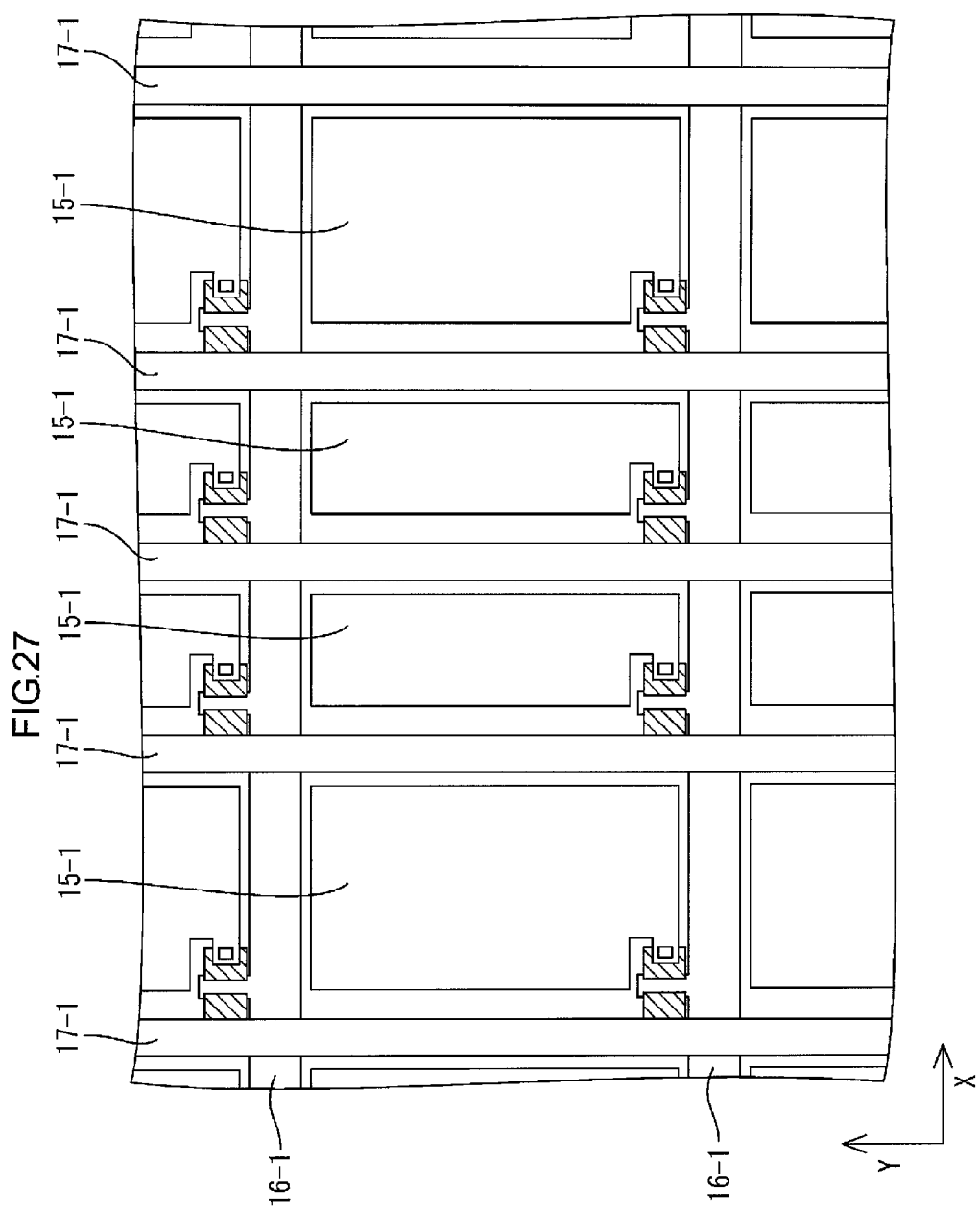
FIG. 27 is an enlarged plan view illustrating a planar configuration of the array substrate.

The color sections R, G, B, and Y included in the color filter 19-1 are, as shown in FIG. 26, arranged in rows and columns, the X-axis direction corresponding to the row direction and the Y-axis direction to the column direction. The color sections R, G, B, and Y have the same dimension in the column direction (Y-axis direction) and different dimension in the row direction (X-axis direction). Specifically, the color sections R, G, B, and Y are arranged such that the yellow color section Y and the green color section G are sandwiched between the red color section R and the blue color section B with respect to the row direction, with the red color section R or the blue color section B relatively larger than the yellow color section Y or the green color section G in the row direction. Thus, two first columns including the color sections R and B with the relatively large row direction dimension and two second columns including the color sections Y and G with the relatively small row direction dimension are alternately and repeatedly disposed with respect to the row direction. Thus, the area of the red color section R or the blue color section B is larger than the area of the yellow color section Y or the green color section G. In the row direction, the color sections R, G, B, and Y are arranged in order of, from the left side of FIG. 26, the red color section R, the green color section G, the yellow color section Y, and the blue color section B. In accordance with the arrangement of the color filter 19-1, pixel electrodes 15-1 have different row direction dimension in an array substrate 11*b* depending on the columns, as shown in FIG. 27. Specifically, of the pixel electrodes 15-1, the area of those overlapping with the red color section R or the blue color section B is larger than the area of those overlapping with the yellow color section Y or the green color section G. All of source wires 17-1 are arranged at regular pitches, while gate wires 16-1 are arranged at two different pitches depending on the dimension of the pixel electrodes 15-1. FIGS. 26 and 27 show the case where the area of the red color section R or the blue color section B is about 1.6 times that of the yellow color section Y or the green color section G.

<Second Modification of the First Embodiment>

A second modification of the first embodiment will be described with reference to FIG. 28. In the second modification, the yellow color section Y or the green color section G has a different area ratio from the blue color section B or the red color section R. In addition, the order of arrangement of the color sections R, G, B, and Y of a color filter 19-2 is modified from the order of arrangement according to the first embodiment.

Figure 28:
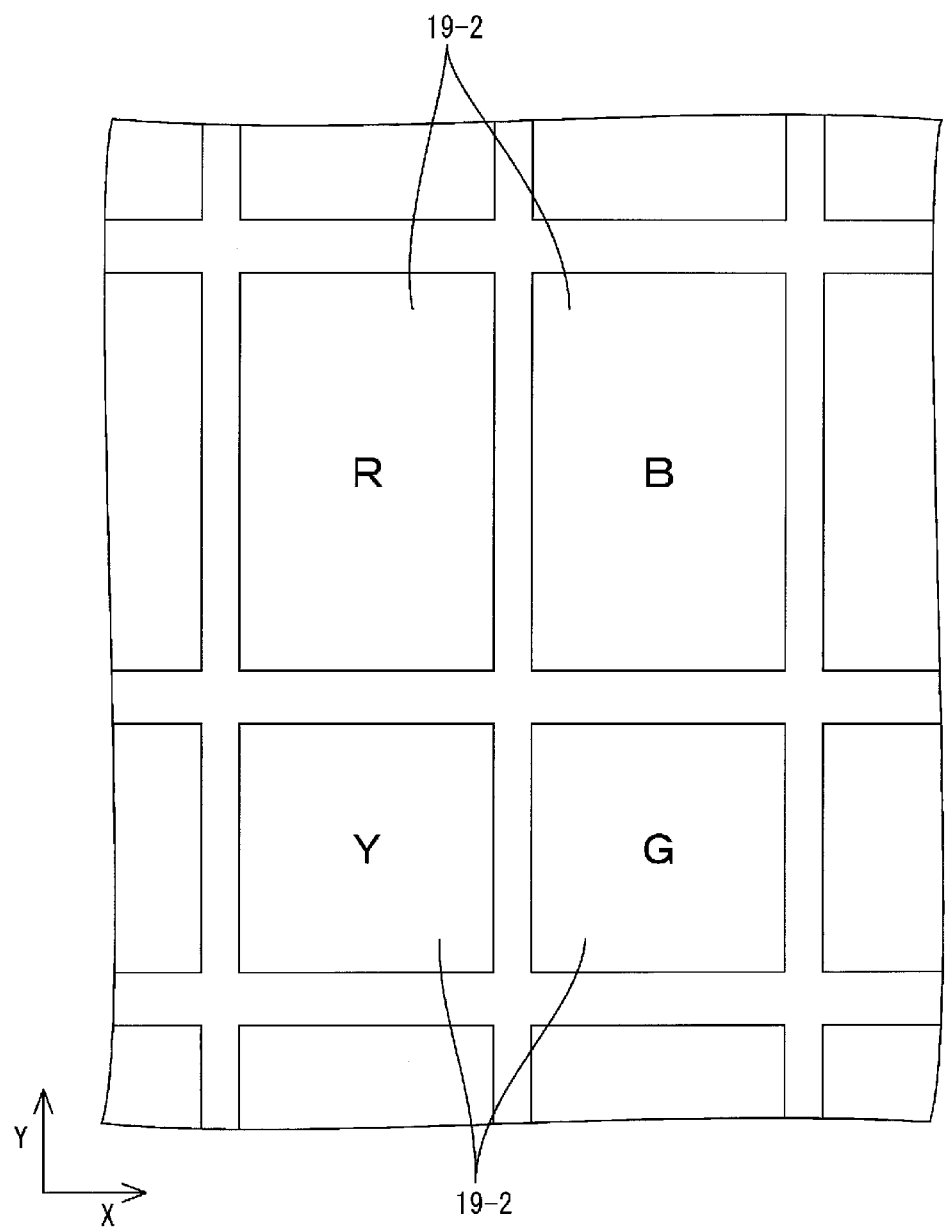
FIG. 28 is an enlarged plan view illustrating a planar configuration of the CF substrate according to the second modification of the first embodiment.

The color filter 19-2 according to the present modification, as shown in FIG. 28, is configured such that the yellow color section Y is disposed adjacent to the red color section R in the column direction, and the green color section G is disposed adjacent to the blue color section B in the column direction.

<Third Modification of the First Embodiment>

Figure 29:
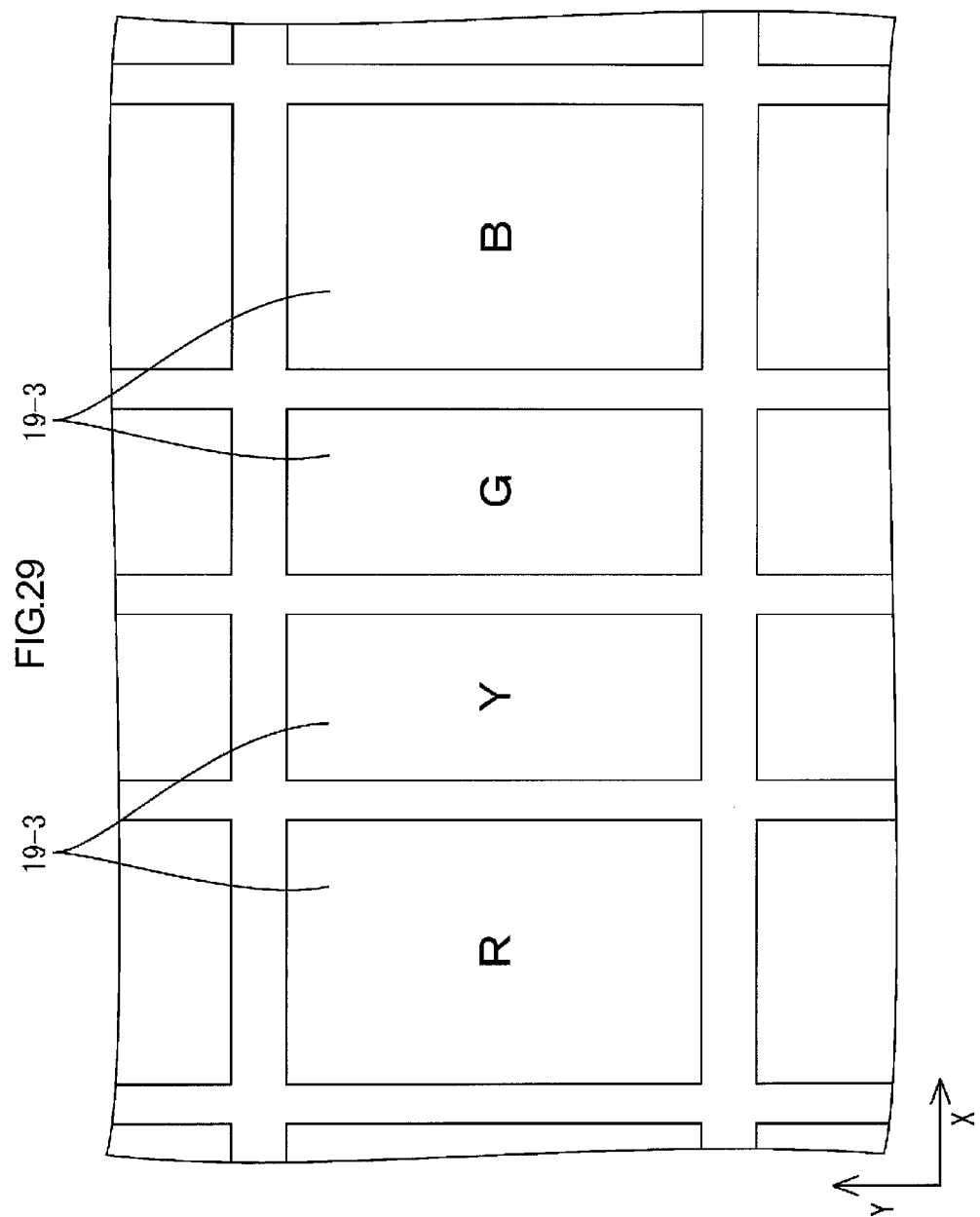
FIG. 29 is an enlarged plan view illustrating a planar configuration of the CF substrate according to the third modification of the first embodiment.

A third modification of the first embodiment will be described with reference to FIG. 29, showing a color filter 19-3 with color sections arranged in a different order from that of the first modification.

In the color filter 19-3 according to the present modification, as shown in FIG. 29, the color sections are arranged in the row direction in order of, from the left side of FIG. 29, the red color section R, the yellow color section Y, the green color section G, and the blue color section B.

<Fourth Modification of the First Embodiment>

A fourth modification of the first embodiment will be described with reference to FIG. 30. In the fourth modification, the configuration of the blue color section B which has a smaller film thickness than the film thickness of the other color sections R, G, and Y is modified.

Figure 30:
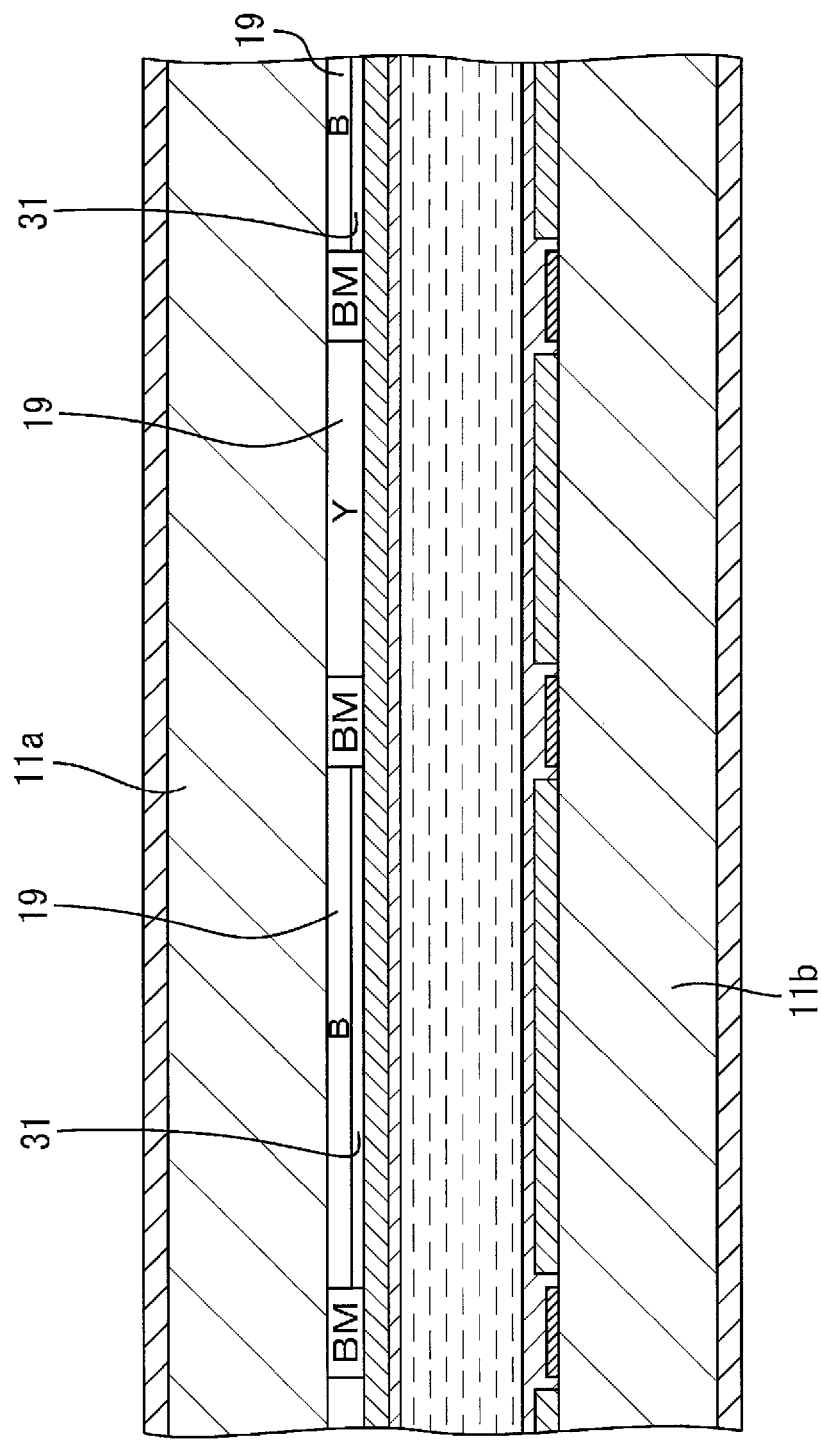
FIG. 30 is a cross sectional view showing a cross sectional configuration of the color sections according to the fourth modification of the first embodiment.

In the blue color section B with a smaller film thickness than that of the other color section R, G, or Y, as shown in FIG. 30, a transparent spacer material 31 is layered. The sum of both the film thickness of the blue color section B and the spacer material 31 may be equal to the film thickness of the other color sections R, G, or Y. In this way, the electrostatic capacity formed between the substrates 11*a* and 11*b* is the same among the color sections R, G, B, and Y, providing an excellent circuit design of the liquid crystal panel 11. The technique of using the spacer material 31 may also be applied to the case where the film thickness of the red color section R is smaller than the film thickness of the other color section G, B, or Y, for example.

<Fifth Modification of the First Embodiment>

A fifth modification of the first embodiment will be described with reference to FIG. 31. In the fifth modification, the arrangement of a spacer material 31-5 is different from that according to the fourth modification.

Figure 31:
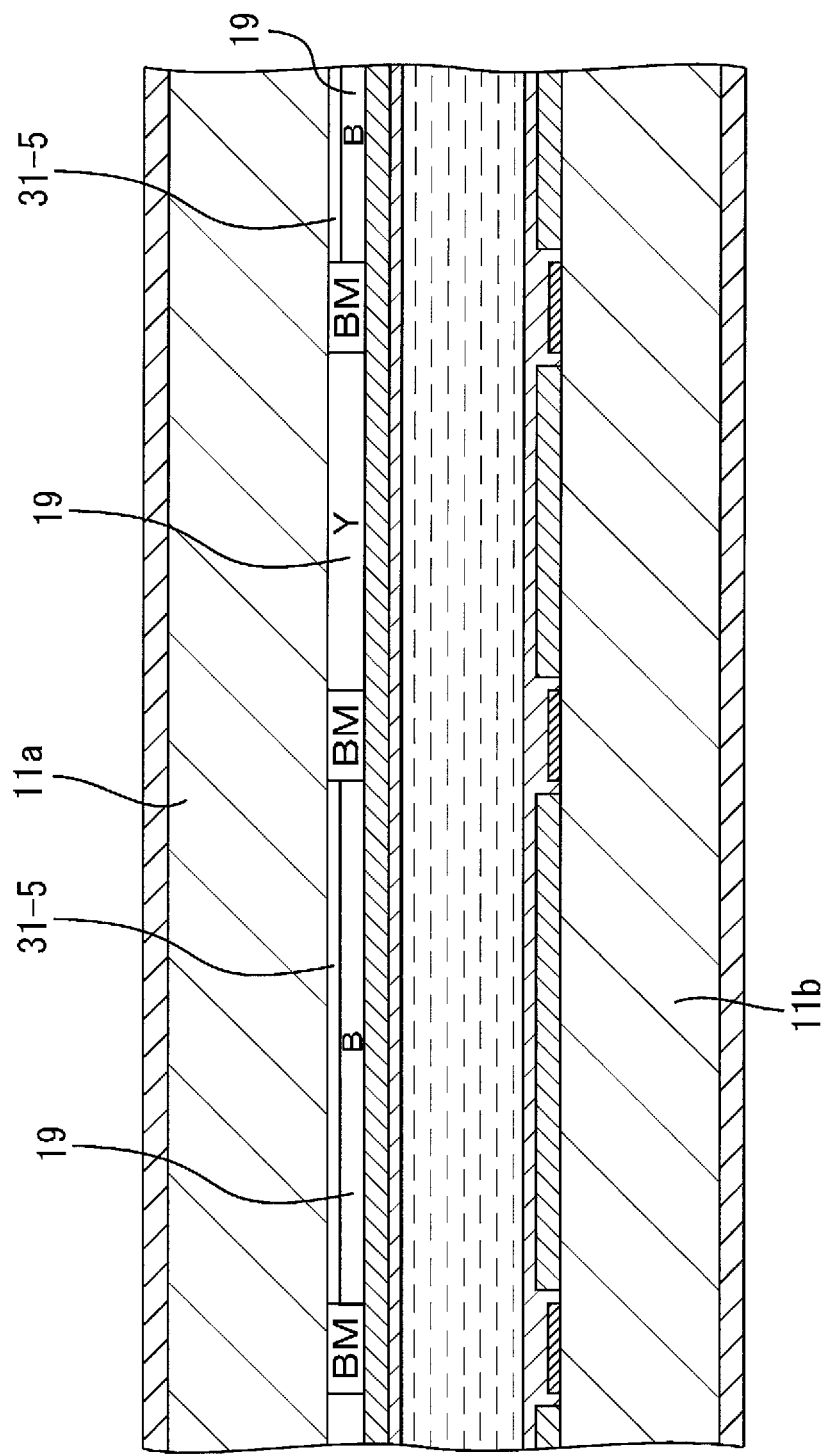
FIG. 31 is a cross sectional view showing a cross sectional configuration of the color sections according to fifth modification of the first embodiment.

In the spacer material 31-5 according to the present modification, as shown in FIG. 31, the order in which the spacer material and the blue color section B are layered on each other is reversed from the order in the fourth modification.

Second Embodiment

A second embodiment of the present invention will be described with reference to FIG. 32. In the second embodiment, the blue color section B of a color filter 119 has a different pigment concentration from the pigment concentration of the other color section R, G, or Y. Redundant description of structures, operations, and effects similar to those of the first embodiment will be omitted.

Figure 32:
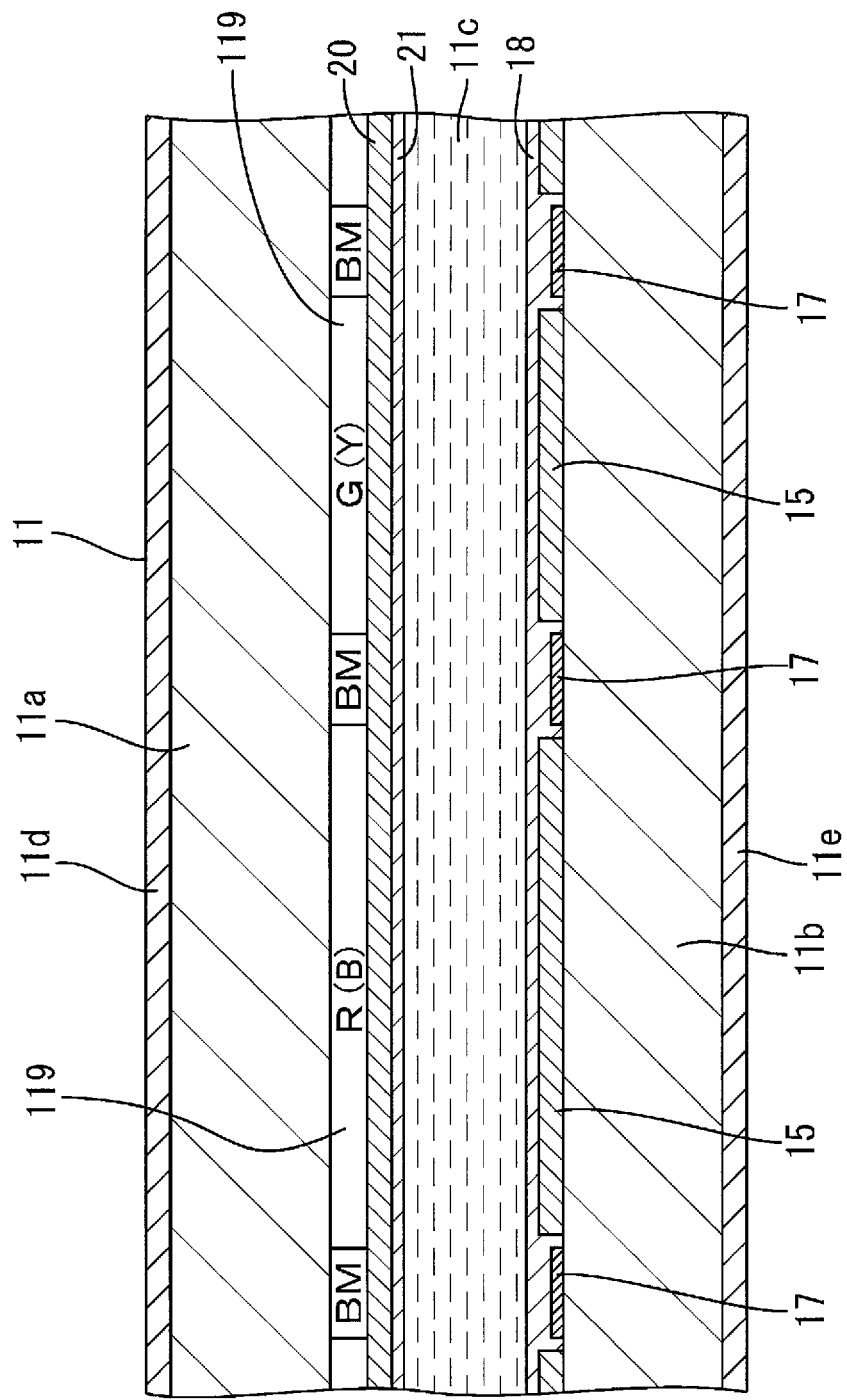
FIG. 32 is a cross sectional view showing a cross sectional configuration of the color sections according to the second embodiment of the present invention.

According to the present embodiment, the color sections R, G, B, and Y included in the color filter 119, as shown in FIG. 32, have the same film thickness; however, the blue color section B has a different pigment concentration setting than the other color section R, G, or Y. The chromaticity of the respective color sections R, G, B, and Y varies depending on its pigment concentration. Specifically, as the pigment concentration is decreased, the amount of transmitted light of the corresponding color tends to be increased, although the color purity may be decreased and the chromaticity region may become smaller. Conversely, as the pigment concentration is increased, the color purity tends to be increased and the chromaticity region tends to be expanded, although the amount of transmitted light belonging to the relevant color may be decreased. Thus, in the color sections R, G, B, and Y, as the pigment concentration is decreased, brightness is increased although color reproducibility may be degraded; conversely, as the pigment concentration is increased, excellent color reproducibility can be obtained although brightness may be decreased. By applying the color filter 119 with the above configuration to the third to the sixth examples and the fourteenth to the sixteenth examples shown in the first comparative experiment according to the first embodiment, similar results can be obtained.

Similarly, the color filter 119 may be configured such that the red color section R has a different pigment concentration from the other color section G, B, or Y. By applying such configuration to the seventh to the eleventh examples, and the seventeenth to the twenty-first examples shown in the first comparative experiment according to the first embodiment, similar results can be obtained.

As described above, according to the present embodiment, the color sections R, G, B, and Y include the pigment dispersed in, where the blue color section B has a pigment concentration lower than the pigment concentration of the red color section R or the green color section G. When the concentration of the pigment contained in the blue color section B is thus relatively decreased compared to the concentration of pigment contained in the red color section R or the green color section G, the amount of transmitted light belonging to the blue color is increased compared to the case where the color sections R, G, and B have the same pigment concentration, although the chromaticity region belonging to the blue color of the output light may be decreased. Thus, the decrease in brightness of the LEDs 24 and 44, which may be caused as a result of adjustment of the chromaticity of the LEDs 24 and 44, can be more preferably suppressed, and the brightness of the output light can be increased.

The color sections R, G, B, and Y may have substantially the same film thickness. In this way, in the color sections R, G, B, and Y of the color filter 119, the electrostatic capacity formed between the substrates 11a and 11b becomes substantially the same. Thus, the optical characteristics of the substance between the substrates 11a and 11b can be more easily controlled by application of an electric field. Accordingly, the optical transmittance through the color sections R, G, B, and Y can be easily controlled, providing an extremely simplified circuit design of the liquid crystal panel 11.

Third Embodiment

A third embodiment of the present invention will be described. According to the third embodiment, a yellow phosphor is used in the LEDs, instead of a green phosphor. Redundant description of structures, operations, and effects similar to those of the first embodiment will be omitted.

According to the present embodiment, the LEDs include LED chips and a red phosphor similar to those of the first embodiment, and further a yellow phosphor that emits yellow light upon excitation by blue light from the LED chip. According to the present embodiment, the yellow phosphor has a dominant emission peak in a yellow wavelength region of 570 nm to 600 nm. Preferably, α-SiAlON, which is a type of SiAlON-based phosphors as nitride, may be used as the yellow phosphor. Therefore, yellow light can be emitted with high efficiency compared to the case where a sulfide or oxide phosphor, for example, is used. Specifically, α-SiAlON uses Eu (europium) as an activator and is expressed by the general formula, $Mx(Si, Al)_{12}(O, N)_{16}:Eu$ (M is a metal ion, and x is the amount of solid solution). For example, when calcium is used as the metal ion, α-SiAlON is expressed by $Ca(Si, Al)_{12}(O, N)_{16}:Eu$. Preferably, as the yellow phosphor other than α-SiAlON, a BOSE-based BOSE may be used. BOSE uses Eu (europium) as an activator and is expressed by $(Ba, Sr)_2SiO_4:Eu)$. The yellow phosphor may be other material than α-SiAlON and BOSE. Particularly, $(Y, Gd)_3Al_2O_{12}:Ce$, which is a YAG-based phosphor, may be preferably used to obtain high efficiency emission. $(Y, Gd)_3Al_2O_{12}:Ce$ has a substantially flat dominant emission peak extending from the green wavelength region to the yellow wavelength region; thus, it may be regarded as either a green phosphor or a yellow phosphor. In addition, $Tb_3Al_5O_{12}:Ce$ may be used as the yellow phosphor. Thus, when the yellow phosphor is used instead of the green phosphor, similar effects to those of the first embodiment can be obtained.

Fourth Embodiment

A fourth embodiment of the present invention will be described with reference to FIG. 33 or 34. According to the forth embodiment, a liquid crystal display device 110 has constituent components modified from those according to the first embodiment. Redundant description of structures, operations, and effects similar to those of the first embodiment will be omitted.

Figure 33:
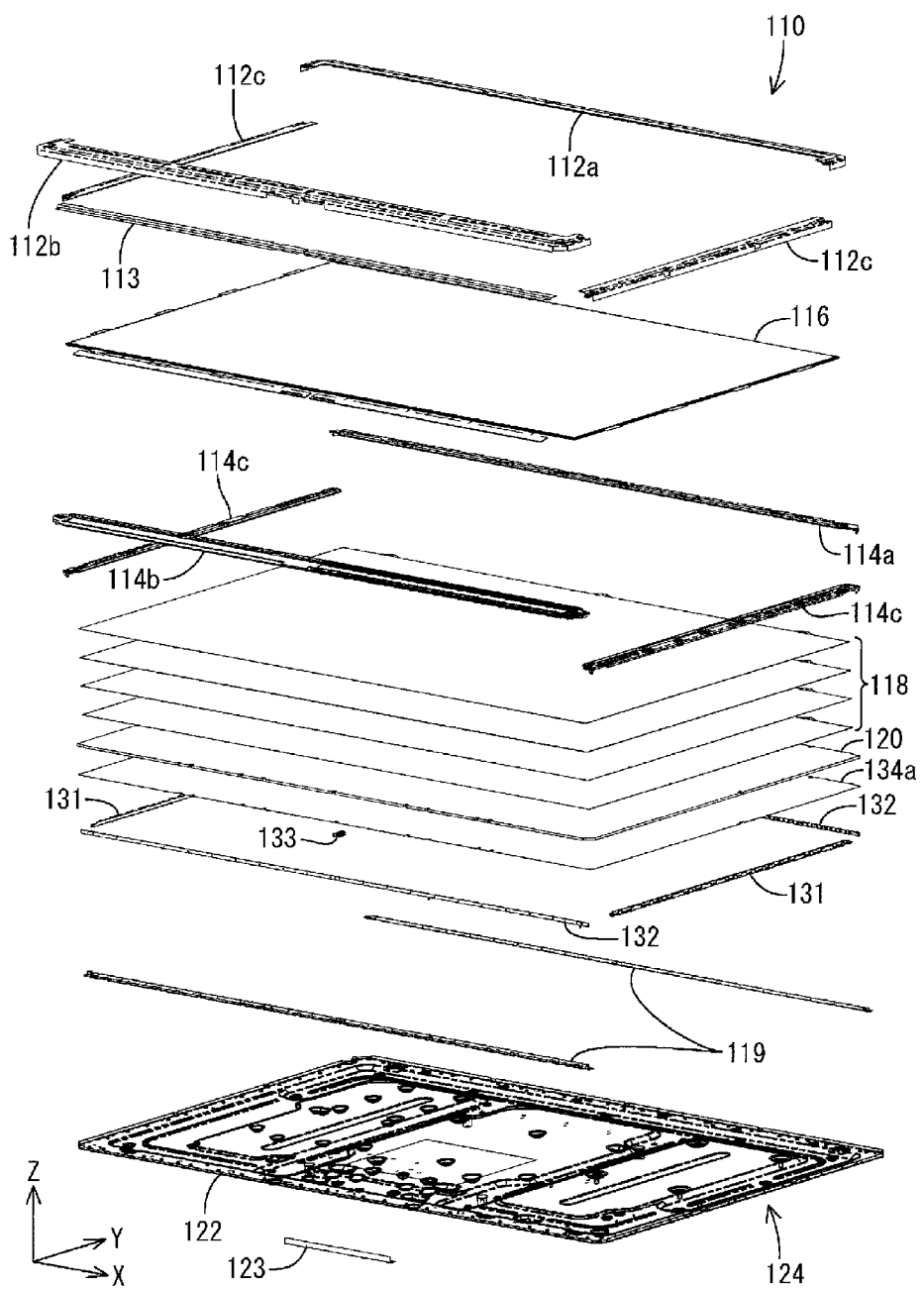
FIG. 33 is an exploded perspective view of a liquid crystal display device according to the forth embodiment of the present invention.

FIG. 33 is an exploded perspective view of the liquid crystal display device 110 according to the present embodiment. In FIG. 33, the upper side corresponds to the front side and the lower side corresponds to the rear side. As shown in FIG. 33, the liquid crystal display device 110 as a whole has a horizontally long square shape, and include a liquid crystal panel 116 as a display panel and a backlight unit 124 as an external light source, which are configured to be integrally retained by a top bezel 112a, a bottom bezel 112b, side bezels 112c (hereafter referred to as a group of bezels 112a to 112c), and the like. The liquid crystal panel 116 may have a configuration similar to that according to the first embodiment; thus, redundant description of the configuration will be omitted.

In the following, the backlight unit 124 will be described. As shown in FIG. 33, the backlight unit 124 includes a backlight chassis (sandwiching member; support member) 122; optical members 118; a top frame (sandwiching member) 114a; a bottom frame (sandwiching member) 114b; side frames (sandwiching members) 114c (hereafter referred to as the frames 114a to 114c); and a reflection sheet 134a. The liquid crystal panel 116 is sandwiched by the group of bezels 112a to 112c and the frames 114a to 114c. Reference sign 113 indicates an insulating sheet insulating a display control circuit board 115 (see FIG. 34) that drives the liquid crystal panel 116. The backlight chassis 122 is open on the front side (the light output side; the side of the liquid crystal panel 116), and has a substantially box-like shape with a bottom surface. The optical members 118 are disposed on the front side of the light guide plate 120. The reflection sheet 134a is disposed on the rear side of the light guide plate 120. Further, the backlight chassis 122 houses a pair of cable holders 131; a pair of heat dissipating plates (attached heat dissipating plates) 119; a pair of LED units 132; and a light guide plate 120. The LED units 132, the light guide plate 120, and the reflection sheet 134a are held together with rubber bushes 133. On the back surface of the backlight chassis 122, a power supply circuit board (not shown) supplying electric power to the LED units 132, a protection cover 123 protecting the power supply circuit board, and the like are attached. The pair of cable holders 131 is disposed along the short side direction of the backlight chassis 122 and houses wires electrically connecting the LED units 132 and the power supply circuit board.

Figure 34:
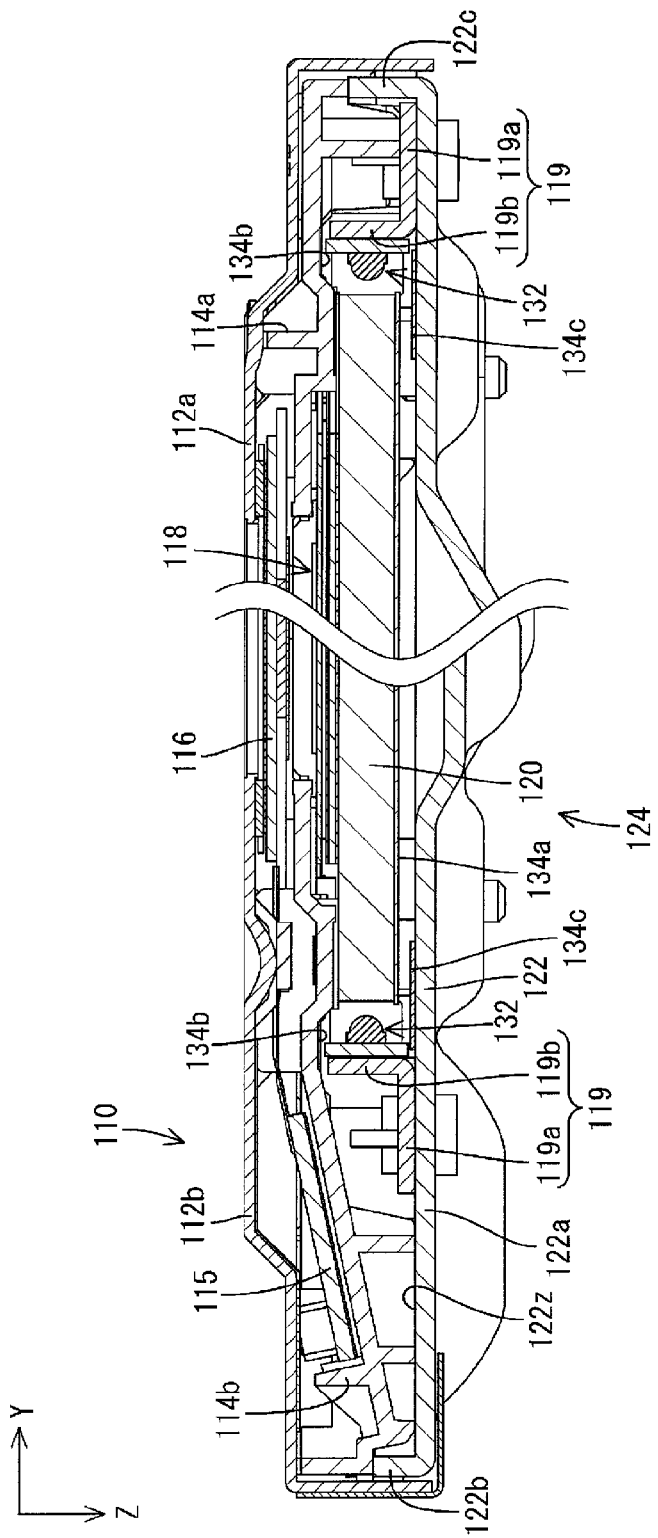
FIG. 34 is a horizontal cross sectional view of the liquid crystal display device.

FIG. 34 is a horizontal cross sectional view of the backlight unit 124. As shown in FIG. 34, the backlight chassis 122 is constituted by a bottom plate 122a with a bottom surface 122z, and side plates 122b and 122c shallowly rising from the outer edges of the bottom plate 122a. The backlight chassis 122 supports at least the LED units 132 and the light guide plate 120. The heat dissipating plate 119 includes a bottom surface portion (second plate portion) 119a and a side surface portion (first plate portion) 119b rising from the outer edges of the bottom surface portion 119a on one long side thereof, forming an L-shape in horizontal cross section. Each of the heat dissipating plates 119 is disposed along the long sides of the backlight chassis 122. The bottom surface portions 119a of the heat dissipating plates 119 are fixed to the bottom plate 122a of the backlight chassis 122. Each of the pair of LED units 132 extends along the long sides of the backlight chassis 122, and is fixed to the corresponding side surface portions 119b of the heat dissipating plates 119 with the light output sides of the LED units 132 opposed to each other. Thus, the pair of LED units 132 is supported by the bottom plate 122a of the backlight chassis 122 via the heat dissipating plates 119. The heat dissipating plates 119 dissipate the heat generated in the LED units 132 outside the backlight unit 124 via the bottom plate 122a of the backlight chassis 122.

As shown in FIG. 34, the light guide plate 120 is disposed between the pair of LED units 132. The pair of LED units 132, the light guide plate 120, and the optical members 118 are sandwiched by the frames (first sandwiching members) 114a to 114c and the backlight chassis (second sandwiching member) 122. Further, the light guide plate 120 and the optical members 118 are fixed by the frames 114a to 114c and the backlight chassis 122. The LED units 132, the light guide plate 120, and the optical members 118 may have configurations similar to those according to the first embodiment; thus, redundant description of the configurations will be omitted.

As shown in FIG. 34, the drive circuit board 115 is disposed on the front side of the bottom frame 114b. The drive circuit board 115 is electrically connected to the display panel 116 and supplies image data and various control signals necessary for image display to the liquid crystal panel 116. A first reflection sheet 134b is disposed on the surface of the top frame 114a at a location that is exposed to the LED units 132, along the long side direction of the light guide plate 120. Another first reflection sheet 134b is disposed on the surface of the bottom frame 114b at a location that is opposed to the LED unit 132, along the long side direction of the light guide plate 120.

Other Embodiments

The present invention is not limited to the embodiments above described and illustrated with reference to the drawings, and the following embodiments may be included in the technical scope of the present invention.

Figure 35:
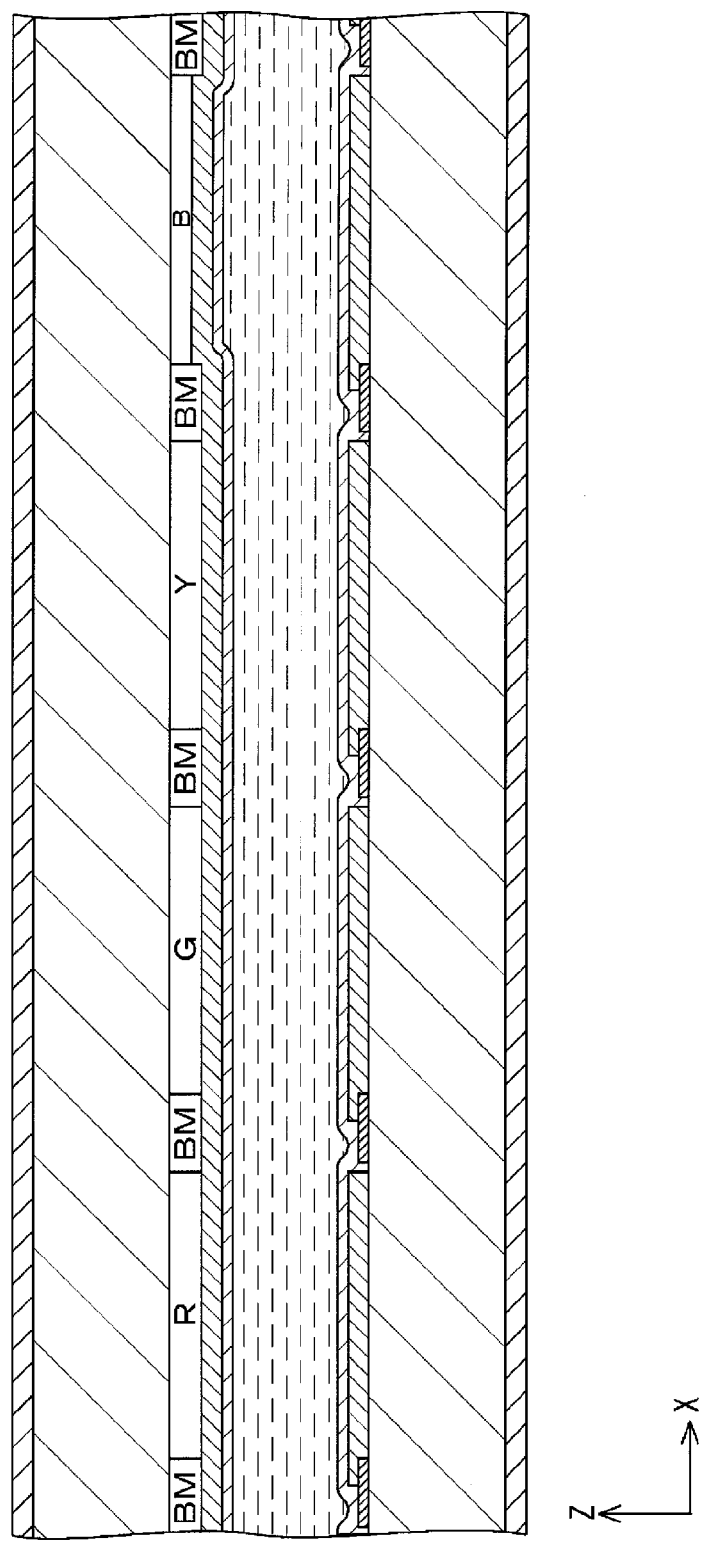
FIG. 35 is a cross sectional view showing a cross sectional configuration of the color sections according to another embodiment (1) of the present invention.

(1) In the first embodiment, the yellow color section Y or the green color section G have an area ratio different from the area ratio of the blue color section B or the red color section R, where the film thickness of the blue color section B is made smaller than the film thickness of the other color section R, G, or Y. Preferably, this feature may also be applied to the configuration in which the color sections R, G, B, and Y have the same area ratio. Specifically, as shown in FIG. 35, in the configuration in which the color sections R, G, B, and Y have the same area ratio, the blue color section B may have a film thickness smaller than the film thickness of the other color section R, G, or Y.

Figure 36:
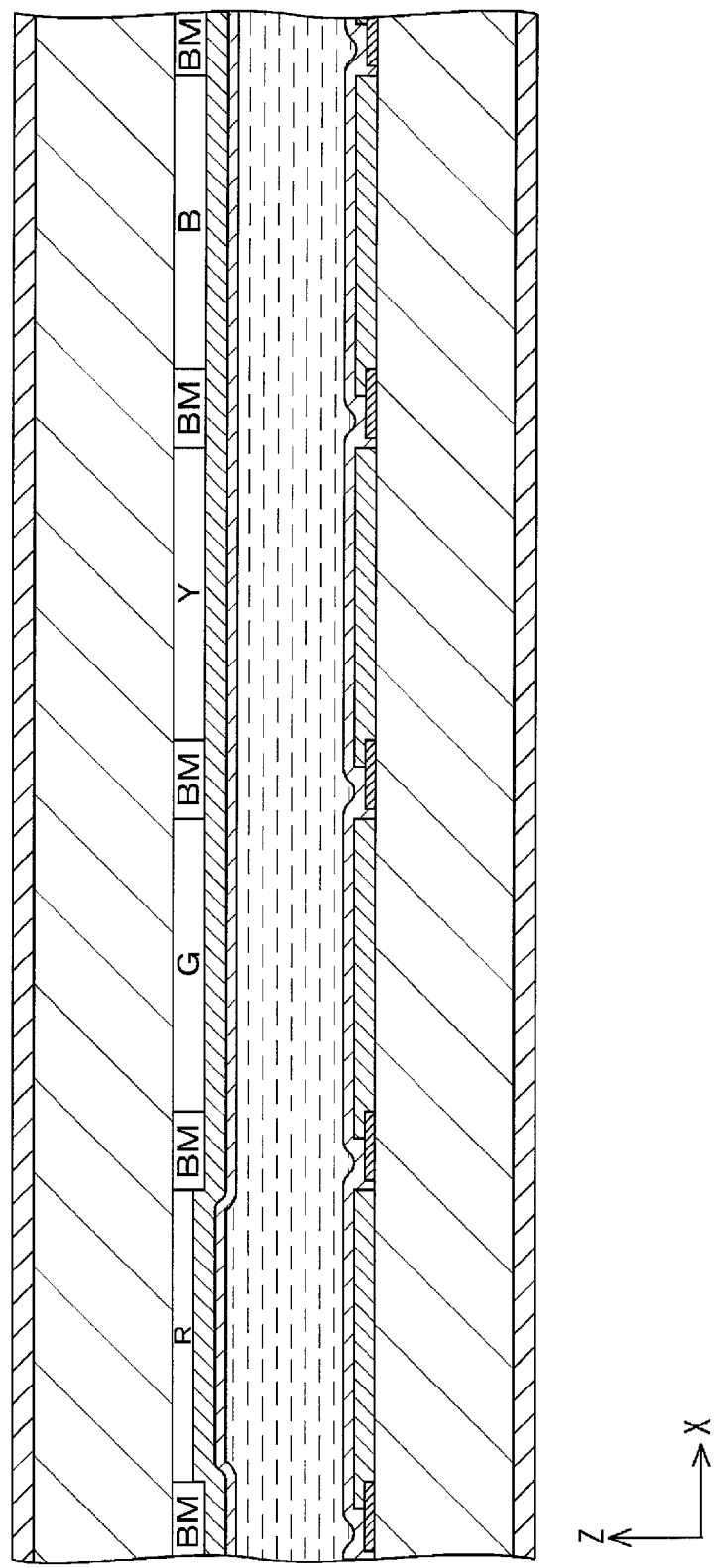
FIG. 36 is a cross sectional view showing a cross sectional configuration of the color sections according to another embodiment (2) of the present invention.

(2) Other than (1), as shown in FIG. 36, in the configuration in which the color sections R, G, B and Y have the same area ratio, the film thickness of the red color section R may be made smaller than the film thickness of the other color section B, G, or Y.

Figure 37:
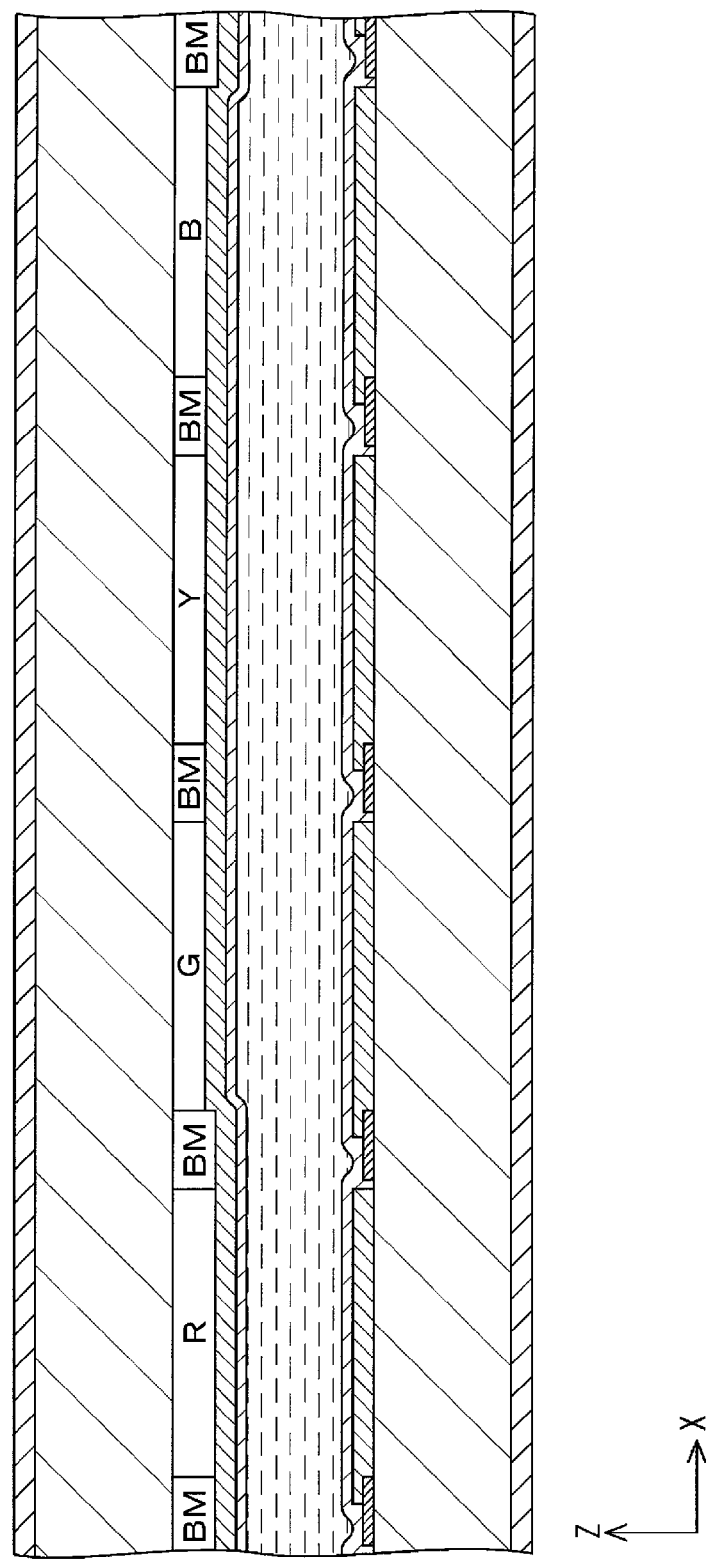
FIG. 37 is a cross sectional view showing a cross sectional configuration of the color sections according to another embodiment (3) of the present invention.

(3) Other than (2), as shown in FIG. 37, in the configuration in which the color sections R, G, B and Y have the same area ratio, the film thickness of the red color section R may be made greater than the film thickness of the other color section B, G, or Y.

(4) With regard to the configuration in which the color sections R, G, B, and Y have the same area ratio, the order of arrangement of the color sections in the color filter may be appropriately modified from the order according to the first embodiment shown in FIG. 4. For example, as shown in FIG. 38, the present invention includes a configuration in which the color sections R, G, B, and Y in a color filter 19' are arranged in the order of the red color section R, the green color section G, the blue color section B, and the yellow color section Y from the left side in FIG. 38 along the x-axis direction.

(5) Other than (4), the present invention includes a configuration in which, for example, as shown in FIG. 39, the color sections R, G, B, and Y in a color filter 19" are arranged in the order of the red color section R, the yellow color section Y, the green color section G, and the blue color section B from the left side in FIG. 39 along the x-axis direction.

(6) In the first embodiment, in the liquid crystal display device using the edge light backlight unit (the first experiment example), the blue color section B in the color filter has a film thickness in the range of 61.8% to 85.8% of the film thickness of the other color section R, G, or Y. Preferably, the present invention includes a configuration in which the film thickness ratio of the blue color section B is 61.8% or less or 85.8% or more. Also in this case, the film thickness ratio is preferably limited within the range of 60% to 90%. In the first experiment example, the concrete value of the film thickness of the blue color section B may be appropriately modified from the values disclosed according to the first embodiment. Also, with regard to the film thickness of the red color section R, the concrete values of the film thickness ratio and the film thickness may be appropriately modified.

(7) In the first embodiment, in the liquid crystal display device using the direct backlight unit (the second experiment example), the blue color section B in the color filter has a film thickness in the range of 57.1% to 85.8% of the film thickness of the other color section R, G, or Y. However, the present invention also includes a configuration in which the film thickness ratio of the blue color section B is 57.1% or less or 85.8% or more. Also in this case, the film thickness ratio is preferably limited within the range of 50% to 90%. In the second experiment example, the concrete value of the film thickness of the blue color section B may be appropriately modified from the values disclosed according to the first embodiment. Also, with regard to the film thickness of the red color section R, the concrete values of the film thickness ratio and the film thickness may be appropriately modified.

(8) The first embodiment and the second embodiment may be combined. In the configuration, both the film thickness and the pigment concentration of the blue color section B are different from those of the other color section R, G, or Y. Preferably, the film thickness and the pigment concentration of the red color section R may be set differently from those of the other color section B, G, or Y.

(9) According to the foregoing embodiments, the color sections R, G, B, and Y in the color filter contain the pigment. The present invention also includes a configuration in which the color sections in the color filter contain dye. In this case, as in the second embodiment, the blue color section B (dye concentration) may have a different concentration of the dye from that of the other color section R, G, or Y, while the color sections R, G, B, and Y may have an uniform film thickness.

(10) According to the foregoing embodiments, the color filter is configured such that the chromaticity of the color sections R, G, B, and Y exhibiting the respective colors of blue, red, green, and yellow of the output light lies outside the common region of the NTSC chromaticity region according to the NTSC standard and the EBU chromaticity region according to the EBU standard in both the CIE1931 chromaticity diagram and the CIE1976 chromaticity diagram. Preferably, the chromaticity of each of the color sections R, G, B, and Y may be configured to lie outside the common region in only one of the CIE1931 chromaticity diagram and the CIE1976 chromaticity diagram.

(11) In the first embodiment, the blue color section B or the red color section R have the area ratio of 1.0 or 1.6 with respect to the yellow color section Y or the green color section G by way of example. Preferably, the concrete value of the area ratio may be appropriately modified. For example, the area ratio may be set within the range of more than 1.0 and less than 1.6. The value of the area ratio may also be larger than 1.6.

(12) While the blue color section B and the red color section R have the same area ratio according to the first embodiment, the blue color section B and the red color section R may have different area ratios. In this case, the blue color section B may have a larger area than the red color section R or, conversely, the blue color section B may have a smaller area than the red color section R. In either case, it is preferably that the blue color section B or red color section R has larger areas than the yellow color section Y or green color section G.

(13) While the yellow color section Y and the green color section G have the same area ratio according to the first embodiment, the yellow color section Y and the green color section G may have different area ratios. In this case, the yellow color section Y may have a larger area than the green color section G or, conversely, the yellow color sections Y may have a smaller area than the green color section G. In either case, it is preferably that the blue color section B or red color section R has larger areas than the yellow color section Y or green color section G.

(14) While each one type of the green and the red phosphors is used as the phosphors contained in the LEDs according to the first embodiment, a plurality of types of the same color may be used for one or both of the green and the red phosphors, and such configuration is also included in the present invention. This technique may be applied to the case where the yellow and the red phosphors are used as the phosphors, as according to the second embodiment.

(15) For the phosphors contained in the LEDs, the green and the red phosphors are used in the first embodiment while the yellow and the red phosphors are used in the third embodiment. However, the present invention also includes a configuration in which, as the phosphors contained in the LEDs, the green, the yellow, and the red phosphors are used in combination. Preferably, β-SiAlON as the green phosphor, BOSE-based phosphor, α-SiAlON or YAG-based phosphor as the yellow phosphor, and a CASN-based phosphor as the red phosphor may be used in combination. Also in this case, the technique of (14) may be adopted; i.e., a plurality of types of the phosphors of the same color may be used.

(16) Other than the configurations according to the first and the third embodiments and (15), as the phosphors contained in the LEDs, for example, a configuration may be adopted in which the green and the yellow phosphors are used but the red phosphor is not used. Further, as the phosphor contained in the LEDs, only the yellow phosphor may be used and the green and red phosphors may not be used.

(17) In the first embodiment, CASN (CaAlSiN$_3$:Eu) is used as the red color phosphor. Preferably, other CASN-based phosphors may be used. As the red color phosphor, phosphors other than the CASN-based phosphor may be used.

(18) In the foregoing embodiments, the LEDs are of the type including an LED chip that emits the single color of blue light and configured to emit substantially white light (including white light and substantially white and yet bluish light) by using a phosphor. The present invention also includes a configuration in which the LEDs are of the type including an LED chip that emits the single color of ultraviolet light (blue-violet light) and configured to emit substantially white light by using a phosphor. Also in this case, the chromaticity of the LEDs can be adjusted by appropriately adjusting the contained amount of the phosphors in the LEDs.

(19) In the foregoing embodiments, the LEDs are of the type including an LED chip that emits the single blue light and configured to emit substantially white light (including white light and substantially white and yet bluish light) by using a phosphor. However, the present invention also includes a configuration in which the LEDs are of the type including three types of LED chips that emit the light of single color of red, green, or blue, respectively. In addition, the present invention also includes a configuration in which the LEDs include three types of LED chips that emit the single color of C (cyan), M (magenta), or Y (yellow), respectively. In this case, the chromaticity of the LEDs can be adjusted by appropriately controlling the amount of electric current to the LED chips when turned on.

(20) In the first embodiment, in the liquid crystal display device using the edge light backlight unit, a pair of the LED boards (LEDs) is disposed at the ends of the chassis (light guide member) on the long sides thereof. The present invention also includes a configuration in which, for example, a pair of the LED boards (LEDs) is disposed at the ends of the chassis (light guide member) on the short sides thereof.

(21) Other than (20), the present invention also includes a configuration in which each one pair of LED boards (LEDs) is disposed at the ends of the chassis (light guide member) on the long sides and on the short sides thereof. Conversely, one LED board (LED) may be disposed at the end of the chassis (light guide member) on only one of the long sides or one of the short sides thereof.

(22) In the first embodiment, in the liquid crystal display device using the edge light backlight unit, the light guide member is made of a synthetic resin. Preferably, the light guide member may be made of a material (substance) other than a synthetic resin material.

(23) In the first embodiment, in the liquid crystal display device using the direct backlight unit, the diffuser lenses are disposed on the light output side of the LEDs. The present invention, however, includes a configuration in which the diffuser lenses are omitted. The number of the LEDs installed on the LED boards, the number of the LED boards (LEDs) installed on the chassis, and the like may be appropriately modified.

(24) In the foregoing embodiments, the liquid crystal panel and the chassis are vertically disposed with their short side directions aligned with the vertical direction, by way of example. The present invention also includes a configuration in which the liquid crystal panel and the chassis are vertically disposed with their long side directions aligned with the vertical direction.

(25) In the foregoing embodiments, as the switching elements of the liquid crystal display device, TFTs are used. The present invention, however, may be applied to liquid crystal display devices using switching elements other than TFTs (such as thin-film diodes (TFD)). Further, the present invention may be applied not only to a liquid crystal display device for color display but also to a liquid crystal display device for monochrome display.

(26) While in the foregoing embodiments liquid crystal display devices using a liquid crystal panel as a display panel has been described by way of example, the present invention may be applied to display devices using other types of display panels.

(27) While in the foregoing embodiments a television receiver with a tuner has been described by way of example, the present invention may be applied to a display device without a tuner.

EXPLANATION OF SYMBOLS 10, 10' 110: Liquid crystal display device (Display device)
11, 116: Liquid crystal panel (Display panel)
11a: CF substrate (Substrate)
11b: Array substrate (Substrate)
11c: Liquid crystal layer (Substance; Liquid crystal)
12, 40, 124: Backlight unit (Lighting device)
19: Color filter
24, 44: LED (Light source)
26: Light guide member
26b: Light entrance surface
28: First reflection sheet (Reflection sheet)
29: Second reflection sheet (Reflection sheet)
30: Lens member
41: Chassis
41a: Bottom plate (Bottom portion)
42: Optical member 46: Diffuser lens
A1: NTSC chromaticity region
A2: EBU chromaticity region
A3: Common region
R: Red color section
G: Green color section
B: Blue color section
Y: Yellow color section
T: Tuner (Reception unit)
TV: Television receiver
VC: Image conversion circuit

The invention claimed is:

1. A display device comprising:
an edge-light backlight unit including:
LEDs; and
a light guide member configured to receive light from the LEDs through a side surface thereof and to guide received light toward a front surface thereof; and
a display panel including:
a pair of substrates;
a liquid crystal layer provided between the substrates; and
a color filter on one of the pair of substrates including red, green, blue, and yellow color sections; wherein
each of the green sections and each of the yellow sections have a first area ratio, and each of the red sections and each of the blue sections have a second area ratio that is larger than the first area ratio;
each of the red, green, and yellow sections has a first thickness;
each of the blue sections has a second thickness which is smaller than the first thickness; and
the first area ratio, the second area ratio, the first thickness, and the second thickness are defined such that a chromaticity of a blue color of output light obtained by passing light from the LED through the color sections in the color filter lies outside a common region of an NTSC chromaticity region according to an NTSC standard and an EBU chromaticity region according to an EBU standard in at least one of a CIE1931 chromaticity diagram and a CIE1976 chromaticity diagram.

2. The display device according to claim 1, wherein the first area ratio, the second area ratio, the first thickness, and the second thickness are defined such that the chromaticity of the blue color of the output light lies within the EBU chromaticity region in at least one of the CIE1931 chromaticity diagram and the CIE1976 chromaticity diagram.

3. The display device according to claim 1, wherein the first area ratio, the second area ratio, the first thickness, and the second thickness are defined such that the chromaticity of the blue color of the output light has a y value of 0.059 or higher in the CIE1931 chromaticity diagram.

4. The display device according to claim 1, wherein the first area ratio, the second area ratio, the first thickness, and the second thickness are defined such that the chromaticity of the blue color of the output light has a v' value of 0.155 or higher in the CIE1976 chromaticity diagram.

5. The display device according to claim 1, wherein
the backlight unit further includes an optical member and a chassis that houses the LEDs and the optical member, and
the chassis includes a bottom portion arranged so as to face the optical member.

6. The display device according to claim 1, wherein the first area ratio, the second area ratio, the first thickness, and the second thickness are defined such that the chromaticity of a red color of the output light lies within the common region in at least one of the CIE1931 chromaticity diagram and the CIE1976 chromaticity diagram.

7. The display device according to claim 1, wherein the first area ratio, the second area ratio, the first thickness, and the second thickness are defined such that the chromaticity of a yellow color of the output light lies outside the common region in at least one of the CIE1931 chromaticity diagram and the CIE1976 chromaticity diagram.

8. A television receiver comprising:
the display device according to claim 1; and
a reception unit configured to receive a television signal.

9. The television receiver according to claim 8, further comprising an image conversion circuit configured to convert a television image signal output from the reception unit into an image signal for the respective colors of blue, green, red, and yellow.

10. The display device according to claim 1, wherein the second thickness is in a range of 60% to 90% of the first thickness.

11. The display device according to claim 10, wherein the second thickness is in a range of 61.8% to 85.8% of the first thickness.

12. The display device according to claim 11, wherein
the first thickness is 2.1 μm, and
the second thickness is in a range of 1.3 μm to 1.8 μm.

13. The display device according to claim 12, wherein the second thickness is 1.3 μm.

14. The display device according to claim 12, wherein the second thickness is 1.8 μm.

15. The display device according to claim 1, wherein
the side surface of the light guide member includes a light entrance surface having an elongated shape,
each of the LEDs includes a lens member that covers a light output side of the LED to diffuse light, and
the lens member is opposite the light entrance surface of the light guide member, and curved toward the light entrance surface of the light guide member.

16. The display device according to claim 15, wherein the backlight unit further includes a reflection sheet arranged so as to face the LEDs and the light guide member.

17. The display device according to claim 1, wherein the light guide member is made of a material having a refractive index higher than the refractive index of air.

18. The display device according to claim 1, wherein the second area ratio is 1.6 times larger than the first area ratio.

19. A display device comprising:
an edge-light backlight unit including:
LEDs; and
a light guide member configured to receive light from the LEDs through a side surface thereof and to guide the received light toward a front surface thereof; and
a display panel including:
a pair of substrates;
a liquid crystal layer between the substrates; and
a color filter on one of the substrates including red, green, blue, and yellow color sections, wherein
each of the green sections and each of the yellow sections have a first area ratio, and each of the red sections and each of the blue sections have a second area ratio that is larger than the first area ratio,
each of the green, blue, and yellow sections has a first thickness,
each of the red sections has a second thickness, and
the first area ratio, the second area ratio, the first thickness, and the second thickness are defined such that a chromaticity of a red color of output light obtained by passing light from the LED through the color sections in the color filter lies within an NTSC chromaticity region according to an NTSC standard and outside a common region of the NTSC chromaticity region and an EBU chromaticity region according to an EBU standard in at least one of a CIE1931 chromaticity diagram and a CIE1976 chromaticity diagram.

20. The display device according to claim 19, wherein
the first thickness is 2.1 μm, and
the second thickness is 2.3 μm.

21. The display device according to claim 19, wherein
the first thickness is 2.1 μm, and
the second thickness is 2.5 μm.

22. The display device according to claim 19, wherein
the side surface of the light guide member includes a light entrance surface having an elongated shape, and each of the LEDs includes a lens member that covers a light output side of the LEDs to diffuse light, and
the lens member is opposite the light entrance surface of the light guide member and curved toward the light entrance surface of the light guide member.

23. The display device according to claim 22, wherein the backlight unit further includes a reflection sheet arranged so as to face the LEDs and the light guide member.

24. The display device according to claim 19, wherein the light guide member is made of a material having a refractive index higher than the refractive index of air.

25. The display device according to claim 19, wherein
the backlight unit further includes an optical member and a chassis that houses the LEDs and the optical member, and
the chassis includes a bottom portion arranged so as to face the optical member.

26. The display device according to claim 19, wherein the second area ratio is 1.6 times larger than the first area ratio.

27. A television receiver comprising:
the display device according to claim 19; and
a reception unit configured to receive a television signal.

28. The television receiver according to claim 27, further comprising an image conversion circuit configured to convert a television image signal output from the reception unit into an image signal for the respective colors of blue, green, red, and yellow.

29. A display device comprising:
an edge-light backlight unit including:
  LEDs; and
  a light guide member configured to receive light from the LEDs through a side surface thereof and to guide the received light toward a front surface thereof; and
a display panel including:
  a pair of substrates;
  a liquid crystal layer between the substrates;
  a color filter on one of the substrates including red, green, blue, and yellow color sections, wherein
each of the green sections and each of the yellow sections have a first area ratio, and each of the red sections and each of the blue sections have a second area ratio that is larger than the first area ratio,
each of the green, blue, and yellow sections has a first thickness,
each of the red sections has a second thickness, and
the first area ratio, the second area ratio, the first thickness, and the second thickness are defined such that a chromaticity of a red color of output light obtained by passing light from the LED through the color sections in the color filter lies within a common region of the NTSC chromaticity region and an EBU chromaticity region according to an EBU standard in at least one of a CIE1931 chromaticity diagram and a CIE1976 chromaticity diagram.

30. The display device according to claim 29, wherein
the first thickness is 2.1 μm, and
the second thickness is in a range from 1.2 μm to 1.8 μm.

31. The display device according to claim 29, wherein
the first thickness is 2.1 μm, and
the second thickness is 1.2 μm.

32. The display device according to claim 29, wherein
the first thickness is 2.1 μm, and
the second thickness is 1.8 μm.

33. The display device according to claim 29, wherein
the side surface of the light guide member includes a light entrance surface having an elongated shape, and each of the LEDs includes a lens member that covers a light output side of the LEDs to diffuse light, and
the lens member is opposite the light entrance surface of the light guide member and curved toward the light entrance surface of the light guide member.

34. The display device according to claim 33, wherein the backlight unit further includes a reflection sheet arranged so as to face the LEDs and the light guide member.

35. The display device according to claim 29, wherein the light guide member is made of material having a refractive index higher than the refractive index of air.

36. The display device according to claim 29, wherein
the backlight unit further includes an optical member and a chassis that houses the LEDs and the optical member, and
the chassis includes a bottom portion arranged so as to face the optical member.

37. The display device according to claim 29, wherein the second area ratio is 1.6 times larger than the first area ratio.

38. A television receiver comprising:
the display device according to claim 29; and
a reception unit configured to receive a television signal.

39. The television receiver according to claim 38, further comprising an image conversion circuit configured to convert a television image signal output from the reception unit into an image signal for the respective colors of blue, green, red, and yellow.

* * * * *